United States Patent
An et al.

(10) Patent No.: US 12,368,232 B2
(45) Date of Patent: Jul. 22, 2025

(54) SLIDABLE ELECTRONIC DEVICE INCLUDING FLEXIBLE DISPLAY AND ANTENNA

(71) Applicant: Samsung Electronics Co., Ltd., Suwon-si (KR)

(72) Inventors: Seongyong An, Suwon-si (KR); Gyusub Kim, Suwon-si (KR); Kyungmoon Seol, Suwon-si (KR); Kyihyun Jang, Suwon-si (KR); Bumjin Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 211 days.

(21) Appl. No.: 18/346,557

(22) Filed: Jul. 3, 2023

(65) Prior Publication Data
US 2023/0352814 A1 Nov. 2, 2023

Related U.S. Application Data

(63) Continuation of application No. PCT/KR2023/004743, filed on Apr. 7, 2023.

(30) Foreign Application Priority Data

Apr. 8, 2022 (KR) .................. 10-2022-0044190
Jun. 8, 2022 (KR) .................. 10-2022-0069471

(51) Int. Cl.
*H01Q 1/24* (2006.01)
*G06F 1/16* (2006.01)
(Continued)

(52) U.S. Cl.
CPC ........... *H01Q 1/243* (2013.01); *G06F 1/1624* (2013.01); *G06F 1/1652* (2013.01);
(Continued)

(58) Field of Classification Search
None
See application file for complete search history.

(56) References Cited

U.S. PATENT DOCUMENTS

| 8,786,500 B2 | 7/2014 | Eom et al. |
| 10,700,416 B2 | 6/2020 | Jung et al. |
| (Continued) | | |

FOREIGN PATENT DOCUMENTS

| KR | 20080101945 A | 11/2008 |
| KR | 20090021427 A | 3/2009 |
| (Continued) | | |

OTHER PUBLICATIONS

Search Report an Written Opinion dated Jul. 11, 2023 issued in International Patent Application No. PCT/KR2023/004743.

*Primary Examiner* — Wilson Lee
(74) *Attorney, Agent, or Firm* — Nixon & Vanderhye, P.C.

(57) ABSTRACT

According to an example embodiment, a slidable electronic device may include a first housing, a second housing configured to be slidable with respect to the first housing, a flexible display module comprising a flexible display including a first area configured to be seen in a state in which the second housing is slid-in with respect to the first housing, and a second area configured to be at least partially drawn out to the outside to be seen in a state in which the second housing is slid-out with respect to the first housing, and a wireless communication circuit, wherein the second housing includes a first conductive pattern electrically connected to the wireless communication circuit and a second conductive pattern physically separated from the first conductive pattern and configured to operate as an antenna ground.

20 Claims, 31 Drawing Sheets

(51) Int. Cl.
*H01Q 1/38* (2006.01)
*H04M 1/02* (2006.01)

(52) U.S. Cl.
CPC ............. *G06F 1/1656* (2013.01); *H01Q 1/38* (2013.01); *H04M 1/0237* (2013.01); *H04M 1/0268* (2013.01); *H04M 1/0277* (2013.01)

(56) References Cited

U.S. PATENT DOCUMENTS

| | | | |
|---|---|---|---|
| 10,747,269 | B1 | 8/2020 | Choi et al. |
| 11,032,920 | B2 | 6/2021 | Kim |
| 12,256,032 | B2* | 3/2025 | Stobbe .................. H04R 1/025 |
| 12,256,190 | B2* | 3/2025 | Yang .................. H04R 1/2811 |
| 2019/0181564 | A1* | 6/2019 | Kwon ....................... H01Q 1/16 |
| 2019/0261519 | A1* | 8/2019 | Park ....................... G06F 1/1677 |
| 2022/0232716 | A1 | 7/2022 | Lim et al. |
| 2022/0384934 | A1 | 12/2022 | Son et al. |
| 2023/0021496 | A1* | 1/2023 | Choi ....................... H01Q 1/521 |
| 2023/0051139 | A1* | 2/2023 | Yeo ....................... G06F 1/1626 |
| 2023/0085200 | A1 | 3/2023 | Oh et al. |
| 2023/0208013 | A1 | 6/2023 | Lee et al. |
| 2024/0097322 | A1* | 3/2024 | Kim ......................... H01Q 3/12 |
| 2024/0205315 | A1* | 6/2024 | Pope .................. H04M 1/0249 |
| 2024/0214478 | A1* | 6/2024 | Kim .................. H04M 1/0262 |

FOREIGN PATENT DOCUMENTS

| | | | |
|---|---|---|---|
| KR | 20120016778 A | | 2/2012 |
| KR | 20130077133 A | | 7/2013 |
| KR | 10-2019-0033507 | | 3/2019 |
| KR | 10-2020-0061275 | | 6/2020 |
| KR | 20210055660 A | | 5/2021 |
| KR | 20210102037 A | | 8/2021 |
| KR | 10-2021-0116380 | | 9/2021 |
| KR | 10-2021-0143419 | | 11/2021 |
| KR | 10-2021-0148396 | | 12/2021 |
| KR | 10-2022-0030803 | | 3/2022 |
| KR | 10-2022-0036659 | | 3/2022 |

* cited by examiner

FIG. 17
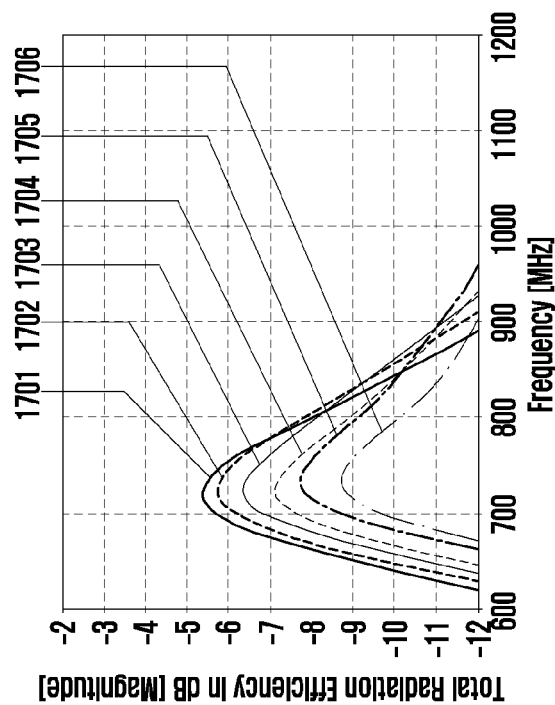
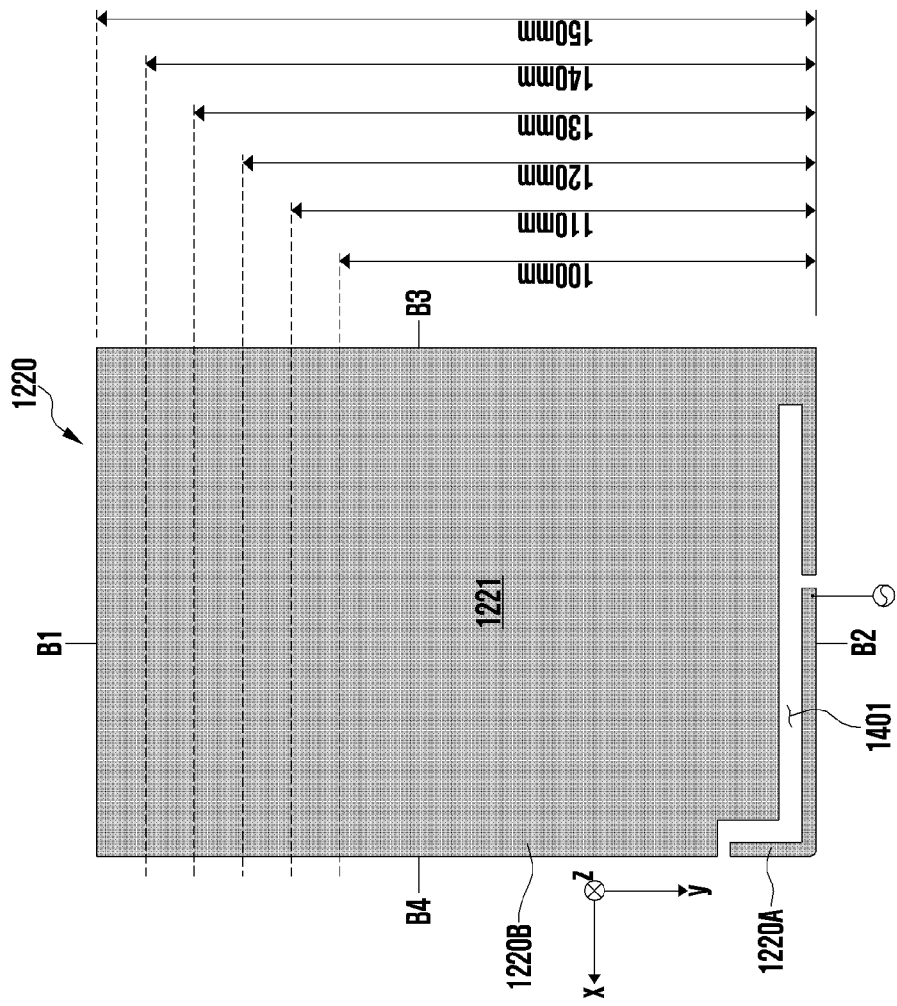

SLIDABLE ELECTRONIC DEVICE INCLUDING FLEXIBLE DISPLAY AND ANTENNA

CROSS-REFERENCE TO RELATED APPLICATIONS

This application is a continuation of International Application No. PCT/KR2023/004743 designating the United States, filed on Apr. 7, 2023, in the Korean Intellectual Property Receiving Office and claiming priority to Korean Patent Application No. 10-2022-0044190, filed on Apr. 8, 2022, in the Korean Intellectual Property Office, and to Korean Patent Application No. 10-2022-0069471, filed on Jun. 8, 2022, in the Korean Intellectual Property Office, the disclosures of all of which are incorporated by reference herein in their entireties.

BACKGROUND

Field

The disclosure relates to a slidable electronic device including a flexible display and an antenna.

DESCRIPTION OF RELATED ART

Along with the development of wireless communication technology, electronic devices such as smartphones are widely used in everyday life and thus the use of contents has increased. Electronic devices may include multiple antennas for supporting various communication technologies. A wide range of available applications causes electronic devices to include an increasing number of antennas.

Electronic devices have been designed to provide a larger screen while having a portable size without causing inconvenience to a user's hand. A slidable electronic device may provide extension of a screen by moving a flexible display in a sliding manner At least a portion of the flexible display may be drawn out from an internal space of the slidable electronic device during a sliding operation of the slidable electronic device, and thus a screen may be extended. A correlative positional relationship between components may be changed during a sliding operation, thus causing a difficulty in arranging or adding an antenna in the slidable electronic device while securing antenna radiation performance.

SUMMARY

Embodiments of the disclosure may provide a slidable electronic device including a flexible display and an antenna to secure or enhance antenna radiation performance.

According to an example embodiment of the disclosure, a slidable electronic device may include: a first housing, a second housing, a flexible display module including a flexible display, and a wireless communication circuit. The second housing may be configured to slide with respect to the first housing. The flexible display module may include a first area and a second area. The first area may be configured to be seen when the second housing is in a slide-in state with respect to the first housing. The second area may be configured to be at least partially drawn out to be seen when the second housing is in a slide-out state with respect to the first housing. The second housing may include a first conductive pattern and a second conductive pattern. The first conductive pattern may be electrically connected to the wireless communication circuit. The second conductive pattern may be physically separated from the first conductive pattern and may be configured to function as an antenna ground.

According to an example embodiment of the disclosure, a slidable electronic device may include: a flexible display module including a flexible display, a first housing, a frame, a second housing, and a wireless communication circuit. A first area of the flexible display module may be disposed on the first housing. The frame may be slidable with respect to the first housing. The frame may support a second area of the flexible display module. The second housing may receive the frame and may be coupled to the frame. The second housing may include a first conductive pattern and a second conductive pattern. The first conductive pattern may be electrically connected to the wireless communication circuit. The second conductive pattern may be physically separated from the first conductive pattern and may be configured to function as an antenna ground.

The slidable electronic device including a flexible display and an antenna according to an example embodiment of the disclosure may secure or enhance an antenna ground to improve or secure antenna radiation performance.

In addition, effects obtained or predicted by various embodiments of the disclosure may be disclosed directly or implicitly in the detailed description of the embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompany drawings, in which:

FIG. 17 is a diagram illustrating a conductive part included in a second housing and graphs indicating antenna radiation performance with respect to a first conductive pattern depending on a size of a second conductive pattern included in the conductive part according to various embodiments;

DETAILED DESCRIPTION

Hereinafter, various example embodiments of the disclosure disclosed herein will be described in greater detail with reference to the accompanying drawings.

Figure 1:
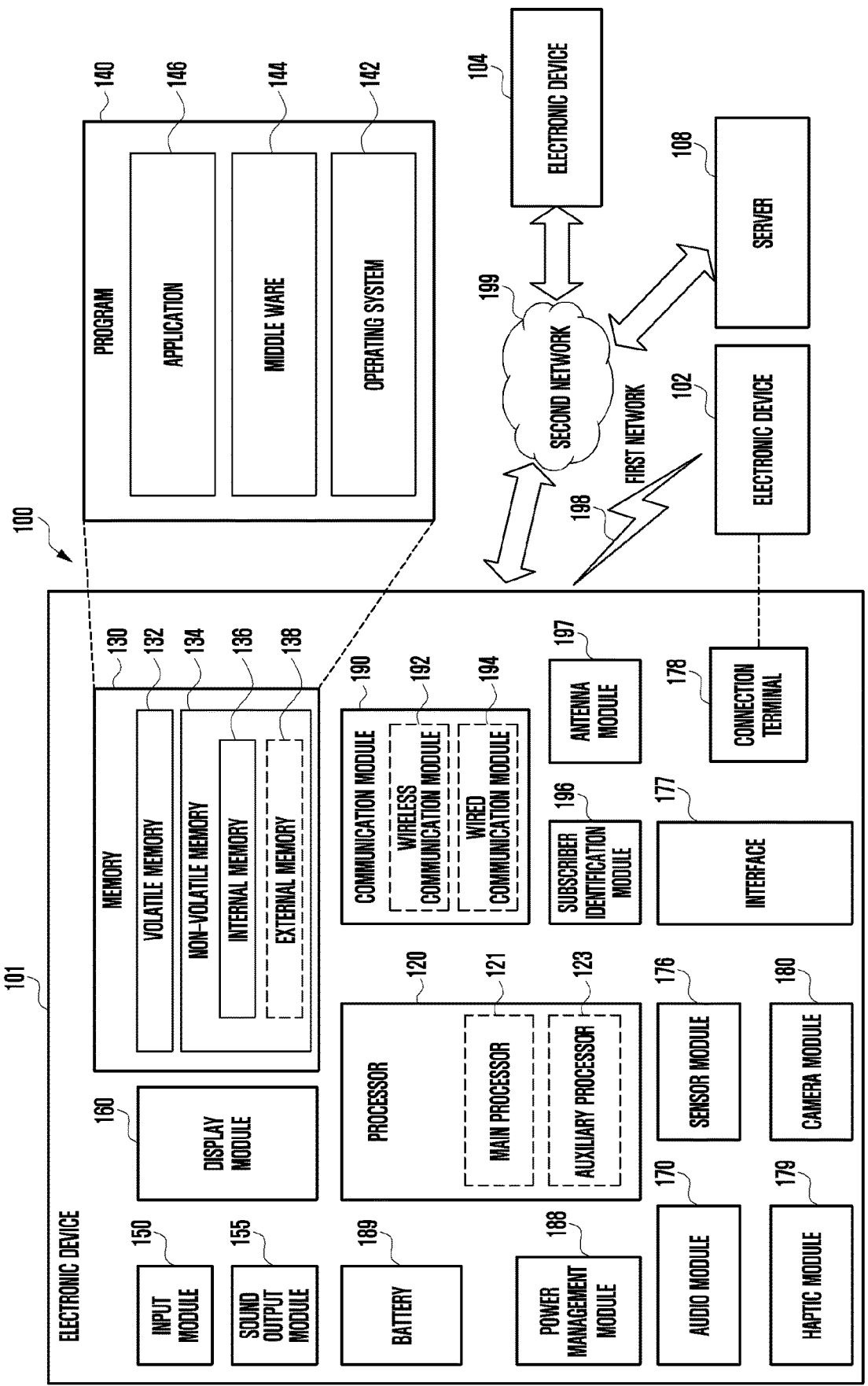
FIG. 1 is a block diagram illustrating an example electronic device in a network environment according to various embodiments.

FIG. 1 is a block diagram of an example electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (e.g., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
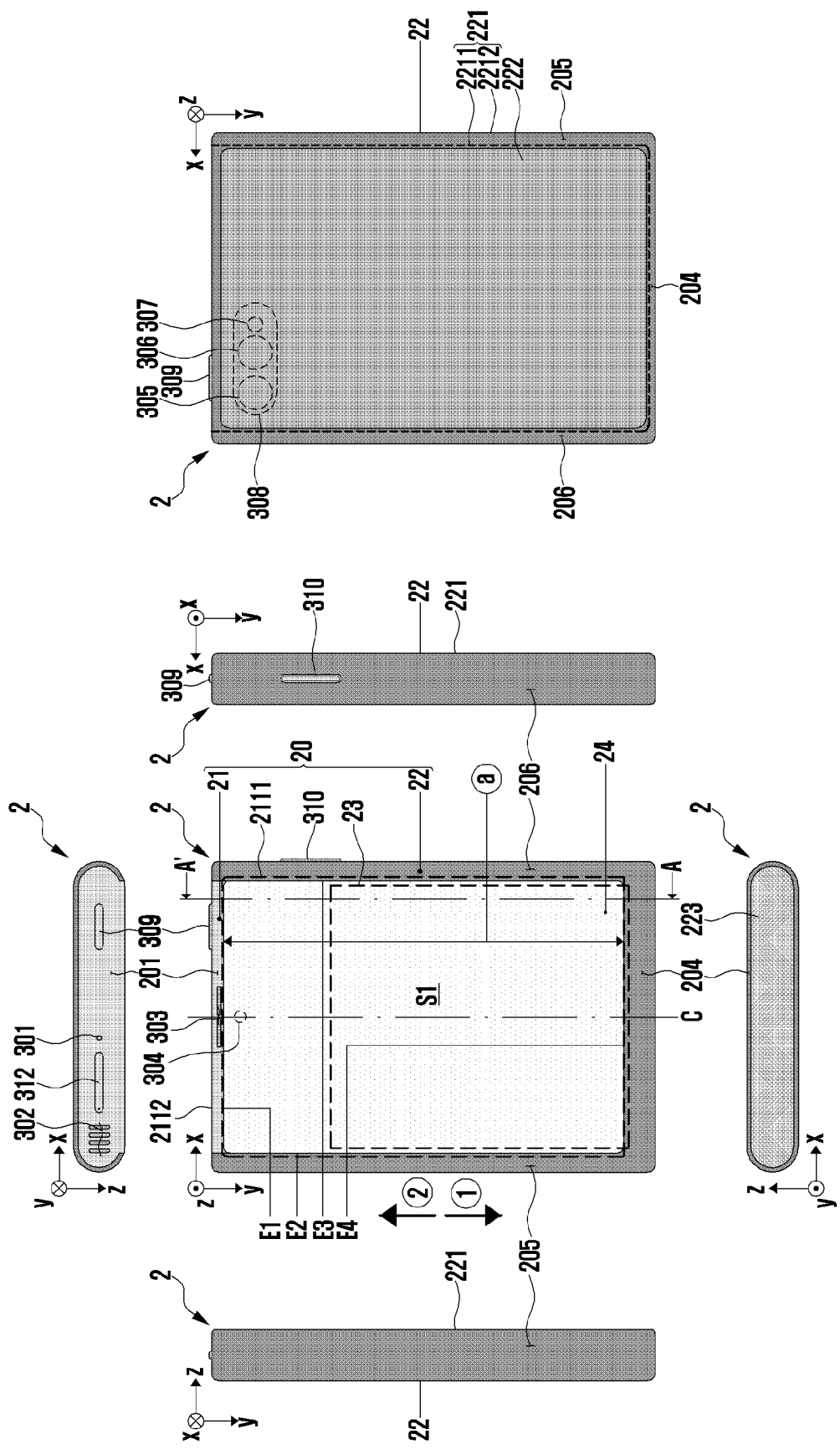
FIG. 2 is a diagram illustrating views of a slidable electronic device in a closed state according to various embodiments.
Figure 3:
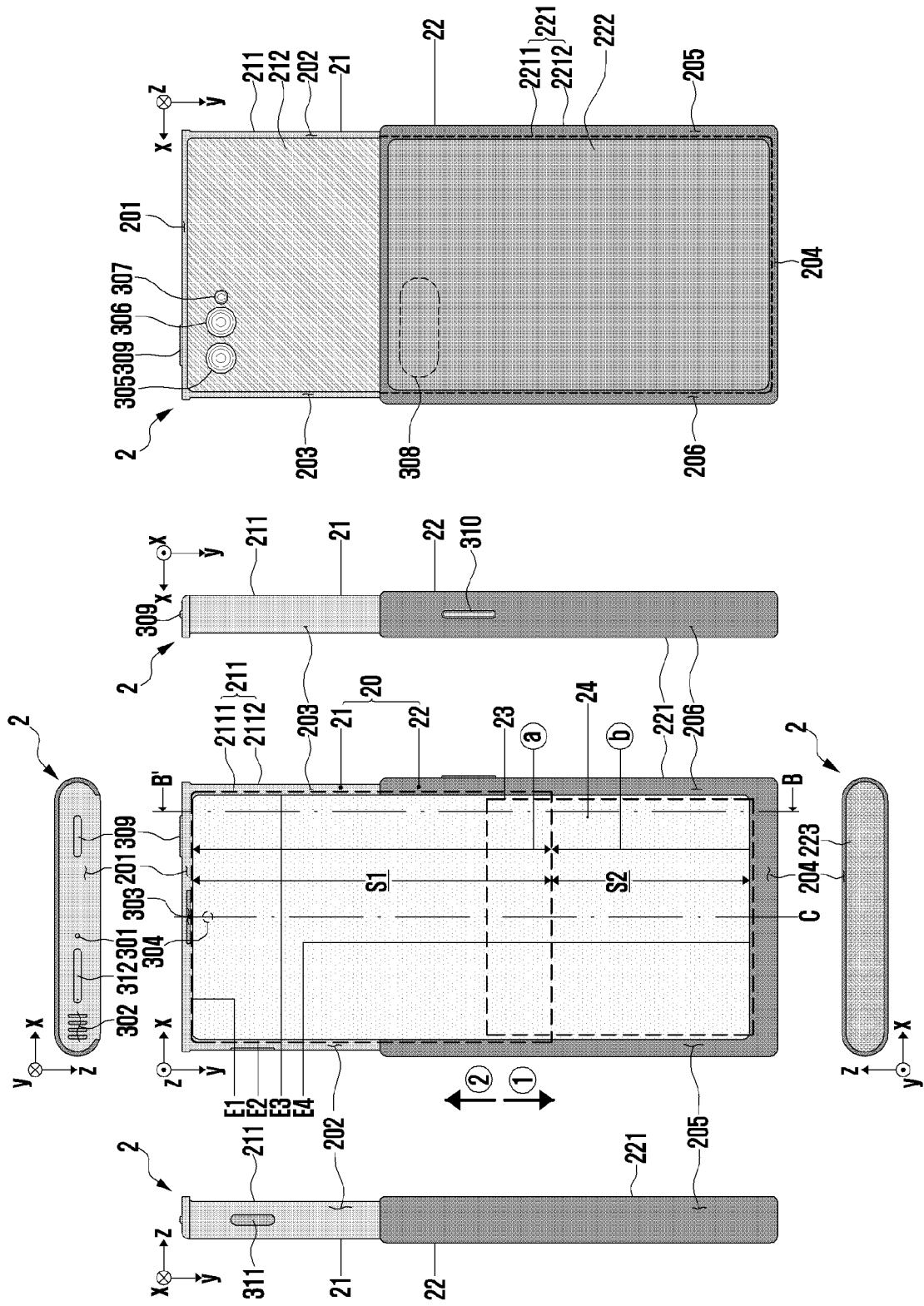
FIG. 3 is a diagram illustrating views of a slidable electronic device in an open state according to various embodiments.

FIG. 2 is a diagram illustrating views of a slidable electronic device 2 in a closed state according to various embodiments. FIG. 3 is a diagram illustrating views of a slidable electronic device 2 in an open state according to various embodiments. In various embodiments of the disclosure, for convenience of explanation, a direction (e.g., the +z-axis direction) in which the screen (e.g., a display area or active area visible to the outside of a flexible display module 24) is interpreted and used as a front surface of the slidable electronic device 2, and an opposite direction (e.g., the −z-axis direction) is interpreted and used as a rear surface of the slidable electronic device 2.

Referring to FIG. 2 and FIG. 3, the slidable electronic device 2 may include a slidable housing 20 and a flexible display module 24. The slidable housing 20 may include, for example, a first housing (or first housing part or first housing structure) 21 and a second housing (or second housing part or second housing structure) 22. The second housing 22 may be connected to the first housing 21 to be slidable with respect to the first housing 21. The sliding of the second housing 22 with respect to the first housing 21 may indicate a change in a relative position between the first housing 21 and the second housing 22 and may be interpreted as sliding of the first housing 21 with respect to the second housing 22 or mutual sliding between the first housing 21 and the second housing 22. The flexible display 24 may include a first area (a) positioned corresponding to the first housing 21 and a second area (b) extending from the first area (a) and positioned corresponding to the second housing 22. The first area (a) may be disposed on the first housing 21 and supported by the first housing 21. The first area (a) may be exposed (e.g., visible) to the outside and the slidable electronic device 2 may provide a first screen area S1 through the first area (a). As used herein with referent to a display or area of a display, the terms "exposed", "visually exposed" and "visible" may be used interchangeably and include the display or area of the display including a cover glass, cover layer, protective layer, etc. The second area (b) may be supported by the second housing 22 slidable with respect to the first housing 21. In case that the second housing 22 slides with respect to the first housing 21 in a first direction ① (e.g., the +y-axis direction), at least a portion of the second area (b) may be drawn out from a space of the second housing 22 to the outside (e.g., a position on the slidable electronic device 2 seen from the outside) to be seen. In case that the second housing 22 slides with respect to the first housing 21 in a second direction ② (e.g., the −y-axis direction) opposite to the first direction ①, at least a portion of the second area (b) may be inserted into the space of the second housing 22 to be hidden. The slidable electronic device 2 may provide a screen area having a second screen area (or second display area) S2 added to the first screen area (or first display area) S1 through at least a portion of the second area (b) drawn out to the outside. Depending on a slide position or distance of the second housing 22 with respect to the first housing 21, a ratio of a portion of the second area (b) drawn out to the outside and a size of a screen according thereto may vary. FIG. 2 illustrates the slidable electronic device 2 in a state in which a screen is not extended, and FIG. 3 illustrates the slidable electronic device 2 in a state in which the screen is extended. The state in which the screen is not extended may be a state in which the second housing 22 is not moved in the first direction ① with respect to the first housing 21 and may be referred to as a "closed state" of the slidable electronic device 2. The state in which the screen is extended may be a state in which the second housing 22 is moved to the maximum extent that the second housing is no longer moved in the first direction ① and may be referred to as an "open state" of the slidable electronic device 2. In various embodiments, the open state may include a completely open state (see FIG. 3) or an intermediate state. The intermediate state may indicate a state between the closed state (see FIG. 2) and the completely open state. A case that the second housing 22 is at least partially moved in the first direction ① with respect to the first housing 21 may be referred to as "slide-out" of the second housing 22 or the flexible display module 24. A case that the second housing 22 is at least partially moved in the second direction ② opposite to the first direction ① with respect to the first housing 21 may be referred to as "slide-in" of the second housing 22 or the flexible display module 24. The second area ⓑ may be disposed to have a bending part so as to change a direction and to be moved in case that the second area ⓑ is drawn out from the space of the second housing 22 to the outside or inserted into the space of the second housing 22 when the second housing 22 slides with respect to the first housing 21. The second area ⓑ may be referred to as other terms such as a "bendable area" or a "bendable section". In the slidable electronic device 2 configured to provide a screen expandable in response to mutual sliding between the first housing 21 and the second housing 22, the flexible display module 24 (or flexible display) may be referred to as other terms such as an "expandable display", a "slidable display", or a "slide-out display". The slidable electronic device 2 configured to provide a screen expandable in response to mutual sliding between the first housing 21 and the second housing 22 may be referred to as other terms such as a "stretchable electronic device" or a "rollable electronic device".

The disclosure describes "slide-out or slide-in of the second housing 22" or "sliding of the second housing 22 with respect to the first housing 21" but is not limited thereto. According to various embodiments, the disclosure may be described as slide-out or slide-in of the first housing 21 with respect to the second housing 22, sliding of the first housing 21 with respect to the second housing 22, mutual sliding between the first housing 21 and the second housing 22, or a change in relative locations between the first housing 21 and the second housing 22.

According to an embodiment, a screen including a first screen area S1 provided by the first area ⓐ of the flexible display module 24 and a second screen area S2 provided by the second area ⓑ of the flexible display module 24 in the open state (see FIG. 3) of the slidable electronic device 2 may be provided in a substantially planar form. A direction in which the front surface of the slidable electronic device 2 is directed may be a direction in which the planar-shaped screen is directed. The first area ⓐ of the flexible display module 24 may be disposed on the first housing 21 to be substantially flat and the first area ⓑ may provide the first screen area S1 which is planar and corresponds thereto. The second area ⓑ of the flexible display module 24 may be disposed to have a bending part. The bending part may be a part which is disposed and maintained in a bended shape in the second area ⓑ so as to allow the second area ⓑ to change a direction and move in case that the second housing 22 slides with respect to the first housing 21. Depending on a slide position or distance of the second housing 22 with respect to the first housing 21, a part of the second area ⓑ for providing the bending part may be changed but the shape of the bending part may be provided substantially the same. A size of a part between the bending part of the second area ⓑ and the first area ⓐ may increase during slide-out of the second housing 22 and decrease during slide-in of the second housing 22. In the open state of the slidable electronic device 2, the second screen area S2 may be provided through the part between the bending part of the second area ⓑ and the first area ⓐ. A partial part between the bending part of the second area ⓑ and the first area ⓐ may be disposed to be substantially flat in a form smoothly connected to the first area ⓐ without lifting. In an embodiment, the slidable electronic device 2 may include a tension device configured to allow a part between the bending part of the second area ⓑ and the first area ⓐ to be disposed substantially flat in the open state of the slidable electronic device 2 while reducing a lifting phenomenon due to elasticity of the flexible display module 24.

According to an embodiment, a screen of the slidable electronic device 2 may be provided in a rectangular shape and may include, for example, a first edge E1, a second edge E2, a third edge E3, and a boundary E4 with the bending part of the second area ⓑ. When viewed from above, the first edge E1 may be positioned spaced apart from the boundary E4 with the bending part in the second direction ② (e.g., a slide-in direction) and may be substantially parallel with the boundary E4 with the bending part. The second edge E2 may extend from one end part of the first edge E1 to the boundary E4 with the bending part and may be substantially perpendicular to the first edge E1. The third edge E3 may extend from the other end part of the first edge E1 to the boundary E4 with the bending part and may be substantially parallel with the second edge E2. In case of slide-out of the second housing 22, extension of a screen may increase a distance by which the boundary E4 with the bending part is spaced from the first edge E1 in the first direction ① and lengthen the second edge E2 and the third edge E3.

According to an embodiment, the first housing 21 may include a first frame (or first frame structure, first framework, or first case) 211 and/or a first cover 212 disposed in the first frame 211. The first frame 211 may include a first supporter 2111 and a first lateral wall part (or first bezel, first lateral wall bezel, or first lateral wall bezel part) 2112 connected to the first supporter 2111. In an embodiment, the first area ⓐ of the flexible display module 24 may be disposed on the first supporter 2111 and the first supporter 2111 may support the first area ⓐ. The first lateral wall part 2112 may include a first lateral wall 201, a second lateral wall 202, and/or a third lateral wall 203. The first lateral wall 201 may be positioned corresponding to the first edge E1 of the screen. The second lateral wall 202 may be positioned corresponding to the second edge E2 of the screen. The third lateral wall 203 may be positioned corresponding to the third edge E3 of the screen. When viewed from the top of the front of the slidable electronic device 2, the second lateral wall 202 may extend from one end part of the first lateral wall 201 in the first direction ① (e.g., the slide-out direction) and the third lateral wall 203 may extend from the other end part of the first lateral wall 201 in the first direction ①. When viewed from the top of the front of the slidable electronic device 2, the second lateral wall 202 may be substantially parallel with the third lateral wall 203 and substantially perpendicular to the first lateral wall 201. The first frame 211 may be provided as an integrated member or structure including the first supporter 2111 and the first lateral wall part 2112. For another example, the first supporter 2111 may be provided separately from the first lateral wall part 2112 and may be connected to the first lateral wall part 2112 using mechanical coupling such as screw fastening (or volt fastening) or bonding including an adhesive material (or bonding material). In various embodiments, the first supporter 2111 may be defined or interpreted as a separate element from the first frame 211 or the first housing 21. The first cover 212 may be positioned on the rear surface side of the slidable electronic device 2 and may be referred to as a term such as a "first back cover" or a "first rear plate". Various electronic components such as a printed circuit board may be arranged on the first supporter 2111 between, for example, the first supporter 2111 (or the first area (a) of the flexible display module 24) and the first cover 212. In an embodiment, the first cover 212 may be disposed on the first lateral wall part 2112. The first lateral wall 2112 may include, for example, a first cover arrangement area provided corresponding to an edge area of the first cover 212. The first cover arrangement area may correspond to a stepped portion provided on the first lateral wall part 2112 so that the first cover 212 is fitted to and seated the first lateral wall part 2112. For another example, the first cover arrangement area may be provided as a substantially planar area (or planar part). The first cover 212 may be disposed on the first cover arrangement area using screw fastening. For another example, the first cover 212 may be disposed on the first cover arrangement area using snap-fit coupling (e.g., a method in which a hook is fastened to a hook fastening part). For another example, an adhesive material (or bonding material) may be applied between the first cover arrangement area and the edge area of the first cover 212 so as to dispose the first cover 212 on the first lateral wall part 2112. In various embodiments, when viewed from the rear surface of the slidable electronic device 2, the first cover arrangement area may be extended to overlap at least a portion of the first cover 212. In various embodiments, the first cover arrangement area corresponding to the edge area of the first cover 212 may be provided by the first supporter 2111. A portion of an outer surface of the slidable electronic device 2, which is provided by the first lateral wall part 2112, may be smoothly connected to a portion of an outer surface of the slidable electronic device 2, which is provided by the first cover 212. In various embodiments, the first cover 212 may be omitted and the first frame 211 may be provided in a form further including a portion corresponding to the first cover 212. In various embodiments, the first cover 212 may be defined or interpreted as a separate element from the first housing 21.

According to an embodiment, the second housing 22 may include a second frame (e.g., a second frame structure, a second framework, or a second case) 221, a second cover 222 disposed on the second frame 221, and/or a third cover 223 disposed on the second frame 221. The second frame 221 may be provided as an integrated member or structure including the second supporter 2211 and the second lateral wall part 2212. For another example, the second supporter 2211 may be provided separately from the second lateral wall part 2212 and may be connected to the second lateral wall part 2212 using a method such as screw fastening (or volt fastening). The second lateral wall part 2212 may be extended from an edge of the second supporter 2211. Due to combination of the second supporter 2211 and the second lateral wall part 2212, the second housing 22 may have a space for receiving the first housing 21. The second lateral wall part 2212 may include a fourth lateral wall 204, a fifth lateral wall 205, and/or a sixth lateral wall 206. The fourth lateral wall 204 may be positioned spaced apart from the first lateral wall 201 in the first direction ① (e.g., the slide-out direction) and may be substantially parallel with the first lateral wall 201. When viewed from the top of the front surface of the slidable electronic device 2 (e.g., viewed in the −z-axis direction), the fifth lateral wall 205 may be positioned corresponding to the second lateral wall 202 and extended from one end part of the fourth lateral wall 204 in the second direction ② (e.g., the slide-in direction). The sixth lateral wall 206 may be positioned corresponding to the third lateral wall 203 and extended from the other end of the fourth lateral wall 204 in the second direction ②. When viewed from the top of the front of the slidable electronic device 2, the fifth lateral wall 205 may be substantially parallel with the sixth lateral wall 206 and substantially perpendicular to the fourth lateral wall 204. A distance by which the fourth lateral wall 204 is spaced apart from the first lateral wall 201 in the first direction ②, an area covering the second lateral wall 202 by the fifth lateral wall 205, and an area covering the third lateral wall 203 by the sixth lateral wall 206 may increase in case that the second housing 22 performs slide-in and may be reduced in case that the second housing 22 performs slide-out. According to an embodiment, the second cover 222 may be positioned on the rear surface side of the slidable electronic device 2 and may be referred to as a term such as a "second back cover" or a "second rear plate". The second supporter 2211 may include a third surface substantially facing the front surface of the slidable electronic device 2 and a fourth surface substantially facing the rear surface of the slidable electronic device 2. The second cover 222 may be disposed on the fourth surface of the second supporter 2211. The fourth surface of the second supporter 2211 may include a seating structure for the second cover 222. The seating structure may include, for example, a recess for the second cover 222 to be stably disposed on the second supporter 2211 and the second cover 222 may be inserted into the recess. The second cover 222 may be coupled to the second supporter 2211 using screw fastening. For another example, the second cover 222 may be coupled to the second supporter 2211 using snap-fit fastening. For another example, the second cover 222 may be coupled to the second supporter 2211 using an adhesive material (or bonding material). A portion of an outer surface of the slidable electronic device 2, which is provided by the second supporter 2211, may be smoothly connected to a portion of an outer surface of the slidable electronic device 2, which is provided by the second cover 222. When viewed from the top of the rear surface of the slidable electronic device 2 (e.g., viewed in +z-axis direction), an area in which the first cover 212 and the second cover 222 (or the second supporter 2211) overlap each other may increase when the second housing 22 performs slide-out and may be reduced when the second housing 22 performs slide-in. In various embodiments, the second cover 222 may be omitted and the second supporter 2211 may be provided in a form further including a portion corresponding to the second cover 222. In various embodiments, the second cover 222 may be defined or interpreted as a separate element from the second housing 22. In an embodiment, the third cover 223 may be disposed on the fourth lateral wall 204 and may be referred to as a "side cover". A portion of an outer surface of the slidable electronic device 2, which is provided by the fourth lateral wall 204, may be smoothly connected to a portion of an outer surface of the slidable electronic device 2, which is provided by the third cover 223. In various embodiments, the third cover 223 may be omitted and the second lateral wall part 2212 may be provided in a form further including a portion corresponding to the third cover 223.

According to various embodiments, the second cover 222 may be disposed on the second lateral wall part 2212. The second lateral wall 2212 may include, for example, a second cover arrangement area provided corresponding to an edge area of the second cover 222. The second cover arrangement area may correspond to a stepped portion provided on the second lateral wall part 2212 so that the second cover 222 is fitted to and seated on the second lateral wall part 2212. For another example, the second cover arrangement area may be provided as a substantially planar area (or planar part). The second cover 222 may be disposed on the second cover arrangement area using screw fastening. For another example, the second cover 222 may be disposed on the second cover arrangement area using snap-fit fastening. For another example, an adhesive material (or bonding material) may be applied between the second cover arrangement area and the edge area of the second cover 222 so as to dispose the second cover 222 on the second lateral wall part 2212.

According to an embodiment, in the closed state (see FIG. 2) of the slidable electronic device 2, a portion by the slidable housing 20 of the outer surface of the slidable electronic device 2 may be provided by the first lateral wall 201 and the second housing 22. For example, in the closed state of the slidable electronic device 2, the other portion of the first housing 21 may be covered by the second housing 22 and thus not exposed to the outside. In the closed state of the slidable electronic device 2, a portion of the outer surface of the slidable electronic device 2, which is provided by the first lateral wall 201, may be smoothly connected to a portion of the outer surface of the slidable electronic device 2, which is provided by the second housing 22. When the slidable electronic device 2 is converted from the closed state to the open state (see FIG. 3), a portion by the slidable housing 20 of the outer surface of the slidable electronic device 2 may further include an outer surface area provided by the second lateral wall 202, the third lateral wall 203, and the first cover 212. In various embodiments, in the closed state of the slidable electronic device 2, a portion of the first housing 21 may protrude with respect to the second housing 22 in the second direction ②. Here, in the closed state of the slidable electronic device 2, the portion (e.g., a portion of the second lateral wall 202, a portion of the third lateral wall, and a portion of the first cover 212) of the first housing 21, which protrudes with respect to the second housing 22 in the second direction ② may provide a portion of the outer surface of the slidable electronic device 2.

According to an embodiment, a combination of the first lateral wall part 2112 of the first housing 21 and the second lateral wall part 2212 of the second housing 22 may provide a bezel (or bezel structure, screen bezel, or screen bezel structure) for surrounding the screen. For example, when viewed from the top of the screen of the slidable electronic device 2 (see FIG. 2) in the closed state, a combination of the first lateral wall 201, the fourth lateral wall 204, the fifth lateral wall 205, and the sixth lateral wall 206 may provide a bezel for surrounding the screen. For example, when viewed from the top of the screen of the slidable electronic device 2 (see FIG. 3) in the open state, a combination of the first lateral wall 201, the second lateral wall 202, the third lateral wall 203, the fourth lateral wall 204, the fifth lateral wall 205, and the sixth lateral wall 206 may provide a bezel for surrounding the screen.

According to an embodiment, the slidable electronic device 2 may include a third frame (or third frame structure, third framework, third case, or third supporter) 23 positioned in a space of the second housing 22. The third frame 23 may be connected to the second frame 221 of the second housing 22. The third frame 23 may be connected to, for example, the fifth lateral wall 205 and the sixth lateral wall 206 of the second lateral wall part 2212. When viewed from the top of the rear surface of the slidable electronic device 2 (viewed in the +z-axis direction), the third frame 23 may overlap the second support part 2211. A housing assembly including the second housing 22 and the third frame 23 may be slidably connected to the first housing 21. For example, the mutual sliding between the first housing 21 and the second housing 22 may be substantially interpreted as mutual sliding between the housing assembly including the second housing 22 and the third frame 23 and the first housing 21. A sliding structure (e.g., a sliding structure including a guide rail) for stable mutual sliding may be provided with respect to the first housing 21 and the second housing 22, or the first housing 21 and the third frame 23.

According to an embodiment, the first housing 21 and the third frame 23 may be connected to mutually slide. The second housing 22 may provide an appearance of the slidable electronic device 2 together with the first housing 21 in a movable assembly provided by combining the first housing 21 and the third frame 23 which are slidably connected to each other and the flexible display module 24 drivingly arranged thereto. In various embodiments, the first housing 21 and the second housing 22 may correspond to "external housings" for substantially providing an appearance of the slidable electronic device 2 and the third frame 23 may be defined or interpreted as an "internal housing" or a "third housing" which is positioned and hidden in the slidable electronic device 2 to correspond to the second housing 22.

According to various embodiments, the third frame 23 may be defined or interpreted as a portion of the second housing 22. In this case, a portion including the second frame 221, the second cover 222, and the third cover 223 of the second housing 22 may be referred to as a term such as an "appearance part", a "cover part", or an "appearance housing part", and the third frame 23 may be referred to as another term such as a "support", an "internal support", a "supporter", an "internal supporter", a "support member", an "internal support member", a "support structure", or an "internal support structure" received in the second housing 22.

According to an embodiment, the third frame 23 may include a first support surface (reference numeral "23A" in FIG. 4) facing the front surface of the slidable electronic device 2, a second support surface (reference numeral "23B" in FIG. 4) corresponding to the bending part of the second area ⓑ included in the flexible display module 24, and a third support surface (reference numeral "23C" in FIG. 5) facing the rear surface of the slidable electronic device 2. The first support surface and the second support surface may support the second area ⓑ of the flexible display module 24. In various embodiments, the third frame 23 is a component for supporting the second area ⓑ of the flexible display module 24 and referred to as various terms such as a "display support", a "display support member", a "display support structure", a "display support plate", or a "display support board". A portion of the second area ⓑ for providing the second screen area S2 may be supported by the first support surface. The second support surface may face the bending part of the second area ⓑ and include a curved surface corresponding to the bending part of the second area ⓑ. The second support surface may support the bending part of the second area ⓑ. In an embodiment, various electronic components such as a battery may be arranged on the third support surface. The bending part of the second area ⓑ may be positioned between the second support surface and the fourth lateral wall 204. In an embodiment, a surface of the fourth lateral wall 204 facing the bending part of the second area ⓑ may include a curved surface corresponding to the bending part of the second area ⓑ. When the second housing 22 performs slide-out, at least a portion of the second area ⓑ may be drawn out from a space between the third frame 23 and the second supporter 2211 of the second frame 221 to the outside (e.g., a position regarded as the outside of the slidable electronic device 2) through a curved space between the fourth lateral wall 204 and the second support surface. When the second housing 22 performs slide-in, at least a portion of the second area ⓑ may be inserted into a space between the third frame 23 and the second supporter 2211 of the second frame 221 from the outside through a curved space between the fourth lateral wall 204 and the second support surface.

According to various embodiments, when viewed from the top of the rear surface of the slidable electronic device 2 in a state in which the second area ⓑ of the flexible display module 24 is at least partially inserted into a space between the third frame 23 and the second supporter 2211 of the second frame 221 (e.g., the closed state in FIG. 2), an additional screen in which a portion of the second area ⓑ is visible through the first cover 212 of the first housing 21 may be provided. Here, an area of the second supporter 2211 of the second housing 22, which corresponds to the additional screen, may be provided transparent or translucent. In various embodiments, in case that a member exists between at least a portion of the second area ⓑ and the second supporter 2211 of the second housing 22 in the closed state of the slidable electronic device 2, an area of the member corresponding to the additional screen may include an opening or may be provided transparent or translucent.

According to an embodiment, at least a portion of the first housing 21 or at least a portion of the second housing 22 may include a metal material and/or a non-metal material. The first housing 21 or the second housing 22 may include at least one conductive structure including, for example, a metal material and at least one non-conductive structure including a non-metal material and connected to at least one conductive structure. The metal material included in the first housing 21 or the second housing 22 may be various such as magnesium, a magnesium alloy, aluminum, an aluminum alloy, a zinc alloy, a copper alloy, titanium, an amorphous alloy, metal-ceramic composite material (e.g., cermet), or stainless steel (STS). The non-metal material included in the first housing 21 or the second housing 22 may be various such as ceramic or a polymer. In various embodiments, the first housing 21 and the second housing 22 may include the same metal material or non-metal material. In various embodiments, the first housing 21 and the second housing 22 may include different metal materials or non-metal materials.

According to an embodiment, the at least one conductive part (or conductive area) included in the first housing 21 or the second housing 22 may be electrically connected to a wireless communication circuit (e.g., the wireless communication module 192 in FIG. 1) included in the slidable electronic device 2 to be used as an antenna radiator.

According to an embodiment, in the slidable electronic device 2, a sliding structure which allows the second housing 22 to slide with respect to the first housing 21 may include a sliding driving part to provide a driving force for sliding of the second housing 22 with respect to the first housing 21 from an electrical signal. The sliding driving part may include, for example, a motor and at least one gear drivingly connected to the motor. In case that a signal is produced through an input module included in the slidable electronic device 2, the sliding driving part may provide a driving force for conversion between the closed state (see FIG. 2) and the open state (see FIG. 3) of the slidable electronic device 2. For example, in case that a signal is produced through a hardware button or a software button provided through a screen, the slidable electronic device 2 may be converted from the closed state into the open state or from the open state into the closed state. For another example, in case that a signal is produced from various sensors such as a pressure sensor, the slidable electronic device 2 may be converted from the closed state into the open state or from the open state into the closed state. In case of carrying or holding the slidable electronic device 2 by hand, a squeeze gesture pressurizing a designated section of the slidable electronic device 2 by a portion (e.g., a palm or a finger) of the hand may be detected through a sensor and in response thereto, the slidable electronic device 2 may be converted from the closed state into the open state or from the open state into the closed state. The sliding driving part is not limited to a motor and may include various actuators such as a solenoid or a hydraulic cylinder. The solenoid may include, for example, a coil and a plunger positioned corresponding to the coil and may produce mechanical movement of a plunger in case that a current is supplied to the coil.

According to an embodiment, the slidable electronic device 2 may include at least one of one or more audio modules (e.g., the audio module 170 in FIG. 1), one or more sensor modules (the sensor module 176 in FIG. 1), one or more camera modules (e.g., the camera module 180 in FIG. 1), one or more light-emitting modules, one or more input modules (e.g., the input module 150 in FIG. 1), and/or one or more connection terminal modules (e.g., the interface 177 or the connection terminal 178 in FIG. 1). In various embodiments, the slidable electronic device 2 may omit one of the above-described components or may additionally include another component. Positions or the number of the components may vary.

One of the one or more audio modules may include, for example, a microphone disposed inside the slidable electronic device 2 and a microphone hole 301 provided through the exterior of the slidable electronic device 2 to correspond to the microphone. In the embodiment described above, the microphone hole 301 may be provided through the first lateral wall 201. Positions or the number of audio modules relative to the microphone is not limited to the above-described embodiment and may vary.

One of the one or more audio modules may include, for example, a first speaker disposed inside the slidable electronic device 2 and reproducing multimedia (or reproducing a recording) and a first speaker hole 302 provided through the exterior of the slidable electronic device 2 to correspond to the first speaker. One of the one or more audio modules may include, for example, a second speaker (e.g., a receiver for phone calls) disposed inside the slidable electronic device 2 for phone calls and a second speaker hole 303 (e.g., a receiver hole) provided through the exterior of the slidable electronic device 2 to correspond to the second speaker. In the embodiment described above, the first speaker hole 302 and the second speaker hole 303 may be provided through the first lateral wall 201. Positions or the number of audio modules relative to the speaker may vary. In various embodiments, the microphone hole and the speaker hole may be implemented as one hole. In various embodiments, the audio module relative to the speaker may include a piezo speaker having no speaker hole.

The one or more sensor module may produce, for example, an electrical signal or a data value corresponding to an internal operation state or external environment state of the slidable electronic device 2. In an embodiment, one of the one or more sensor modules may include an optical sensor positioned in the internal space of the slidable housing 20 to correspond to the screen. When viewed from the top of the front surface of the slidable electronic device 2

(e.g., viewed in the −z-axis direction), the optical sensor may be disposed to overlap at least a portion of the screen. In this case, the optical sensor may perform a sensing function while the optical sensor or a position of the optical sensor is not visually distinguished (or exposed). The optical sensor may include, for example, a proximity sensor or an illuminance sensor. In an embodiment, the optical sensor may be disposed on a rear surface of the first area (a) included in the flexible display module 24 or below or beneath the first area (a) and the optical sensor or a position of the optical sensor may be not visually distinguished (or exposed). In various embodiments, the optical sensor may be aligned and positioned in a recess provided on the rear surface of the first area (a) or at least partially inserted into the recess. A partial area of the first area (a) at least partially overlapping the optical sensor may include a different pixel structure and/or wire structure compared to other portions. For example, a partial area of the first area (a) at least partially overlapping the optical sensor may have a different pixel density compared to other portions. A pixel structure and/or wire structure formed on the partial area of the first area (a) at least partially overlapping the optical sensor may reduce loss of light between the outside and the optical sensor. For another example, multiple pixels may not be arranged on the partial area of the first area (a) at least partially overlapping the optical sensor.

According to various embodiments, the optical sensor may be aligned and positioned in an opening provided through the first area (a) of the flexible display module 24 or at least partially inserted into the opening. External light may reach the optical sensor through a transparent cover and the opening provided through the first area (a). The transparent cover may function to protect the flexible display module 24 and include, for example, a flexible film, such as a plastic film (e.g., a polyimide film) or ultra-thin glass (UTG) or a flexible plate.

According to various embodiments, without limitation to the optical sensor such as a proximity sensor or an illuminance sensor, various other sensors may be positioned on a rear surface of the first area (a) of the flexible display module 24 or below or beneath the first area (a), or positioned corresponding to an opening provided through the first area (a). For example, optical, electrostatic, or ultrasonic biometric sensors (e.g., a fingerprint sensor) may be positioned on the rear surface of the first area (a) of the flexible display module 24 or below or beneath the first area (a), or positioned corresponding to an opening provided through the first area (a). In various embodiments, the slidable electronic device 2 may include various other sensors (e.g., a gesture sensor, a gyro sensor, a pressure sensor, a magnetic sensor, an acceleration sensor, a grip sensor, a color sensor, an infrared (IR) sensor, a temperature sensor, or a humidity sensor) and positions thereof may vary.

According to an embodiment, the one or more camera modules may include one or more of lenses, an image sensor, and/or an image signal processor. One of the one or more camera modules may include, for example, a first camera module 304 (e.g., a front camera module) positioned corresponding to the front surface of the slidable electronic device 2. In an embodiment, the first camera module 304 may correspond to the screen to be positioned in the internal space of the housing 20. When viewed from the top of the front surface of the slidable electronic device 2 (e.g., viewed in the −z-axis direction), the first camera module 304 may be disposed to overlap at least a portion of the screen. Here, the first camera module 304 may perform a photographing function while the first camera module 304 or a position of the first camera module 304 is not visually distinguished (or exposed). In an embodiment, the first camera module 304 may be disposed on a rear surface of the first area (a) included in the flexible display module 24 or below or beneath the first area (a) and the first camera module 304 or a position of the first camera module 304 may be not visually distinguished (or exposed). In various embodiment, the first camera module 304 may be aligned and positioned in a recess provided on the rear surface of the first area (a) or at least partially inserted into the recess. The first camera module 304 may include, for example, a hidden display rear camera (e.g., an under display camera (UDC)). A partial area of the first area (a) at least partially overlapping the first camera module 304 may include a different pixel structure and/or wire structure compared to other portions. For example, a partial area of the first area (a) at least partially overlapping the first camera module 304 may have a different pixel density compared to other portions. A pixel structure and/or wire structure formed on the partial area of the first area (a) at least partially overlapping the first camera module 304 may reduce loss of light between the outside and the optical sensor. For another example, multiple pixels may not be arranged on the partial area of the first area (a) at least partially overlapping the first camera module 304.

According to various embodiments, the first camera module 304 may be aligned and positioned in an opening provided through the first area (a) of the flexible display module 24 or at least partially inserted into the opening. External light may reach the first camera module 304 through a transparent cover (e.g., a polyimide film or ultra-thin glass) for protecting the flexible display module 24 from the outside and the opening provided through the first area (a). The opening of the first area (a) aligned or overlapping the first camera module 304 may be provided in a through-hole shape or a notch form. In various embodiments, when viewed from the top of the front surface of the slidable electronic device 2, the first camera module 304 may be positioned corresponding to the camera hole provided through the fourth lateral wall 204. In various embodiments, the slidable electronic device 2 may include a light-emitting module (e.g., a light-emitting diode (LED), an IR LED, or a xenon lamp) for providing state information of the slidable electronic device 2 in a light form. In various embodiments, the light-emitting element may provide a light source associated with an operation of the first camera module 304.

According to an embodiment, the slidable electronic device 2 may include a second camera module 305, a third camera module 306, and/or a light-emitting module 307 (e.g., a flash) positioned on the first housing 21 to correspond to the first cover 212. The first cover 212 may include a first opening (e.g., a first camera hole) provided corresponding to the second camera module 305 (e.g., a first rear camera module), a second opening (e.g., a second camera hole) provided corresponding to the third camera module 306 (e.g., a second rear camera module), and/or a third opening (e.g., a flash hole) provided corresponding to the light-emitting module 307. The second camera module 305 may be positioned in the first housing 21 corresponding to the first opening. The third camera module 306 may be positioned in the first housing 21 corresponding to the second opening. The light-emitting 307 may be positioned in the first housing 21 corresponding to the third opening. In the open state (see FIG. 3) of the slidable electronic device 2, when viewed from the top of the rear surface of the slidable electronic device 2 (e.g., viewed in +z-axis direction), the second camera module 305, the third camera module 306, and the light-emitting module 307 may not overlap a portion including the second supporter 2211 and the second cover 222 of the second housing 22 and may be exposed to the outside. In an embodiment, in the closed state (see FIG. 2) of the slidable electronic device 2, when viewed from the top of the rear surface of the slidable electronic device 2, a portion including the second supporter 2211 and the second cover 222 of the second housing 22 may overlap the second camera module 305, the third camera module 306, and the light-emitting module 307. A portion including the second supporter 2211 and the second cover 222 of the second housing 22 may include a light transmission area 308 corresponding to the second camera module 305, the third camera module 306, and the light-emitting module 307. The light transmission area 308 may overlap the second camera module 305, the third camera module 306, and the light-emitting module 307 in the closed state of the slidable electronic device 2. In the closed state of the slidable electronic device 2, external light may reach the second camera module 305 and the third camera module 306 through the light transmission area 308. In the closed state of the slidable electronic device 2, light output from the light-emitting module 307 may proceed to the outside of the slidable electronic device 2 through the light transmission area 308. In an embodiment, the light-emitting module 307 may include a light source for the second camera module 305 and/or the third camera module 306. The light-emitting module 307 may include, for example, an LED or a xenon lamp. In various embodiments, a portion including the second supporter 2211 and the second cover 222 of the second housing 22 may include an opening in a through-hole shape or a notch shape by replacing the light transmission area 308. The number or positions of rear camera modules or light-emitting modules positioned in the first housing 21 corresponding to the first cover 212 is not limited to the above-described embodiment and may vary. For another example, the second camera module 305 or the third camera module 306 may be omitted. In an embodiment, the second camera module 305 and the third camera module 306 may have different properties (e.g., an angle of view) or functions. Although the dual camera module is described, the disclosure is not limited thereto and may provide an embodiment (e.g., a triple camera module) including more camera modules. In an embodiment, the second camera module 305 or the third camera module 306 may have different properties (e.g., an angle of view) or functions. For another example, the second camera module 305 or the third camera module 306 may provide different angles of view (or lenses having different angles of view) and the slidable electronic device 2 may selectively use the same based on user's selection regarding an angle of view. For example, one of the second camera module 305 or the third camera module 306 may include a wide-angle camera module, a telephoto camera module, a color camera module, a monochrome camera module, or an infrared (IR) camera (e.g., a time of flight (TOF) camera and a structured light camera) module. In various embodiments, the IR camera module may function as at least a portion of a sensor module.

According to an embodiment, the one or more input modules may include a first key input device 309 or a second key input device 310. In the described embodiment, the first key input device 309 may be positioned on the first lateral wall 201 and the second key input device 310 may be positioned on the sixth lateral wall 206. Positions or the number of input modules is not limited to the above-described embodiment and may vary. In various embodiments, the slidable electronic apparatus 2 may not include a portion or the entirety of the key input devices and the excluded key input devices may be implemented as a soft key using a screen. Positions or the number of input modules may vary and in various embodiments, an input module or a key input device may include at least one sensor module.

One of the one or more connection terminal modules (or connector modules or interface terminal modules) may include, for example, a connector (or interface terminal) disposed in the slidable electronic device 2 and a connector hole 311 formed on the exterior of the slidable electronic device 2 corresponding to the connector. In the embodiment described above, the connector hole 311 may be provided through the second lateral wall 202. Positions or the number of connection terminal modules may vary. The slidable electronic device 2 may transmit and/or receive power and/or data to and/or from an external electronic device electrically connected to the connector. In an embodiment, the connector may include an USB connector or an HDMI connector. In various embodiments, the slidable electronic device 2 may include a connection terminal module including an audio connector (e.g., a headphone connector or an ear set connector). One of the one or more connection terminal modules may include, for example, a memory card connector disposed inside the slidable electronic device 2 and a connector hole provided through the exterior of the slidable electronic device 2 corresponding to the connector. In the embodiment described above, the memory card connector may be positioned inside the slidable electronic device 2 corresponding to the first lateral wall 201 and the connector hole may be covered by detachable cover 312.

Figure 4:
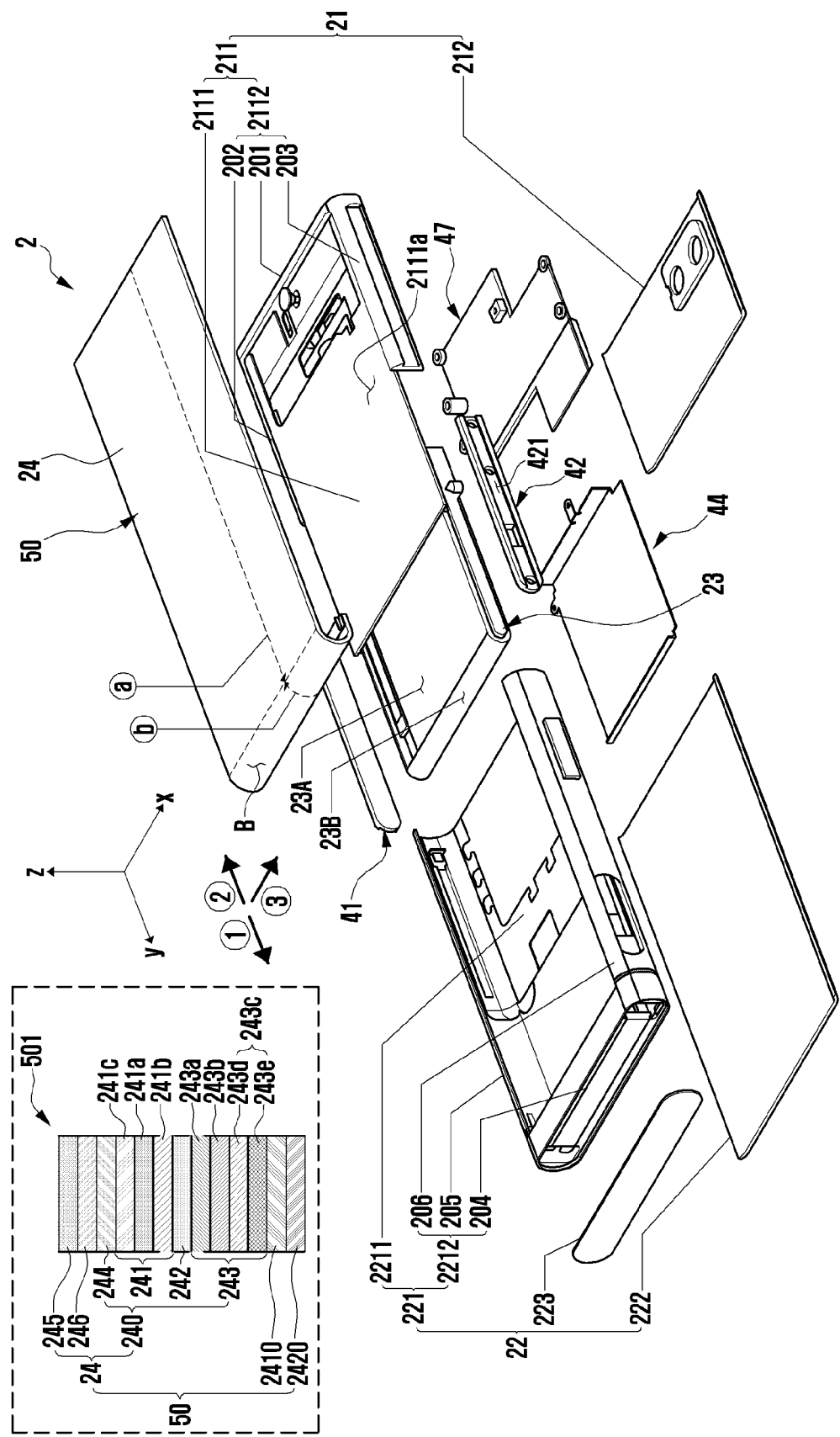
FIG. 4 and FIG. 5 are exploded perspective views of a slidable electronic device according to various embodiments.
Figure 5:
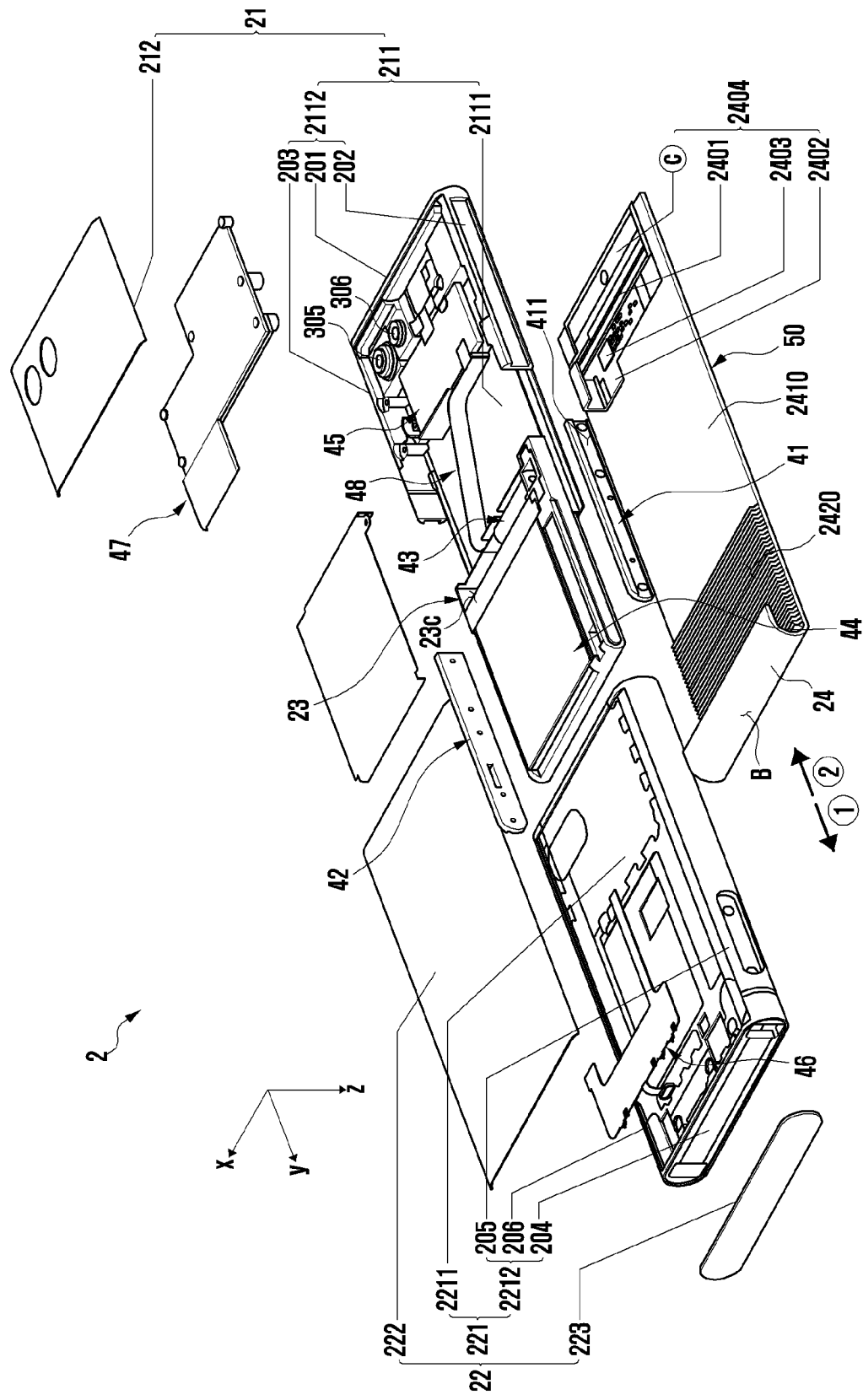
Figure 6:
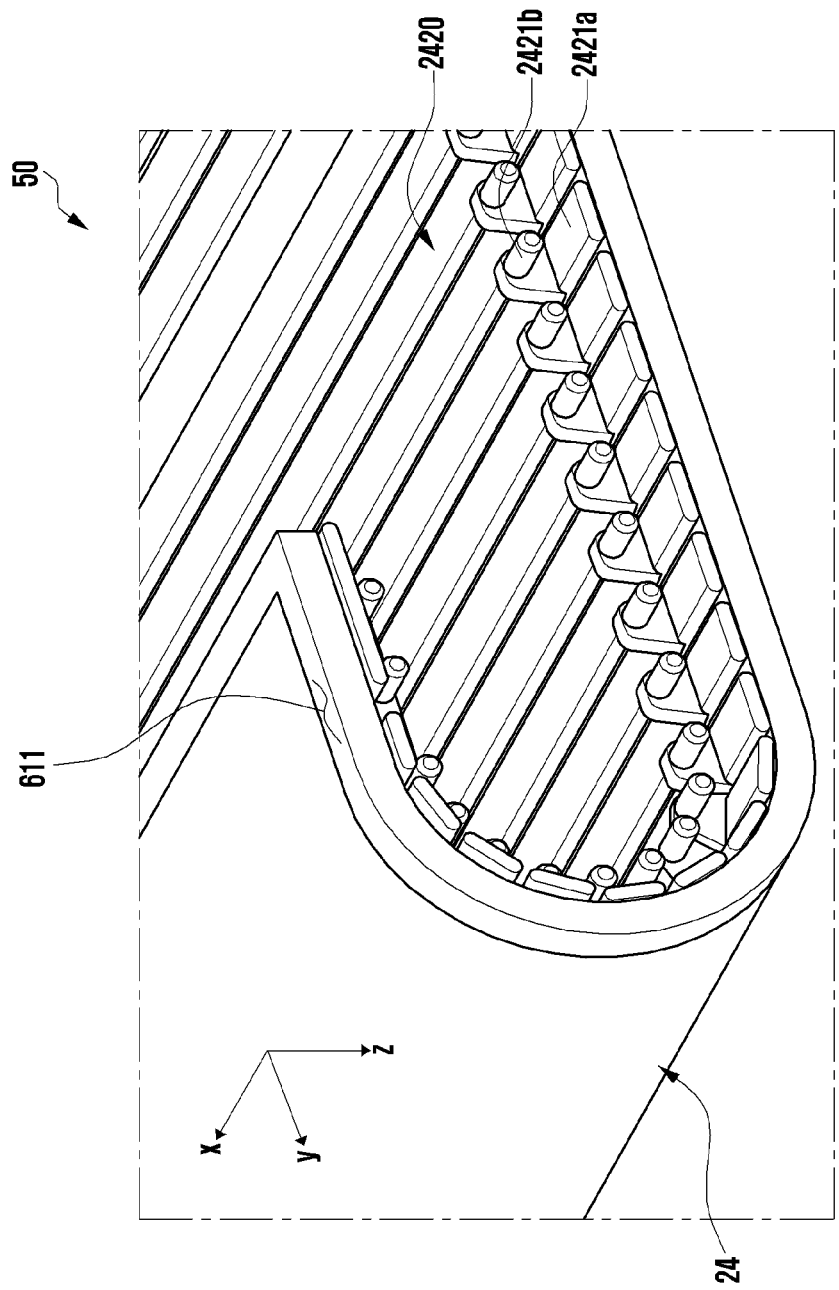
FIG. 6 is a partial perspective view of a display assembly according to various embodiments.
Figure 7:
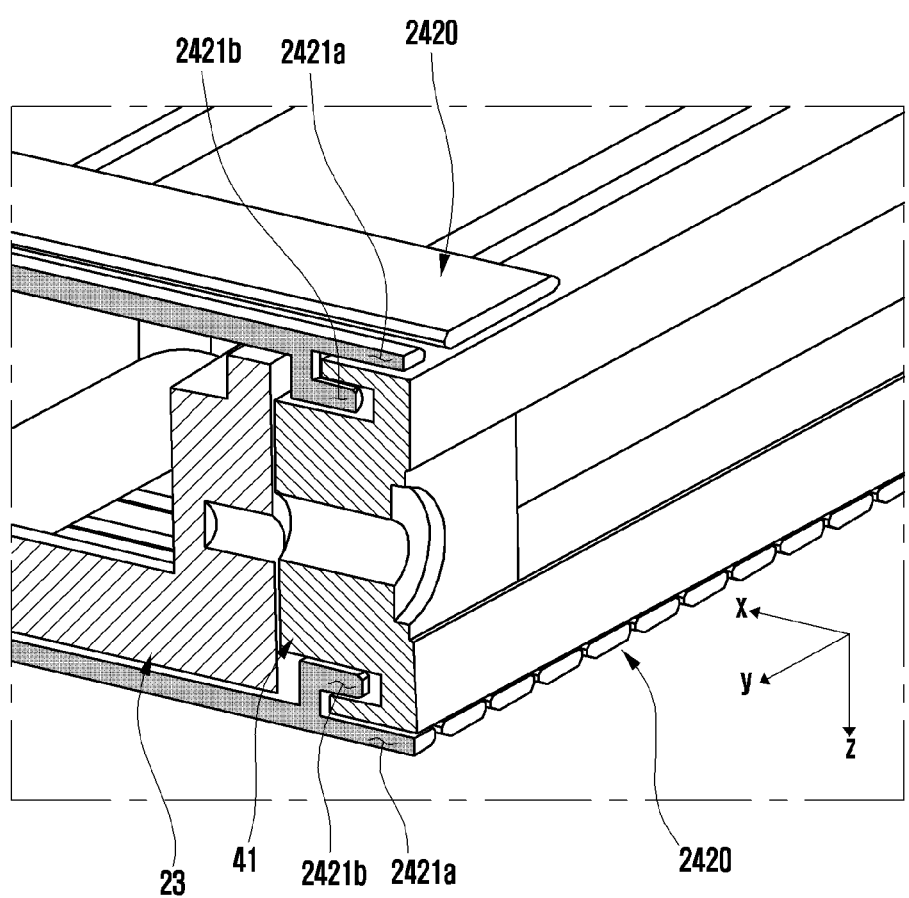
FIG. 7 is a partial sectional perspective view of a slidable electronic device according to various embodiments.
Figure 8:
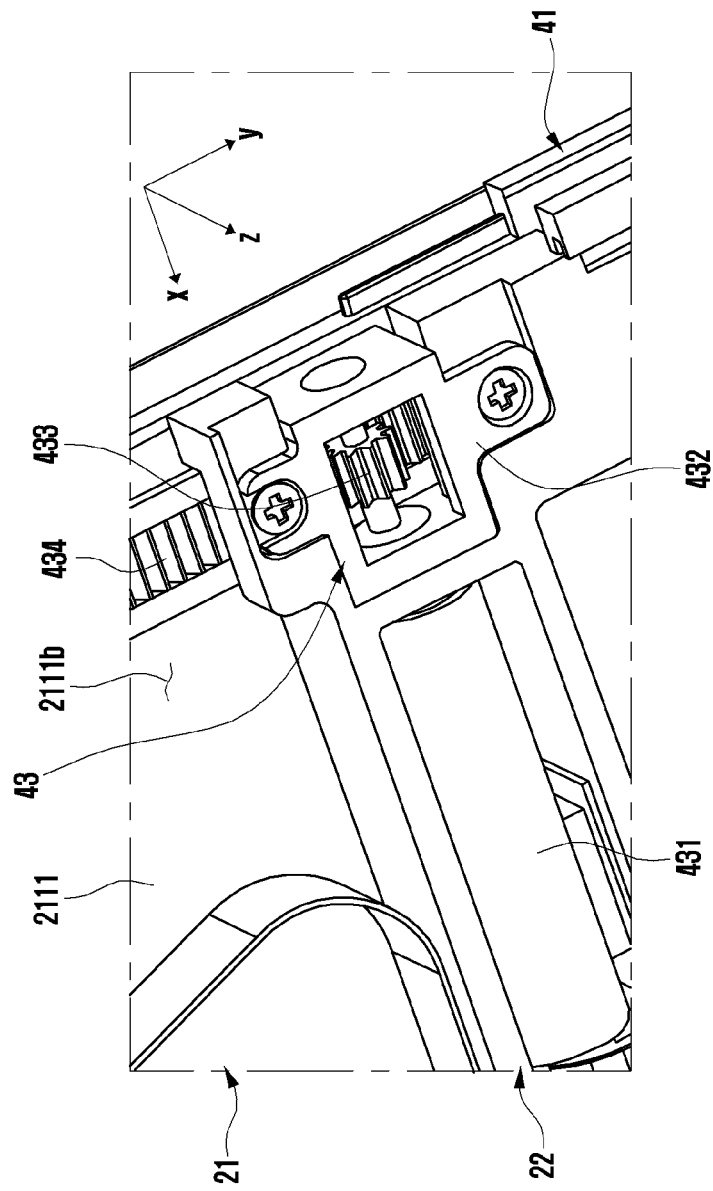
FIG. 8 is a partial perspective view illustrating a first frame of a first housing, a second housing, and a first guide rail according to various embodiments.
Figure 9:
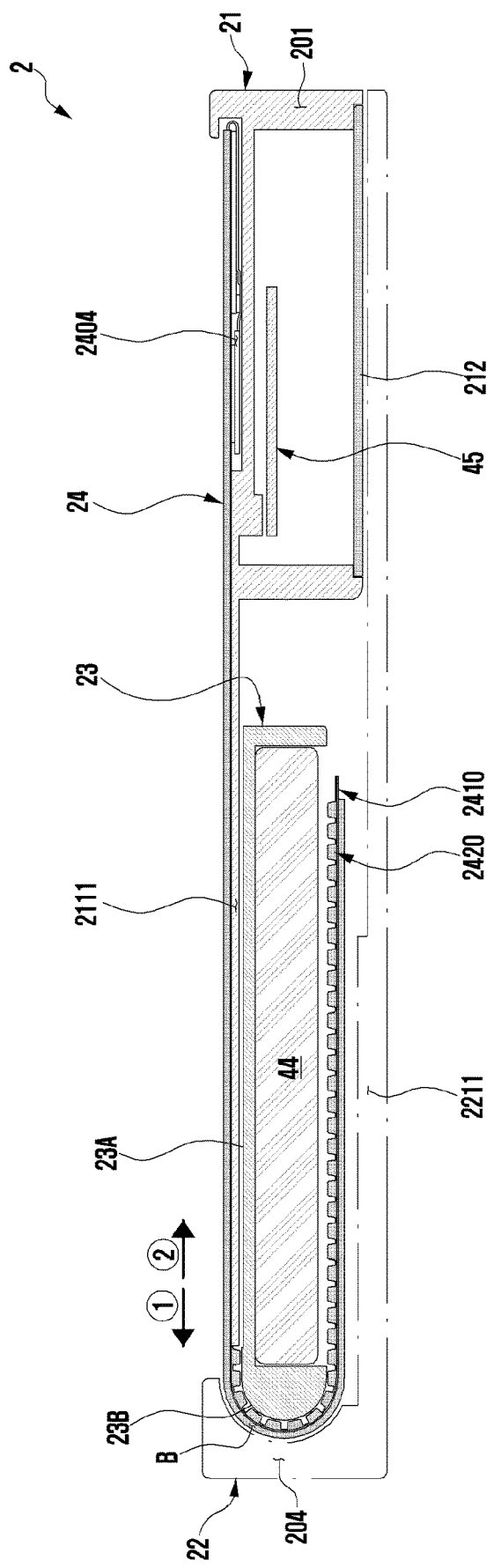
FIG. 9 is a sectional view of a slidable electronic device taken along line A-A' in FIG. 2 according to various embodiments.
Figure 10:
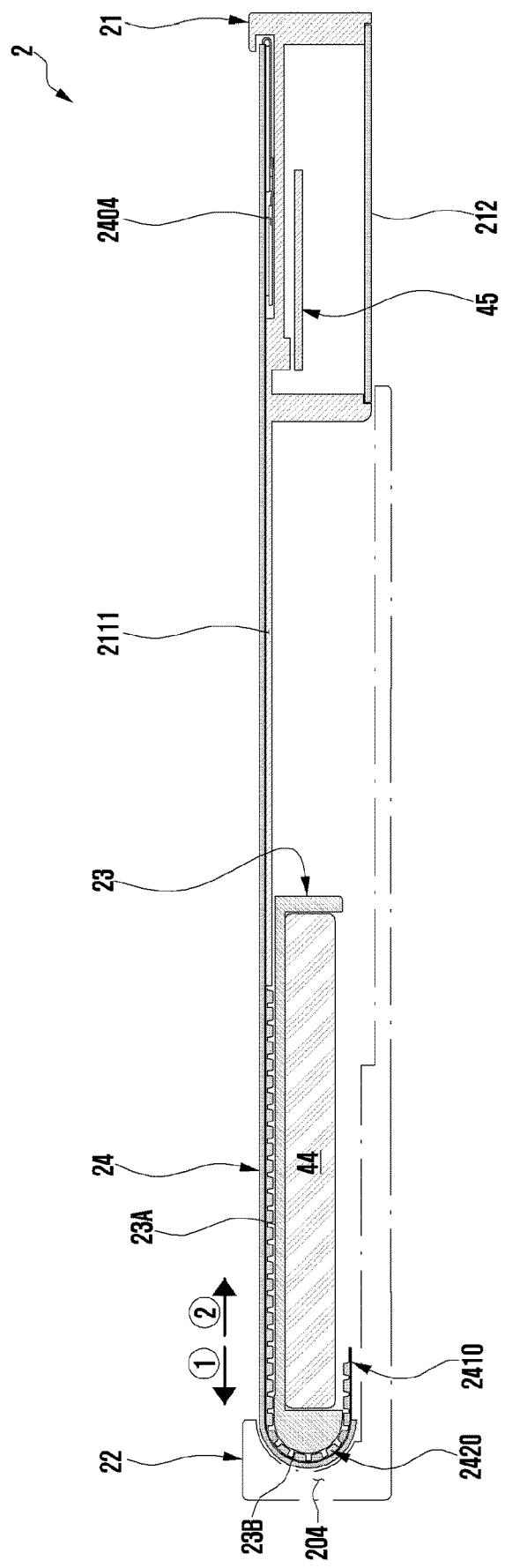
FIG. 10 is a sectional view of a slidable electronic device taken along line B-B' in FIG. 3 according to various embodiments.

FIG. 4 and FIG. 5 are exploded perspective views of a slidable electronic device 2 according to various embodiments. FIG. 6 is a partial perspective view of a display assembly 50 according to various embodiments. FIG. 7 is a partial sectional perspective view of a slidable electronic device 2 according to various embodiments. FIG. 8 is a partial perspective view illustrating a first frame 211 of a first housing 21, a second housing 22, and a first guide rail 41 according to various embodiments. FIG. 9 is a sectional view of a slidable electronic device 2 taken along line A-A' in FIG. 2 according to various embodiments. FIG. 10 is a sectional view of a slidable electronic device 2 taken along line B-B' in FIG. 3 according to various embodiments.

Referring to FIG. 4, FIG. 5, FIG. 6, FIG. 7, FIG. 8, FIG. 9, and FIG. 10, the slidable electronic device 2 may include a first housing 21, a second housing 22, a third frame 23, a display assembly 50, a first guide rail 41, a second guide rail 42, a sliding driving device 43, a battery 44, a first printed circuit board 45, a second printed circuit board 46, a support member 47, and/or a flexible printed circuit board (FPCB) 48.

According to an embodiment, the first frame 211 of the first housing 21 may be provided as an integrated structure including the first supporter 2111 and the first lateral wall part 2112. The first supporter 2111 of the first frame 211 may be positioned inside the slidable electronic device 2 corresponding to the first housing 21. At least a portion of the first supporter 2111 may include a metal material and/or a non-metal material. Electronic components or various members related to electronic components may be arranged on the first frame 211 or supported by the first frame 211. In an embodiment, a first area (a) of a flexible display module 24 may be disposed on the first supporter 2111. The first supporter 2111 may provide a first surface 2111a facing the front surface of the slidable electronic device 2 and the first area (a) of the flexible display module 24 may be disposed on the first surface 2111a. In various embodiments, the first supporter 2111 may be referred to as various terms such as a "bracket", a "support", an "internal support", a "support member", a "support structure", or an "internal support structure". The first supporter 2111 may be defined or interpreted as a portion of the first housing 21 or a separate element from the first frame 21. The first cover 212 may be disposed on the first frame 211 of the first housing 21. The first cover 212 of the first housing 21 may correspond to a plate including, for example, a first front surface facing the front surface of the slidable electronic device 2 and a first rear surface for providing at least a portion of the rear surface of the slidable electronic device 2.

According to an embodiment, the third frame 23 may be drivingly connected to the first housing 21 to be slidable with respect to the first housing 21. The third frame 23 may support the second area ⓑ of the flexible display module 24. At least a portion of the third frame 23 may include, for example, a metal material and/or a non-metal material.

According to an embodiment, the second housing 22 may have a space provided by a combination of the second supporter 2211 of the second frame 221 and the second lateral wall part 2212. The third frame 23 may be positioned in a space of the second housing 22, which is provided by a combination of the second supporter 2211 and the second lateral wall part 2212 and may be coupled to the second frame 221. At least a portion of the second housing 22 may include, for example, a metal material and/or a non-metal material. The second cover 222 and/or the third cover 223 may be disposed on the second frame 221. The second cover 222 may correspond to a plate including, for example, a second front surface facing the front surface of the slidable electronic device 2 and a second rear surface for providing at least a portion of the rear surface of the slidable electronic device 2. In various embodiments, the third cover 223 may be omitted. The second lateral wall part 2312 may be provided in a form further including a portion corresponding to the third cover 223.

According to an embodiment, when viewed from the top of the front surface of the slidable electronic device 2 (e.g., viewed in −z-axis direction), an area in which the first supporter 2111 and the third frame 23 overlap may be reduced when the second housing 22 performs slide-out and may increase when the second housing 22 performs slide-in.

According to an embodiment, the first area ⓐ of the flexible display module 24 may be disposed on the first supporter 2111 of the first housing 21. The first area ⓐ of the flexible display module 24 may be disposed on the first supporter 2111 using, for example, a heat-reactive adhesive material (or heat-reactive bonding material), a light-reactive adhesive material (or light-reactive bonding material), common adhesive (or common bonding agent), a double-sided tape, or an organic adhesive material (or organic bonding material). In various embodiments, the first area ⓐ of the flexible display module 24 may be inserted in to the first frame 211 in the first direction ① in a sliding manner to be disposed in a recess provided on the first surface 2111*a* of the first supporter 2111. Since the first area ⓐ of the flexible display module 24 is disposed on the first housing 21, when the second housing 22 performs slide-out, the second area ⓑ of the flexible display module 24 may be drawn out to the outside (e.g., a position regarded as the outside of the slidable electronic device 2) from a space between the first supporter 2111 and the third frame 23.

According to an embodiment, the third frame 23 may include a first support surface 23A and a second support surface 23B for supporting the second area ⓑ of the flexible display module 24. The first support surface 23A may include a planar area. When viewed from the top of the front surface of the slidable electronic device 2 (e.g., viewed in −z-axis direction), an area in which the first support surface 23A faces the first supporter 2111 of the first housing 21 may be reduced when the second housing 22 performs slide-out and may increase when the second housing 22 performs slide-in. In the closed state (see FIG. 2) or the open state (see FIG. 3) of the slidable electronic device 2 or in sliding of the second housing 22 with respect to the first housing 21, at least a portion of the first support surface 23A which faces and overlap the first supporter 2111 of the first housing 21 may support the first supporter 2111 of the first housing 21. In the open state of the slidable electronic device 2 or sliding of the second housing 22 with respect to the first housing 21, the first support surface 23A may support a portion of the second area ⓑ of the flexible display module 24 for providing a screen. When the second housing 22 performs slide-out, an area of the first support surface 23A, which is not covered by the first supporter 2111 of the first housing 21 and supports the second area ⓑ of the flexible display module 24 may increase. In an embodiment, the second support surface 23B may include a curved surface area (or curved support area). The second support surface 23B may be positioned corresponding to the fourth lateral wall 204. The second support surface 23B may support the bending part B of the second area ⓑ of the flexible display module 24. The bending part B of the flexible display module 24 may be a part which is disposed and maintained in a bended shape of the second area ⓑ so as to allow the second area ⓑ to change a direction and move in case that the second housing 22 slides with respect to the first housing 21. In the slide-out of the second housing 22, the relative positions between the first housing 21 coupled to the first area ⓐ and the second housing 22 corresponding to the second area ⓑ may cause at least a portion of the second area ⓑ to be drawn out to the outside from the inside of the slidable electronic device 2 through a curved space between the fourth lateral wall 204 and the second support surface 23B. In the slide-in of the second housing 22, the relative positions between the first housing 21 coupled to the first area ⓑ and the second housing 22 corresponding to the second area ⓑ may cause at least a portion of the second area ⓑ to be inserted into the inside of the slidable electronic device 2 through a curved space between the fourth lateral wall 204 and the second support surface 23B.

According to various embodiments, in place of a portion of the third frame 23 for providing the second support surface 23B, a rotation member such as a roller or a pulley may be positioned. For example, one end part and other end part of a rotation shaft of the rotation member may be rotatably coupled to the second frame 221 or the third frame 23. In various embodiments, the rotation member may be interpreted as a curved member, a curved support member, or a curved support structure realized to be rotatable based on friction with a display support structure 2420 (e.g., a multi-bar structure).

Reference numeral "501" indicates, for example, a sectional structure with respect to the display assembly 50. In an embodiment, the display assembly 50 may include the flexible display module 24, a support sheet 2410, and/or a display support structure 2420.

According to an embodiment, the flexible display module 24 may include a flexible display 240, a transparent cover 245, and/or an optical transparent adhesive member (or optical transparent bonding member) 246. For example, the flexible display 240 may be coupled to the transparent cover 245 using the optical transparent adhesive member 246 (e.g., an optical clear adhesive (OCA), an optical clear resin (OCR), or a super view resin (SVR)). The transparent cover 245 (e.g., a window) may cover the flexible display 240 to protect the flexible display 240 from the outside. The transparent cover 245 may be realized to have a thin film form (e.g., a thin film layer) having a flexuosity. The transparent cover 245 may include, for example, a plastic film (e.g., a polyimide film) or thin film glass (e.g., ultra-thin film). In various embodiments, the transparent cover 245 may include multiple layers. For example, the transparent cover 245 may have a form in which various coating layers are arranged on a plastic film or thin film glass. The transparent cover 245 may have, for example, a form in which at least one protection layer or coating layer including a polymer material (e.g., polyester (PET), polyimide (PI), or thermoplastic polyurethane (TPU)) is arranged on a plastic film or thin film glass. In various embodiments, the transparent cover 245 and the optical transparent adhesive member 246 may be defined or interpreted as a portion of the flexible display 240. The flexible display 240 may include, for example, a display panel 241, a base film 242, a lower panel 243, or an optical layer 244. The display panel 241 may be positioned between the optical layer 244 and the base film 242. The base film 242 may be positioned between the display panel 241 and the lower panel 243. The optical layer 244 may be positioned between the transparent adhesive member 246 and the display panel 241. Various polymer adhesive materials (or adhesive members) or bonding materials (or bonding members) may be arranged between the display panel 241 and the base film 242, between the base film 242 and the lower panel 243, and/or between the display panel 241 and the optical layer 244. The display panel 241 may include, for example, a light-emitting layer 241a, a thin film transistor (TFT) film (or TFT substrate) 241b, and/or an encapsulation layer (e.g., a thin-film encapsulation (TFE)) 241c. The light-emitting layer 241a may include, for example, multiple pixels realized in a light-emitting element such as an organic light emitting diode (OLED) or a micro LED. The light-emitting layer 241a may be disposed on the TFT film 241b through an organic material evaporation. The TFT film 241b may be positioned between the light-emitting layer 241a and the base film 242. The TFT film 241b may indicate a film structure disposed on a flexible substrate through at least one series of processes such as TFT deposition, patterning, and/or etching. At least one TFT may control a current with respect to a light-emitting element of the light-emitting layer 241a to adjust turn-on or turn-off of a pixel or brightness of a pixel. At least one TFT may be realized in, for example, an amorphous silicon (a-Si) TFT, a liquid crystalline polymer (LCP) TFT, a low-temperature polycrystalline oxide (LTPO) TFT, or a low-temperature polycrystalline silicon (LTPS) TFT. In an embodiment, the display panel 241 may include a storage capacitor and the storage capacitor may maintain a voltage signal in a pixel, maintain a voltage input to a pixel in one frame, or reduce a gate voltage change of the TFT due to a leakage current during a light-emitting time. The storage capacitor may maintain a voltage applied to a pixel at predetermined time intervals by a routine (e.g., initialization or data write) for controlling at least one TFT. In an embodiment, the display panel 241 may be realized based on an OLED and the encapsulation layer 241c may cover the light-emitting layer 241a. Since organic materials and electrodes that emit light in an OLED react very sensitively to oxygen and/or moisture and may lose their light-emitting properties, to reduce or prevent this, the encapsulation layer 241c may seal the light-emitting 241a so that oxygen and/or moisture does not penetrate into the OLED. The base film 242 may include a flexible film formed of plastic or a polymer such as polyimide or polyester (PET). The base film 242 may function to support and protect the display panel 241. In various embodiments, the base film 242 may be referred to as a protective film, a back film, or a back plate. The lower panel 243 may include multiple layers for various functions. Various polymer adhesive members (or bonding members) (not shown) may be arranged between multiple layers included in the lower panel 243. The lower panel 243 may include, for example, a light blocking layer 243a, a buffer layer 243b, and/or a lower layer 243c. The light blocking layer 243a may be positioned between the base film 242 and the buffer layer 243b. The buffer layer 243b may be positioned between the light blocking layer 243a and the lower layer 243c. The light blocking layer 243a may at least partially block light incident from the outside. For example, the light blocking layer 243a may include an embossed layer. The embossed layer may be a black layer including an uneven pattern. The buffer layer 243b may relieve an external impact applied to the flexible display 240. For example, the buffer layer 243b may include a sponge layer or a cushion layer. The lower layer 243c may diffuse, disperse, or dissipate heat produced by the slidable electronic device 2 or the flexible display 240. The lower layer 243c may absorb or block an electromagnetic wave. The lower layer 243c may relieve an external impact applied to the slidable electronic device 2 or the flexible display 240. For example, the lower layer 243c may include a composite sheet 243d or a copper sheet 243e. In an embodiment, the composite sheet 243d may be a sheet obtained by combining and processing layers having different properties. For example, the composite sheet 243d may include at least one of polyimide or graphite. The composite sheet 243d may be replaced by a single sheet including one material (e.g., polyimide or graphite). The composite sheet 243d may be positioned between the buffer layer 243b and the copper sheet 243e. The copper sheet 243e may be replaced by various other metal sheets. In various embodiments, at least a portion of the lower layer 243c may include a conductive member (e.g., a metal plate), help increase strength of the slidable electronic device 2, block peripheral noise, and may be used for dispersing heat emitted from thermal dissipation components (e.g., a display driving circuit) (e.g., a display drive integrated circuit (DDI)) around. The conductive member may include at least one of, for example, copper (Cu), aluminum (Al), stainless steel (SUS), or CLAD (e.g., a stacking member in which SUS and Al are alternately arranged). The lower panel 243c may include various layers for various other functions. In various embodiments (not shown), at least one additional polymer layer (e.g., a layer including PI, PET, or TPU) may be additionally arranged on a rear surface of the display panel 241 in addition to the based film 242. In various embodiments, at least one of multiple layers (e.g., the light blocking layer 243a, the buffer layer 243b, the composite sheet 243d, and the copper sheet 243e) included in the lower panel 243 may be omitted. In various embodiments, an arrangement order of the multiple layers included in the lower panel 243 is not limited to the embodiment described above and may be variously changed. The optical layer 244 may include, for example, a polarizing layer (or polarizer) or a phase retardation layer (or retarder). The polarizing layer and the phase retardation layer may improve outdoor visibility of the screen. The optical layer 244 may selectively pass, for example, light produced by a light source of the display panel 241 and vibrating in a certain direction. In various embodiments, one layer in which the polarizing layer and the phase retardation layer are combined may be provided and the one layer may be interpreted as a "circular polarization layer". The optical transparent adhesive member 246 may be positioned between the transparent cover 245 and the optical layer 244. In various embodiments, the polarization layer (or circular polarization layer) may be omitted and in this case, in place of the polarization layer, a black pixel define layer (PDL) and/or a color filter may be provided. The slidable electronic device 2 may include a touch detection circuit (e.g., a touch sensor) (not shown). The touch detection circuit may be implemented as a transparent conductive layer (or film) based on various conductive material such as indium tin oxide (ITO). In an embodiment, the touch detection circuit may be positioned between the transparent cover 245 and the optical layer 244 (e.g., an add-on type). In an embodiment, the touch detection circuit may be positioned between the optical layer 244 and the display panel 241 (e.g., an on-cell type). In an embodiment, the display panel 241 may include the touch detection circuit or a touch detection function (e.g., an in-cell type). In various embodiments, the display panel 241 may be based on an OLED and may include the encapsulation layer 241c disposed between the light-emitting layer 241a and the optical layer 244. The encapsulation layer 241c may function as a pixel protection layer for protecting multiple pixels of the light-emitting layer 241a. In an embodiment (not shown), the flexible display 240 may include a conductive pattern, such as a metal mesh (e.g., an aluminum metal mesh) as the touch detection circuit disposed on the encapsulation layer 241c between the encapsulation layer 241c and the optical layer 244. For example, in response to bending of the flexible display 240, the metal mesh may have durability greater than that of a transparent conductive layer formed on ITO. In various embodiments, the flexible display 240 may further include a pressure sensor (not shown) for measuring a strength (pressure) of a touch. Multiple layers, or a stacking structure or a stacking order of the multiple layers of the display panel 241 or the lower panel 243 may vary. The flexible display 240 may be realized by omitting some of components or additionally including other components depending on a form of provision or convergence trend.

According to an embodiment, the support sheet (or support plate or support layer) 2410 may be disposed on the rear surface of the flexible display module 24. The rear surface of the flexible display module 24 may indicate a surface positioned opposite to a surface from which light is emitted from the display panel 241 including multiple pixels. For example, the support sheet 2410 may cover at least a portion of the lower panel 243 of the flexible display module 24 and may be disposed (attached) on the rear surface of the lower panel 243. The support sheet 2410 may be coupled to the lower panel 243 using an adhesive material or a bonding material. The support sheet 2410 may be positioned between the lower panel 243 and the display support structure 2420 and the display support structure 2420 may be coupled to the support sheet 2410. The display support structure 2420 may be coupled to the support sheet 2410 using an adhesive material or a bonding material. The adhesive material (or bonding material) between the flexible display 240 and the support sheet 2410 and/or the adhesive material (or bonding material) between the support sheet 2410 and the display support structure 2420 may include, for example, a heat-reactive adhesive material (or heat-reactive bonding material), a light-reactive adhesive material (or light-reactive bonding material), a normal adhesive (or normal bonding agent), or a double-sided tape. For another example, the adhesive material (or bonding material) may include various polymers such as triazine thiol, dithiopyrimitine, or silane-based compounds, or organic adhesive materials (or organic adhesive materials) such as sealants. The support sheet 2410 may contribute to durability (e.g., rigidity reinforcement) of the flexible display module 24. The support sheet 2410 may reduce an effect of weight or stress which may be produced from sliding of the second housing 22 with respect to the first housing 21 on the flexible display module 24. The support sheet 2410 may reduce or prevent damage to the flexible display module 24 by a force transferred during sliding of the second housing 22 with respect to the first housing 21. In an embodiment, the support sheet 2410 may include a metal material. The support sheet 2410 may include, for example, stainless steel. The support sheet 2410 may include various other metals in addition thereto. In various embodiments, the support sheet 2410 may include engineering plastic.

According to an embodiment, the support sheet 2410 may include a lattice structure at least partially overlapping the second area ⓑ of the flexible display module 24. The lattice structure may include, for example, multiple openings (or slits) extending through one surface of the support sheet 2410 facing the display support structure 2420 or the other surface of the support sheet 2410 facing the lower panel 243 of the flexible display module 24. The lattice structure may indicate a pattern structure in which multiple openings are regularly arranged. The multiple openings may be periodically formed, may have substantially the same shape, and may be arranged repeatedly at regular intervals. The lattice structure may contribute to the flexuosity of the second area ⓑ and the second area ⓑ may be more flexible than the first area ⓐ due to the lattice structure. In various embodiments, the lattice structure including multiple openings may be referred to as other terms, such as an "opening pattern", a "hole pattern", or a "lattice pattern". In various embodiments, the support sheet 2410 may include, in place of a lattice structure, a recess pattern (not shown) including multiple recesses. The recess pattern may indicate a pattern structure in which multiple recesses having a concave shape are regularly arranged on a surface of the support sheet 2410 facing the display support structure 2420 or a surface of the support sheet 2410 facing the lower panel 243 of the flexible display module 24. In various embodiments, the lattice structure or the recess pattern may extend to the first area ⓐ of the flexible display module 24. In various embodiments, the support sheet 2410 including the lattice structure or the recess pattern or the conductive member corresponding thereto may include multiple layers. The support sheet 2410 may reduce or prevent components (e.g., the display support structure 2420) disposed inside the slidable electronic device 2 from being visible from the outside of the slidable electronic device 2 through the flexible display module 24. The lattice structure of the support sheet 2410 corresponding to the second area ⓑ of the flexible display module 24 may include multiple openings and may transmit light at a level that causes the display support structure 2420 not to be substantially invisible through the flexible display module 24.

According to various embodiments, the support sheet 2410 may reduce electromagnetic interference (EMI) regarding the flexible display module 24. In various embodiments, the support sheet 2410 may diffuse or dissipate heat emitted from a thermal dissipation component (e.g., a DDI or a display driving circuit such as a DDI chip).

According to an embodiment, the display support structure (or display support member) 2420 may be disposed on or coupled to the support sheet 2410. In case that the support sheet 2410 is omitted, the display support structure 2420 may be disposed on or coupled to the rear surface of the flexible display module 24. The display support structure 2420 may be positioned between the second area ⓑ of the flexible display module 24 and the first surface 2111a of the first support surface 23A of the third frame 23 to support the second area ⓑ. When the second housing 22 performs slide-out, an area of the first support surface 23A of the third frame 23, which is not covered by the first supporter 2111 of the first housing 21 and supports the display support structure 2420 may increase. When the second housing 22 performs slide-in, an area of the first support surface 23A of the third frame 23, which is not covered by the first supporter 2111 of the first housing 21 and supports the display support structure 2420 may decrease. The display support structure 2420 may support the bending part B of the flexible display module 24 between the bending part B of the flexible display module 24 and the second support surface 23B of the third frame 23. When the second housing 22 performs slide-out or slide-in, the second housing 22 and the display support structure 2420 may move in friction with each other.

According to an embodiment, the display support structure 2420 may contribute to providing of a smooth screen by reducing lifting of the screen (see FIG. 2 or FIG. 3) due to elasticity of the flexible display module 24 and/or elasticity of the support sheet 2410. The display support structure 2420 may contribute to the second area ⓑ and the first area ⓐ to maintain a smoothly connected form by supporting the second area ⓑ so that the second area ⓑ of the flexible display module 24 is not lifted, due to elasticity of the flexible display module 24 and/or elasticity of the support sheet 2410. The display support structure 2420 may support the second area ⓑ so that the second area ⓑ of the flexible display module 24 maintains a smoothly connected form with the first area ⓐ of the flexible display module 24. The display support structure 2420 may contribute to smooth movement of the flexible display module 24 during sliding of the second housing 22 with respect to the first housing 21. The display support structure 2420 may contribute, for example, to the second area ⓑ of the flexible display module 24 to be movable while maintaining a smoothly connected form with the first area ⓐ of the flexible display 24 during sliding of the second housing 22 with respect to the first housing 21.

According to an embodiment, the display support structure 2420 may include a multi-bar structure (or multi-bar or multi-bar assembly). The multi-bar structure may include, for example, multiple support bars extending in a third direction ③ perpendicular to the first direction ① (e.g., the slide-out direction) and a direction in which the front surface of the slidable electronic device 2 is directed. The multi-bar structure may include a form in which multiple bars are arranged on one surface of the display support structure 2420, which is positioned opposite to the other surface facing the second area ⓑ of the flexible display module 24. The multi-bar structure may have a flexuosity due to portions having a relatively thin thickness between multiple support bars. In various embodiments, the multi-bar structure may be provided without a portion connecting two support bars adjacent to each other. The multi-bar structure may be referred to as other terms such as a "flexible track". The display support structure 2420 may include a metal material such as stainless steel and/or a non-metal material such as a polymer. The support sheet 2410 corresponding to the second area ⓑ of the flexible display module 24 may provide a lattice structure including multiple openings and may reduce or prevent a phenomenon in which multiple support bars of the multi-bar structure appear to protrude through the flexible display module 24, compared to a comparison example in which the support sheet 2410 is omitted.

According to various embodiments, the display support structure 2420 may function as the support sheet 2410 and in this case, the support sheet 2410 may be omitted.

According to various embodiments, the support sheet 2410 may be defined or interpreted as a display support structure different from the display support structure 2420.

According to various embodiments, the support sheet 2410 may be defined or interpreted as a portion of the display support structure 2420.

According to an embodiment, in order to reduce a friction force between a display support surface (e.g., the first support surface 23A and the second support surface 23B) of the second housing 22 and the display support structure 2420, a lubricant (e.g., grease) may be disposed (e.g., applied) between the display support surface of the second housing 22 and the display support structure 2420. In various embodiments, the display support surface of the second housing 22 or a surface of the display support structure 2420 may be formed of a lubricative coating (e.g., a coating using various lubricative materials such as Teflon).

According to an embodiment, the display assembly 50 or the flexible display module 24 may include the display driving circuit 2401. The display driving circuit 2401 may include, for example, a display drive integrated circuit (DDI) or a DDI chip. The display driving circuit 2401 may be disposed on the flexible display 240 in a chip-on panel (COP) manner. The flexible display module 24 may include a third area ⓒ extending from the first area ⓐ. The third area ⓒ may extend from the first area ⓐ of the flexible display module 24 on the first lateral wall 201 side. The third area ⓒ may be disposed on the support sheet 2410 while bending to be positioned between the support sheet 2410 and the first supporter 2111 of the first housing 21. An adhesive material or a bonding material may be disposed between the third area ⓒ and the support sheet 2410. In case that the support sheet 2410 does not extend to the rear surface of the first area ⓐ or the support sheet 240 is omitted, the third area ⓒ may be disposed on the lower panel 243 of the flexible display 240 using an adhesive material or a bonding material. the display driving circuit 2401 may be disposed on the third area ⓒ. The third area ⓒ may be electrically connected to the first printed circuit board 45 through the flexible printed circuit board 2402. The flexible printed circuit board 2402 may extend through an opening (not shown) provided through the first supporter 2111 of the first housing 21 to be electrically connected to the first printed circuit board 45 disposed on a surface of the first supporter 2111, which faces the rear surface of the slidable electronic device 2. In an embodiment, a touch sensor integrated circuit (IC) 2403 electrically connected to the touch detection circuit included in the flexible display module 24 may be additionally disposed on the flexible printed circuit board 2402. The touch censor IC 2402 may be positioned between the rear surface of the first area ⓐ and the first surface 2111a of the first supporter 2111. In various embodiments, the display driving circuit 2401 may be disposed on the flexible display module 24 in a chip-on film (COF) manner. For example, the third area ⓒ of the flexible display module 24 may correspond to a flexible film substrate connecting the flexible printed circuit board electrically connected to the display panel 241 (see FIG. 4) and the first printed circuit board 45. The display driving circuit 2401 may be disposed on a film substrate. Hereinafter, the third area ⓒ of the flexible display module 24, the display driving circuit 2401, the flexible printed circuit board 2402, and the touch sensor IC 2403 may be combined to be referred to as a "display circuit part 2404".

According to an embodiment, the first guide rail 41 and the second guide rail 42 may guide movement of the display support structure 2420. The first guide rail 41 may include a first rail part having one side of the display support structure 2420 positioned thereon to guide movement thereof. The second guide rail 42 may include a second rail part having the other side of the display support structure 2420 positioned thereon to guide movement thereof. The first rail part and the second rail part may include, for example, a recess for providing a pattern corresponding to a moving path of the display assembly 50 during sliding of the second housing 22 with respect to the first housing 21. The first guide rail 41 may be positioned between the third frame 23 and the fifth lateral wall 205 and disposed on the third frame 23 using a method such as screw fastening. The second guide rail 42 may be positioned between the third frame 23 and the sixth lateral wall 206 and disposed on the third frame 23 using a method such as screw fastening. The first guide rail 41 may be coupled to the fifth lateral wall 205 using a method such as screw fastening. The second guide rail 42 may be coupled to the sixth lateral wall 206 using a method such as screw fastening.

In an embodiment, referring to FIG. 6 and FIG. 7, the multiple support bars included in the display support structure 2420 may include a first supporter 2421*a* supporting a first edge area (or first border area) 611 of the flexible display module 24 positioned corresponding to the first guide rail 41. The multiple support bars may include a first pin 2421*b* extending from the first supporter 2421*a* to be inserted into the first rail part of the first guide rail 41. The multiple support bars may include a second support (not shown) supporting a second edge area (or second border area) of the flexible display module 24 positioned corresponding to the second guide rail 42 and a second pin (not shown) extending from the second support to be inserted into the second rail part of the second guide rail 42. In various embodiments, an integrated metal member or non-metal member including the first supporter 2421*a* and the first pin 2421*b* and an integrated metal member or non-metal member including the second supporter and the second pin may be separately provided to be coupled to a support bar.

According to various embodiments, the fifth lateral wall 205 of the second housing 22 may be realized to include a first guide rail and in this case, the first guide rail 41 may be omitted. The sixth lateral wall 206 of the second housing 22 may be realized to include a second guide rail and in this case, the second guide rail 42 may be omitted.

According to an embodiment, the sliding driving device 43 may include a motor assembly 431, a bracket (or motor bracket) 432, a circular gear (or round gear) 433, and/or a linear gear (or linear gear structure) 434.

According to an embodiment, the motor assembly 431 may provide power (or driving power) for sliding of the second housing 22 with respect to the first housing 21. The motor assembly 431 may be disposed on the third frame 23. The motor assembly 431 may be disposed on a surface of the third frame 23 facing the rear surface of the slidable electronic device 2, for example. The motor assembly 431 may provide power for sliding of the second housing 22 with respect to the first housing 21. The power provided by the motor assembly 431 may cause, when the third frame 23 slides with respect to the first housing 21, a relative location change between the first guide rail 41 and one side part of the display support structure 2420 positioned on the first guide rail 41, and a relative location change between the second guide rail 42 and the other side part of the display support structure 2420 positioned on the second guide rail 42. The flexible display assembly 50 is coupled to the first supporter 2111 of the first housing 21 and thus a relative location change between the first housing 21 and the third frame 23, a relative location change between the first guide rail 41 and one side part of the display support structure 2420, and a relative location change between the second guide rail 42 and the other side part of the display support structure 2420 may act as a force for moving a portion of the display support structure 2420, on which the second area ⓑ of the flexible display module 24 is disposed.

According to an embodiment, the motor assembly 431 may include a motor and a gear structure drivingly connected to the motor. The motor may include, for example, a step motor. The motor may be realized in various types and the configuration thereof is not limited. The gear structure may be drivingly connected to the motor and the circular gear 433, for example, between the motor and the circular gear 433. The gear structure may be connected to a first rotation shaft (or first shaft or input shaft) of the motor. The gear structure may be connected to a second rotation (or second shaft or output shaft) of the circular gear 433 or may include a second rotation shaft connected to the circular gear 433. The first rotation shaft and the second rotation shaft may be substantially parallel with the third direction ③. The rotation center lines of the first rotation shaft and the second rotation shaft may be substantially coincident. In various embodiments, the rotation center lines of the first rotation shaft and the second rotation shaft may be spaced apart to be parallel with each other. In various embodiments, the first rotation shaft and the second rotation shaft may not be parallel with each other and corresponding thereto, the motor assembly 431 may be modified and positioned different from the embodiment described above. For example, the first rotation shaft and the second rotation shaft may be perpendicular (or intersect) to each other and the gear structure may be implemented to transfer power or movement from the first rotation shaft to the second rotation shaft using a conical gear (e.g., a bevel gear). In an embodiment, the gear structure may include a reduction gear. The gear structure may cause, for example, the second rotation shaft to be rotated at a slower rotational speed or a smaller number of rotations than the first rotation shaft. The gear structure may reduce power of the first rotation shaft to increase torque of the second rotation shaft. The gear structure (e.g., the reduction gear) may reduce a speed and increase torque of the second rotation shaft relative to the first rotation shaft so as to contribute to stable sliding of the second housing 22 with respect to the first housing 21. Power for sliding the second housing 22 with respect to the first housing 21 is output from the second rotation shaft and the second rotation shaft may be defined or interpreted as a rotation shaft, a driving shaft, or a power transfer shaft of the sliding driving device 43. In various embodiments, the circular gear 433 may be defined or interpreted as a portion of the gear structure. In various embodiments, the motor may be realized in an integrated form including the gear structure. In various embodiments, the gear structure may be omitted and, in this case, the first rotation shaft of the motor may be connected to the circular gear 433.

According to an embodiment, the motor assembly 431 may be disposed on (or connected to) the third frame 23 using the bracket 432. The bracket 432 may contribute to stably positioning of the motor assembly 431 on the third frame 23. The bracket 432 may contribute to durability with respect to the motor assembly 431. In an embodiment, the bracket 432 may be coupled to the gear structure of the motor assembly 431 and coupled to the third frame 23 using screw fastening. For example, the circular gear 433 may receive the bracket 432 and a rotation shaft of the circular gear 433 may be rotatably supported by the bracket 432. The bracket 432 is an element for stable positioning of the motor assembly 431 on the third frame 23 and may be referred to as various other terms such as a "connection structure", a "connection member", a "motor assembly support member", a "motor assembly support structure", a "motor assembly bracket", or a "frame".

In an embodiment, the circular gear 433 may include a rotation body in a circular cylinder shape or a circular disc shape and multiple gear tooth formed along a circumference of the rotation body. The linear gear 434 may correspond to a gear structure in which multiple gear tooth are linearly arranged in the first direction ① (e.g., the slide-out direction). The linear gear 434 may have, for example, a plate form including one surface including multiple gear tooth and the other surface positioned opposite to the one surface. The linear gear 434 may be disposed between the first housing 21 and the first supporter 2111. The linear gear 434 may be disposed on the second surface 2111b of the first supporter 2111 in various manners, such as screw fastening or bonding. The circular gear 433 and the linear gear 434 may be in an engaged state. The circular gear 433 may perform rotate movement by driving of the motor assembly 431 and the linear gear 434 engaged with the circular gear 433 may perform linear movement. The rotation movement of the circular gear 433 is converted into the linear movement of the linear gear 434 so that sliding between the first housing 21 coupled to the linear gear 434 and the second housing 22 coupled to the motor assembly 431 may be provided. When viewed from the top of the front surface of the slidable electronic device 2 (e.g., viewed in -z-axis direction), an area in which the third frame 23 covers the first supporter 2111 of the first housing 21 and the linear gear 434 disposed on the first supporter 2111 may be reduced when the second housing 22 performs slide-out and may increase when the second housing 22 performs slide-in. In various embodiments, the circular gear 433 may be referred to as a "pinion" or a "pinion gear" and the linear gear 434 may be referred to as a "rack" or a "rack gear". The circular gear 433 and the linear gear 434 may be formed of a material (e.g., a metal or engineering plastic) having rigidity or strength which causes no substantial deformation in response to a force applied to mutual sliding between the first housing 21 and the second housing 22.

According to various embodiments, the first supporter 2111 of the first housing 21 may be provided as an integrated form including the linear gear 434.

According to an embodiment, in order to reduce movement transfer loss or power transfer loss, a lubricant (e.g., grease) may be positioned between the circular gear 433 and the linear gear 434 to secure smooth movement and/or durability between the circular gear 433 and the linear gear 434. In various embodiments, the circular gear 433 and/or the linear gear 434 may be coated with a lubricant (e.g., coating with various lubricative materials, such as Teflon coating) to reduce kinetic friction.

According to various embodiments, the motor assembly 431 and the circular gear 433 may be disposed on the first supporter 2111 of the first housing 21 using the bracket 432 and the linear gear 434 may be disposed on the third frame 23.

According to an embodiment, the slidable electronic device 2 may include a motor driving circuit (e.g., a motor controller) or a motor driver electrically connected to the motor assembly 431. The motor driving circuit may control the motor assembly 431 based on a control signal received from a processor (e.g., the processor 120 in FIG. 1) and a rotation direction, a rotation angle, a rotation amount, a rotation speed, rotation acceleration, or a rotation angular velocity of the circular gear 433 drivingly connected to the motor assembly 431 may be controlled. In an embodiment, the motor driving circuit may include a motor encoder for detecting a driving state of the motor. The motor encoder may include, for example, a circular disc coupled to the rotation shaft of the motor and a detector capable of detecting a rotation direction, a rotation angle, a rotation amount, a rotation speed, rotation acceleration, or a rotation angular velocity of the rotation shaft using an electronically recognizable scale and mark on the circular disc. The processor may control the motor driving circuit based on instructions relative to mutual sliding between the first housing 21 and the second housing 22, which is stored in a memory (e.g., the memory 130 in FIG. 1).

In case that the slidable electronic device 2 is converted from the closed state (see FIG. 2) into the open state (see FIG. 3) or converted from the open state into the closed state, and a sliding speed (or moving speed) of the second housing 22 with respect to the first housing 21 does not become 0 at a completion time point of the state conversion, a collision phenomenon in which the first housing 21 and second housing 22 relatively moving with each other interact strongly in a relatively short period of time may occur. The collision phenomenon may make it difficult to provide a smooth sliding movement to a user or an impact due to the collision phenomenon may damage components (or driving elements) included in the sliding driving device 43. In an embodiment, the slidable electronic device 2 may control a rotation speed of the circular gear 433 to control the motor driving circuit so as to reduce the collision phenomenon. For example, in case that the slidable electronic device 2 is converted from the closed state into the open state or converted from the open state into the closed state, a rotation speed of the circular gear 433 may be controlled to reduce a sliding speed of the second housing 22 with respect to the first housing 21 and stop the second housing at a completion time point of the conversion.

According to an embodiment, the slidable electronic device 2 may include a sliding structure for stable and smooth mutual sliding between the first housing 21 and a second housing 22. The sliding structure may include, for example, a linear motion (LM) guide for connecting the first housing 21 and the second housing 22. Through the LM guide, the second housing 22 may perform smooth and seamless linear movement with respect to the first housing 21 in the first direction ① or the second direction ②. The LM guide may include, for example, a rail, a block, and/or a bearing. The rail may have a bar shape extending from a first end part to a second end part in a sliding direction (e.g., the first direction ①) of the second housing 22 with respect to the first housing 21. The rail and the block may be coupled to be mutually slidable. The bearing may be positioned between the rail and the block and may reduce friction between the rail and the block. The bearing may include, for example, multiple bearing balls and a retainer. In various embodiments, the block may be provided in a form including the bearing. In an embodiment, although not shown, the slidable electronic device 2 may include a first LM guide and a second LM guide. A first end part of a rail of the first LM guide may be coupled to the second lateral wall 202 of the first housing 21 and a block of the first LM guide may be disposed on (or coupled to) a surface of the third frame 23 corresponding to the first guide rail 41. The first guide rail 41 may include a first recess 411 provided corresponding to the rail of the first LM guide. In case that the third frame 23 coupled to the block of the first LM guide performs slide-out or slide-in with respect to the first housing 21 coupled to the rail, the first recess 411 may prevent and/or reduce interference between the first guide rail and the rail of the first LM guide rail. A first end part of a rail of the second LM guide may be coupled to the third lateral wall 203 of the first housing 21 and a block of the second LM guide may be disposed on (or coupled to) a surface of the third frame 23 corresponding to the second guide rail 42. When viewed from the top of the rear surface of the slidable electronic device 2 (e.g., viewed in the +z-axis direction), the first LM guide and the second LM guide may be symmetrically arranged around a center line C (see FIG. 2 and FIG. 3) of the slidable electronic device 2. When viewed from the top of the screen (e.g., viewed in the −z-axis direction), the center line C of the slidable electronic device 2 may be disposed between a second edge E2 and a third edge E3 of the screen and may correspond to a virtual straight line positioned substantially equidistant from the second edge E2 and the third edge E3. The second guide rail 42 may include a second recess 421 provided corresponding to the rail of the second LM guide. In case that the third frame 23 coupled to the block of the second LM guide performs slide-out or slide-in with respect to the first housing 21 coupled to the rail, the second recess 421 may prevent and/or reduce interference between the second guide rail and the rail of the second LM guide. Depending on a relative position between the first housing 21 and the second housing 22, a degree to which the rail of the first LM guide is positioned in the first recess 411 of the first guide rail 41 and a degree to which the rail of the second LM guide is positioned in the second recess 421 of the second guide rail 42 may be changed.

According to various embodiments, the rail of the LM guide may be coupled to the first supporter 2111 of the first housing 21.

According to various embodiments, the rail of the LM guide may be coupled to the third frame 23 and the block of the LM guide may be coupled to the first frame 211 of the first housing 21.

A structure for smooth mutual sliding between the first housing 21 and the second housing 22 may be provided in various manners. The internal space of the slidable electronic device 2 may increase when the second housing 22 performs slide-out and may be reduced when the second housing 22 performs slide-in. Components received in the internal space of the slidable electronic device 2 may be positioned not to interfere mutual sliding of the first housing 21 and the second housing 22.

According to an embodiment, the slidable electronic device 2 may include a tension device for smooth and seamless sliding of the second housing 22 (or the third frame 23) with respect to the first housing 21. The tension device may allow movement and power to be smoothly transferred between driving elements related to sliding of the second housing 22 with respect to the first housing 21 to enable smooth and seamless sliding. The tension device may allow smooth and seamless sliding of the slidable electronic device 2 to reduce a stress effect on the driving elements so as to reduce or prevent damage thereto.

According to an embodiment, the battery 44 may be disposed between the third frame 23 and the second supporter 2211. The battery 44 may be disposed on the third frame 23. For example, the third frame 23 may include a battery seating structure provided on a surface facing the rear surface of the slidable electronic device 2. The battery seating structure may include, for example, a press-fit structure or a recess structure for the battery 44 to be stably positioned on the third frame 23. The battery 44 is a device for supplying power to at least one component of the slidable electronic device 2, and may include, for example, a non-rechargeable primary battery, or a rechargeable secondary battery, or a fuel cell.

According to various embodiments, the slidable electronic device 2 may further include an additional battery disposed on the first housing 21.

According to an embodiment, the first printed circuit board 45 may be disposed between the first supporter 2111 of the first housing 21 and the first cover 212. The first printed circuit board 45 may be disposed on the first supporter 2111 of the first housing 21. A surface of the first supporter 2111 facing the rear surface of the slidable electronic device 2 may provide a board seating structure. The board seating structure may include, for example, a press-fit structure or a recess structure for the first printed circuit board 45 to be stably positioned on the first supporter 2111. The first printed circuit board 45 may be disposed on the board seating structure using various methods such as screw fastening. Various electronic components (e.g., some of the components in FIG. 1) may be arranged on the first printed circuit board 45. Various components electrically connected to the first printed circuit board 45 may be arranged on the first housing 21. For example, components such as the second camera module 305 or the third camera module 306 may be arranged on the first supporter 2111 between the first supporter 2111 and the first cover 212.

According to an embodiment, the second printed circuit board 46 may be disposed between the second supporter 2211 of the second housing 22 and the second cover 222. The second printed circuit board 46 may be disposed on the second supporter 2211 of the second housing 22. A surface of the second supporter 2211 facing the second cover 222 may include a board seating structure. The board seating structure may include, for example, a press-fit structure or a recess structure for the second printed circuit board 46 to be stably positioned on the second supporter 2211. Various electronic components (e.g., some of the components in FIG. 1) may be arranged on the second printed circuit board 46. The first printed circuit board 45 or the second printed circuit board 46 may include, for example, a printed circuit board (PCB), a flexible PCB (FPCB), or a rigid-flexible PCB (RFPCB). The second printed circuit board 46 may be electrically connected to the first printed circuit board using an electrical connection member. The example, the first printed circuit board 45 may be electrically connected to the second printed circuit board 46 through a flexible RF cable (FRC).

According to an embodiment, the support member 47 may be disposed between the first supporter 2111 of the first housing 21 and the first cover 212. The support member 47 may be disposed on the first frame 21 of the first housing 21. The support member 47 may cover and protect at least a portion of the first printed circuit board 45 disposed on the first supporter 2111. In various embodiments, the first frame 211 of the first housing 21 may be referred to as a "front case" and the support member 47 may be referred to as a "rear case". In various embodiments, the support member 47 may be interpreted as a portion of the first housing 21. In an embodiment, the support member 47 may include a metal material and may reduce electromagnetic interference (EMI) relative to components such as the first printed circuit board 45 disposed on the first housing 21. In various embodiments, the support member 47 may include a non-metal material. In various embodiments, a conductive pattern used as an antenna radiator may be disposed on the non-conductive support member 47.

According to an embodiment, the flexible printed circuit board 48 may electrically connect components positioned on the first housing 21 and components positioned on the second housing 22. The flexible printed circuit board 48 may be disposed to be bent according to a relative position between the first housing 21 and the second housing 22.

Figure 11:
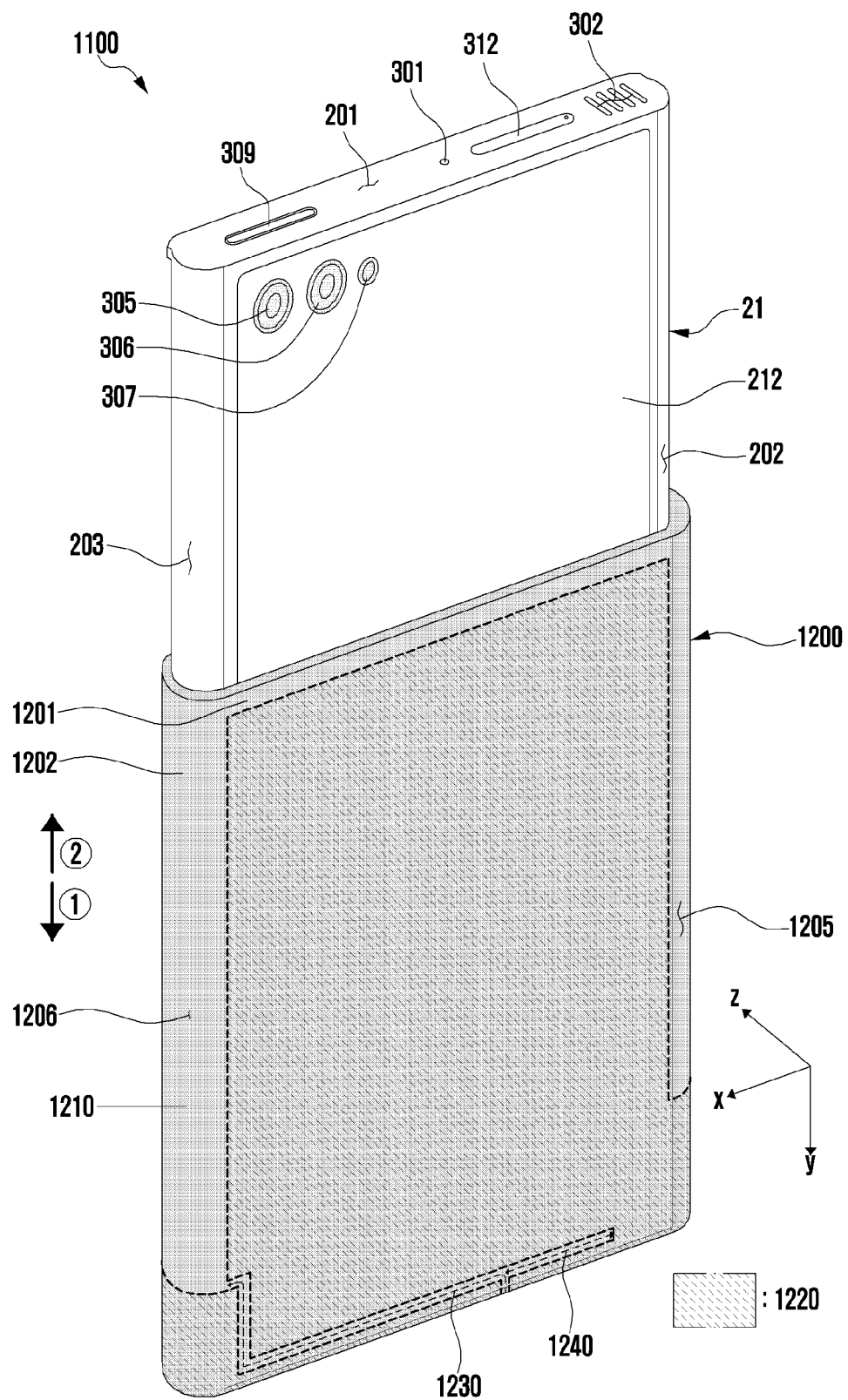
FIG. 11 is a perspective view of a slidable electronic device in an open state according to various embodiments.
Figure 12:
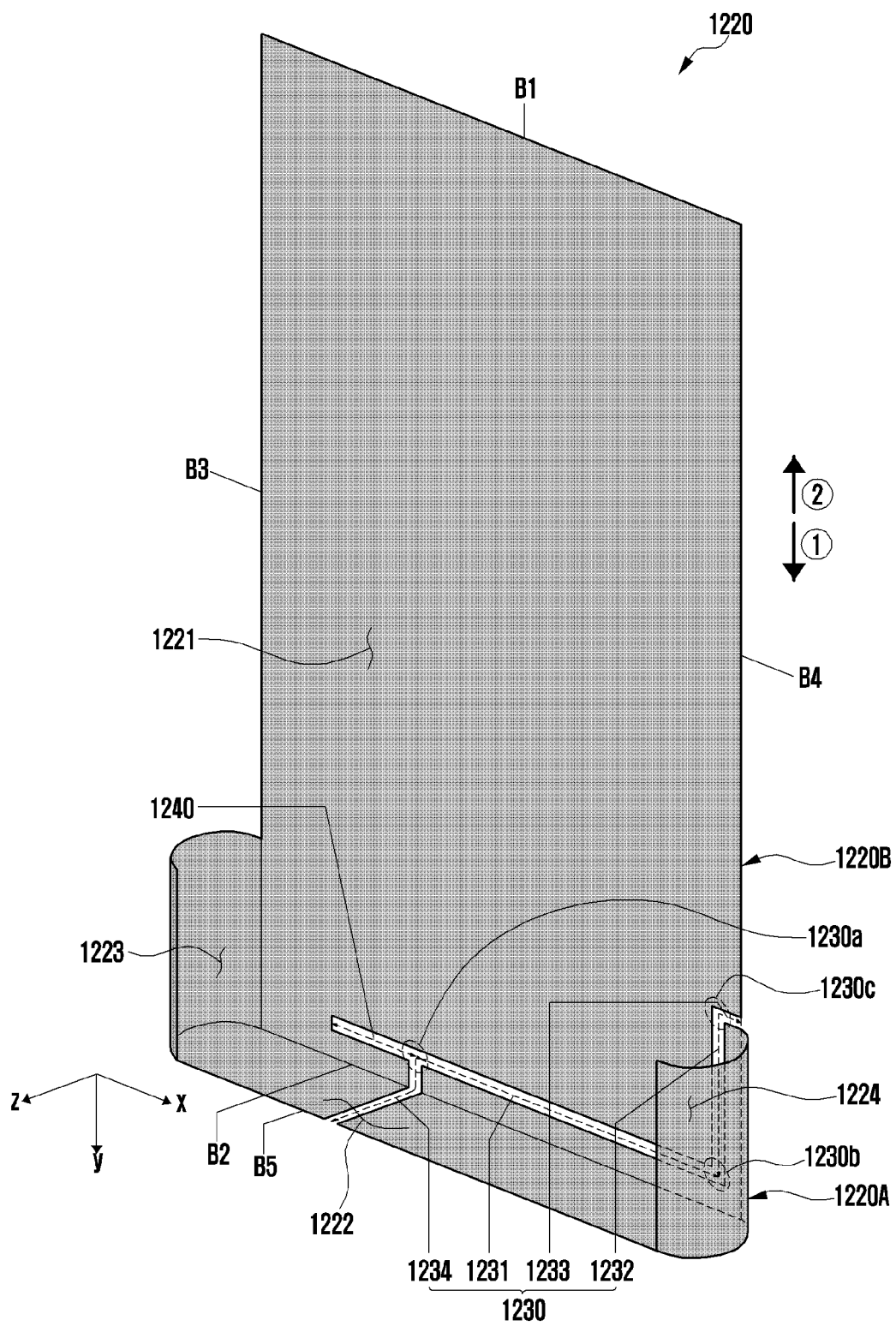
FIG. 12 is a perspective view of a conductive part included in a second housing of a slidable electronic device according to various embodiments.

FIG. 11 is a perspective view of a slidable electronic device 1100 in an open state according to various embodiments. FIG. 12 is a perspective view of a conductive part 1220 included in a second housing 1200 of a slidable electronic device 1100 according to various embodiments.

Referring to FIG. 11 and FIG. 12, the slidable electronic device 1100 may include the second housing 1200 replacing the second housing 22 in FIG. 2 and FIG. 3. The second housing 1200 may include a rear plate area 1201 and a lateral wall area 1202 extending from the rear plate area 1201. The rear plate area 1201 may substantially provide the rear surface of the slidable electronic device 1100 and may correspond to a portion replacing the second supporter 2211 and the second cover 222 of the second housing 1200 in FIG. 4 and FIG. 5. The lateral wall area 1202 may correspond to a portion replacing the second lateral wall part 2212 and the third cover 223 of the second housing 1200 in FIG. 4 and FIG. 5. The lateral wall area 1202 may include a fourth lateral wall (not shown) (e.g., the fourth lateral wall 204 in FIG. 4 and FIG. 5), a fifth lateral wall 1205 (e.g., the fifth lateral wall 205 in FIG. 4 and FIG. 5), and a sixth lateral wall 1206 (e.g., the sixth lateral wall 206 in FIG. 4 and FIG. 5).

According to an embodiment, the second housing 1200 may include a non-conductive part (or non-conduction part, non-conductive structure, non-conductive member, non-metal part, non-metal structure, or non-metal member) 1210 and a conductive part (or conduction part, conductive structure, conductive member, metal portion, metal structure, metal member, conductive pattern, or metal pattern) 1220 coupled to the non-conductive part 1210. The conductive part 1220 may include, for example, at least one conductive area included in the rear plate area 1201, at least one conductive area included in the fourth lateral wall, at least one conductive area included in the fifth lateral wall 1205, and/or at least one conductive area included in the sixth lateral wall 1206.

According to an embodiment, a portion of the outer surface (or the exterior) of the slidable electronic device 1100, which is included in the second housing 1200, may be provided by the non-conductive part 1210. The conductive part 1220 may not be exposed to the outside of the slidable electronic device 1100. For example, at least a portion of the conductive part 1220 may be disposed inside the non-conductive part 1210 or disposed on a surface of the non-conductive part 1210, which is not exposed to the outside of the slidable electronic device 1100.

According to various embodiments, the non-conductive part 1210 may provide a portion of the outer surface of the slidable electronic device 1100 and the conductive part 1220 may provide another portion of the outer surface of the slidable electronic device 1100. In various embodiments, the second housing 1200 may include a coating layer forming the outer surface of the slidable electronic device 1100. The coating layer may reduce or prevent appearing that the non-conductive part 1210 and the conductive part 1220 are distinguished or reduce or prevent that a boundary between the non-conductive part 1210 and the conductive part 1220 is visible.

According to an embodiment, a portion of a conductive area (e.g., a portion of a conductive area included in the conductive part 1220) included in the second housing 1200 may be electrically connected to a wireless communication circuit (e.g., the wireless communication module 192 in FIG. 1) included in the slidable electronic device 1100 to be used as an antenna radiator.

According to an embodiment, a partial conductive area (e.g., a partial conductive area included in the conductive part 1220) included in the second housing 1200 may be used as an antenna ground (or antenna ground area). The antenna ground may contribute to securing of antenna radiation performance, securing coverage, and/or reducing electromagnetic interference (EMI) (or signal loss) with respect to an antenna radiator.

According to an embodiment, the conductive part 1220 of the second housing 1200 may include a first conductive area 1221, a second conductive area 1222, a third conductive area 1223, and/or a fourth conductive area 1224. The first conductive area 1221 may be included in the rear plate area 1201. The second conductive area 1222, the third conductive area 1223, and the fourth conductive area 1224 may be included in the lateral wall area 1202. The second conductive area 1222 may be included in the fourth lateral wall. The third conductive area 1223 may be included in the fifth lateral wall 1205. The fourth conductive area 1224 may be included in the sixth lateral wall 1206. The second conductive area 1222 may be connected to the first conductive area 1221 at a portion in which the rear plate area 1201 and the fourth lateral wall are connected (or meet). The third conductive area 1223 may be connected to the first conductive area 1221 at a portion in which the rear plate area 1201 and the fifth lateral wall 1205 are connected (or meet). The fourth conductive area 1224 may be connected to the first conductive area 1221 at a portion in which the rear plate area 1201 and the sixth lateral wall 1206 are connected (or meet). The third conductive area 1223 may be connected to the second conductive area 1222 at a portion in which the fourth lateral wall and the fifth lateral wall 1205 are connected (or meet). The fourth conductive area 1224 may be connected to the second conductive area 1222 at a portion in which the fourth lateral wall and the sixth lateral wall 1206 are connected (or meet). The third conductive area 1223 or the fourth conductive area 1224 is not limited to the embodiment shown in FIG. 11 and FIG. 12 and may further extend in the second direction ② (e.g., the slide-in direction).

According to an embodiment, the first conductive area 1221 may be disposed at least partially corresponding to (or overlapping) a first outer surface area provided by the rear plate area 1201, which is included in an outer surface of the slidable electronic device 1100 provided by the second housing 1200. The first conductive area 1221 may be provided, for example, as a flat plate substantially parallel with the first outer surface area. The second conductive area 1222 may be disposed at least partially corresponding to (or overlapping) a second outer surface area provided by the fourth lateral wall, which is included in an outer surface of the slidable electronic device 1100 provided by the second housing 1200. The second conductive area 1222 may be provided as a flat plate corresponding to the second outer surface area. In various embodiments, the second outer surface area may be provided as a curved surface having a shape convex in the first direction (or the slide-out direction)

(e.g., the +y-axis direction) and the second conductive area 1222 may be provided as a curved plate corresponding to the second outer surface area. The third conductive area 1223 may be disposed at least partially corresponding to (or overlapping) a third outer surface area provided by the fifth lateral wall 1205, which is included in an outer surface of the slidable electronic device 1100 provided by the second housing 1200. For example, the third outer surface area may be provided as a curved surface convex in the −x-axis direction and the third conductive area 1223 may be provided as a curved plate corresponding to the third outer surface area. In various embodiments, the fifth lateral wall 1205 or the third outer surface area may be provided substantially flat, and in this case, the third conductive area 1223 may be provided as a flat plate corresponding thereto. The fourth conductive area 1224 may be disposed at least partially corresponding to (or overlapping) a fourth outer surface area provided by the sixth lateral wall 1206, which is included in an outer surface of the slidable electronic device 1100 provided by the second housing 1200. For example, the fourth outer surface area may be provided as a curved surface convex in the +x-axis direction and the fourth conductive area 1224 may be provided as a curved plate corresponding to the fourth outer surface area. In various embodiments, the sixth lateral wall 1206 or the fourth outer surface area may be provided substantially flat, and in this case, the fourth conductive area 1224 may be provided as a flat plate corresponding thereto.

According to an embodiment, the first conductive area 1221 may include a first boundary B1, a second boundary B2, a third boundary B3, and/or a fourth boundary B4. The first boundary B1 may be positioned spaced apart from the second boundary B2 in the second direction ②. The third boundary B3 and the fourth boundary B4 may be positioned spaced apart from each other in a direction (e.g., +x-axis direction or the −x-axis direction) perpendicular to the first direction ① (or the second direction ②). The second conductive area 1222 may be connected to the first boundary B1 or may extend from the first boundary B1. The third conductive area 1223 may be connected to the third boundary B3 or may extend from the third boundary B3. The fourth conductive area 1224 may be connected to the fourth boundary B4 or may extend from the fourth boundary B4. The first conductive area 1221 may be provided in various other forms different from the described embodiment and corresponding thereto, at least a portion of the first boundary B1, the second boundary B2, the third boundary B3, or the fourth boundary B4 may be provided in various other forms, as well.

According to an embodiment, the conductive part 1220 of the second housing 1200 may include a first slit 1230. The conductive part (or conductive pattern) 1220 may provide a conductive pattern (or first conductive part) 1220A and a second conductive pattern (or second conductive part) 1220B which are electrically separated from each other due to the first slit 1230. The first conductive pattern 1220A and the second conductive pattern 1220B may be arranged on the non-conductive part 1210 to be physically separated with the first slit 1230 therebetween. The first slit 1230 may be defined or interpreted as a cut formed when at least a portion of a boundary included in the first conductive pattern 1220A and at least a portion of a boundary included in the second conductive pattern 1220B substantially face each other to be spaced apart from each other. For example, a boundary of the first conductive pattern 1220A and a boundary of the second conductive pattern 1220B which correspond to the first slit 1230 may be substantially flat. In various embodiments, a boundary of the first conductive pattern 1220A and a boundary of the second conductive pattern 1220B which correspond to the first slit 1230 may be provided non-parallel on at least a portion thereof.

According to an embodiment, the first conductive pattern 1220A may be electrically connected to a wireless communication circuit (e.g., the wireless communication module 192 in FIG. 1) included in the slidable electronic device 1100 to be used as an antenna radiator. The first conductive pattern 1220A may be provided in a position or area to allow reducing of an electromagnetic effect (e.g., a dielectric loss) caused by a user when the slidable electronic device 1100 is used by the user. The first conductive pattern 1220A may be provided in a position that is less likely to be obscured by a human body when the slidable electronic device 1100 is carried by a user's hand, or the sliding electronic device 1100 is positioned close to a face for a call. In an embodiment, the first conductive pattern 1220A may be disposed as a relatively wide area on the lateral wall area 1202 among the rear plate area 1201 and the lateral wall area 1202 or may be substantially included in the lateral wall area 1202. When viewed from the top of the rear surface of the slidable electronic device 1100 (e.g., viewed in the +z-axis direction), the second housing 1200 may include, for example, an upper end area corresponding to the second direction ② and a lower end area corresponding to the first direction ①. In an embodiment, the first conductive pattern 1220A may be at least partially positioned corresponding to the lower end area of the second housing 1200. For example, the first conductive pattern 1220A may be disposed as a relatively wide area on the fourth lateral wall among the fourth lateral wall, the fifth lateral wall 1205, and the sixth lateral wall 1206 or may be substantially included in the fourth lateral wall. In the described embodiment, the fourth conductive area 1224 may be included in the first conductive pattern 1220A utilized as an antenna radiator and may have a length extending from the second conductive area 1222 in the second direction ② corresponding to the lower end area of the second housing 1200. The first conductive pattern 1220A and the first slit 1230 are not limited to the described embodiment and may be provided in various forms based on an operating frequency band to be supported or a position where antenna radiation performance is less likely to be degraded by a user when the slidable electronic device 1100 is used by the user.

According to an embodiment, the first slit 1230 may include a first part slit 1231, a second part slit 1232, a third part slit 1233, and/or a fourth part slit 1234. The first part slit 1231 is an intermediate part among the first part slit 1232, the second part slit 1232, and the fourth part slit 1234 and may connect the second part slit 1232 and the fourth part slit 1234. The second part slit 1232 is an intermediate part among the first part slit 1231, the second part slit 1232, and the third part slit 1233 and may connect the first part slit 1231 and the third part slit 1233. The first slit 1230 may include a first connection position 1230a in which the first part slit 1231 and the fourth part slit 1234 are connected (or meet), a second connection position 1230b in which the first part slit 1231 and the second part slit 1232 are connected (or meet), and a third connection position 1230c in which the second part slit 1232 and the third part slit 1233 are connected (or meet).

According to an embodiment, the first part slit 1231 may be provided on the first conductive area 1221 and may extend from the first connection position 1230a to the second connection position 1230b. The first part slit 1231 may extend straight along the second boundary B2 of the first conductive area 1221 and may be substantially parallel with the second boundary B2 of the first conductive area 1221. The first part slit 1231 may extend, for example, in a direction (e.g., the +x-axis direction or −x-axis direction) parallel with the first direction ① (or the second direction ②) and perpendicular to a direction in which the front surface of the slidable electronic device 2 faces. The first part slit 1231 may be positioned adjacent to the second boundary B2 of the first conductive area 1221 as shown in the drawing, but is not limited thereto, and may be substantially positioned on the second boundary B2 or positioned on the second conductive area 1222.

According to an embodiment, the second part slit 1232 may be provided on the first conductive area 1221 and may extend from the second connection position 1230b to the third connection position 1230c. The second part slit 1232 may extend straight from the second connection position 1230b to the third connection position 1230c in the second direction ②. The second part slit 1232 may be positioned adjacent to the fourth boundary B4 of the first conductive area 1221 as shown in the drawing, but is not limited thereto, and may be substantially positioned on the fourth boundary B4 or positioned on the fourth conductive area 1224.

According to an embodiment, the third part slit 1233 may be provided on the first conductive area 1221 and may extend from the third connection position 1230c to the fourth boundary B4 of the first conductive area 1221. The third part slit 1233 may include a slit end part provided on the fourth boundary B4 and having an open shape. The open-shaped slit end part does not include a conductive material disposed therein and thus may be defined or interpreted as having a substantially gap. In various embodiments, the second part slit 1232 may be substantially positioned on the fourth boundary B4 of the first conductive area 1221 and in this case, the third part slit 1233 may be omitted.

According to an embodiment, the fourth part slit 1234 may extend from the first connection position 1230a to the second conductive area 1222. The second conductive area 1222 may include a fifth boundary B5 positioned spaced from the second boundary B2 of the first conductive area 1221 in a direction to which the front surface of the slidable electronic device 1100 is directed. The third part slit 1233 may include a slit end part provided on the fifth boundary B5 and having an open shape.

According to an embodiment, the first part slit 1231 may have a first width extending in the +y-axis direction or the −y-axis direction. The second part slit 1232 may have a second width extending in the +x-axis direction or the −x-axis direction. The third part slit 1233 may have a third width extending in the +y-axis direction or the −y-axis direction. The fourth part slit 1234 may have a fourth width extending in the +x-axis direction or the −x-axis direction. The first width, the second width, the third width, and the fourth width may have substantially the same value. For another example, one of the first width, the second width, the third width, and the fourth width may have a value different from another.

According to an embodiment, due to the first slit 1230 provided on the conductive part 1220, the first conductive pattern 1220A may include a portion of the first conductive area 1221, a portion of the second conductive area 1222, and the fourth conductive area 1224. In various embodiments, a shape or position of the first slit 1230 and the first conductive pattern 1220A based thereon may be provided differently from the described embodiment.

According to an embodiment, the wireless communication circuit (e.g., the wireless communication module 192 in FIG. 1) may provide a radiation current (or electromagnetic signal or wireless signal) to the first conductive pattern 1220A. Due to a path through which the radiation current flows in the first conductive pattern 1220A and/or distribution of the radiation current, an electromagnetic field (or radiation field) capable of transmitting and/or receiving a signal having at least one frequency in a corresponding frequency band may be provided by the first conductive pattern 1220A. The wireless communication circuit may process a transmission signal or reception signal in at least one selected or designated frequency band through the first conductive pattern 1220A. For example, the selected or designated frequency band may include at least one of a low band (LB) (about 600 MHz to about 1 GHz), a middle band (MB) (about 1 GHz to about 2.3 GHz), a high band (HB) (about 2.3 GHz to about 2.7 GHz), or an ultra-high band (UHB) (about 2.7 GHz to about 6 GHz). The selected or designated frequency band may include various other frequency bands.

According to an embodiment, in case that the wireless communication circuit (e.g., the wireless communication module 192 in FIG. 1) provides a radiation current (or electromagnetic signal or wireless signal) to the first conductive pattern 1220A, the first conductive pattern 1220A resonates with the second conductive pattern 1220B so that the conductive part 1220 including the first conductive pattern 1220A and the second conductive pattern 1220B may operate as an antenna (or resonator) radiating in a selected or designated frequency band. The first conductive pattern 1220A may operate as an antenna radiator (or radiation part) for transmitting an electromagnetic signal provided from the wireless communication circuit to the outside or receiving an electromagnetic signal from the outside and the second conductive pattern 1220B may operate as an antenna ground (or grounding part or ground plane). The second conductive pattern 1220B used as an antenna ground may contribute to securing of antenna radiation performance, securing coverage, and/or reducing electro-magnetic interference (EMI) (or signal loss) with respect to the first conductive pattern 1220A used as an antenna radiator.

According to an embodiment, the second conductive pattern 1220B may be provided in a form capable of reinforcing an antenna ground with respect to the first conductive pattern 1220A for transmitting and/or receiving a signal in a selected or designated frequency band. The second conductive pattern 1220B may be provided in a form capable of operating as well as possible as an antenna ground or capable of reinforcing the antenna ground with respect to the first conductive pattern 1220A used as an antenna radiator. A method in which the second conductive pattern 1220B used as an antenna ground is included in the second housing 1200 may reduce restrictions on a shape or size thereof to reduce variations in an electromagnetic effect (e.g., an antenna ground effect) on the first conductive pattern 1220A from the second conductive pattern 1220B with respect to a state change of the slidable electronic device 1100. The state change of the slidable electronic device 1100 may include, for example, conversion between the closed state in FIG. 2 and the open state in FIG. 3, slide-out of the second housing 22, or slide-in of the second housing 22. The second conductive pattern 1220B (e.g., a ground plane) may be implemented to be provided in a form to allow a radiation pattern (or beam pattern) by the first conductive pattern 1220A to secure or enhance frequency transmission and reception performance. For example, the second conductive pattern 1220B may be provided in a form capable of reducing a ripple effect to enhance a radiation property.

According to an embodiment, the second conductive pattern 1220B used as an antenna ground may be provided in a form capable of reducing a difference between antenna radiation performance with respect to the first conductive pattern 1220A in the closed state (see FIG. 2) of the slidable electronic device 1100 and antenna performance with respect to the first conductive pattern 1220A in the open state (see FIG. 3) of the slidable electronic device 1100.

According to an embodiment, the second conductive pattern 1220B used as an antenna ground may be provided in a form capable of reducing a difference between an effect (e.g., an antenna ground effect) on the first conductive pattern 1220A used as an antenna radiator in the closed state of the slidable electronic device 1100 and an effect on the first conductive pattern 1220A in the open state of the slidable electronic device 1100.

According to an embodiment, in case that the wireless communication circuit (e.g., the wireless communication module 192 in FIG. 1) provides a radiation current (or electromagnetic signal) to the first conductive pattern 1220A, an electromagnetic field (e.g., a radiation field) may be produced on the first conductive pattern 1220A due to an electromagnetic force and an effect of the electromagnetic field may cause the second conductive pattern 1220B to be charged. The charged second conductive pattern 1220B may provide a current path (or surface current distribution) causing an electromagnetic effect (e.g., electromagnetic force, or reflection of radio waves) to secure or enhance antenna radiation performance of the electromagnetic field produced on the first conductive pattern 1220A.

According to an embodiment, the second conductive pattern 1220B operating as an antenna ground may provide an electrical length (e.g., a length for wavelength) corresponding to a frequency band that the first conductive pattern 1220A operating as an antenna radiator transmits and receives. In case of having an electrical length corresponding to a frequency band that the first conductive pattern 1220A transmits and receives, the second conductive pattern 1220B may have a property (or antenna ground property) capable of causing a substantial effect (e.g., an electromagnetic force) on securing or enhancing of antenna radiation performance with respect to the frequency band. For example, in case of having an electrical length corresponding to a frequency band that the first conductive pattern 1220A transmits and receives, the second conductive pattern 1220 may reduce or prevent a ripple effect with respect to a radiation pattern provided by the first conductive pattern 1220A. The electrical length provided by the second conductive pattern 1220B may correspond to a natural resonance frequency (or natural frequency) of the second conductive pattern 1220B. The natural resonance frequency of the second conductive pattern 1220B may be determined according to physical properties such as a shape, material, and density of the second conductive pattern 1220B and thus may be realized based on the physical properties of the second conductive pattern 1220B.

According to an embodiment, the second conductive pattern 1220B may be disposed as a relatively wide area on the rear plate area 1201 among the rear plate area 1201 and the lateral wall area 1202 or may be substantially included in the rear plate area 1201. In order to reduce degradation of antenna radiation performance with respect to the first conductive pattern 1220A or to secure or enhance a radiation property with respect to the first conductive pattern 1220A, a position or form of the second conductive pattern 1220B is not limited to the described embodiment and may vary. For example, although the third boundary B3 has a straight-line shape in the described embodiment but is not limited thereto, and a portion of the third boundary B3 not corresponding to the third conductive area 1223 may be provided in a different form. For example, although the fourth boundary B4 has a straight-line shape in the described embodiment but is not limited thereto, and a portion of the fourth boundary B4 not corresponding to the fourth conductive area 1224 may be provided in a different form. For example, although the first boundary B1 has a straight-line shape substantially parallel with the second boundary B2 in the described embodiment but is not limited thereto, and may be provided in various other different forms. For example, the third conductive area 1223 included in the second conductive pattern 1220B is not limited to the described embodiment and may further extend. For example, the second conductive pattern 1220B may further include a fifth conductive area extending from the fourth boundary B4 and included in the sixth lateral wall 1206.

According to various embodiments, the second conductive pattern 1220B may be provided in a form additionally including at least one opening. When viewed from the top of the rear surface of the slidable electronic device 1100 (e.g., viewed in the +z-axis direction), the at least one opening included in the second conductive pattern 1220B may have a form of a hole or slit surrounded by a conductive material. For another example, when viewed from the top of the rear surface of the slidable electronic device 1100, the at least one opening included in the second conductive pattern 1220B may include a notch or slit (e.g., a slit having an open slit end part) provided corresponding to the first boundary B1, the third boundary B3, or the fourth boundary B4.

According to an embodiment, the second conductive pattern 1220B (e.g., an antenna ground or ground plane) may further include a second slit 1240 extending from the first slit 1230. The second slit 1240 may extend from the first connection position 1230a of the first slit 1230 in a direction from the sixth lateral wall 1206 to the fifth lateral wall 1205 (e.g., the −x-axis direction), for example. A form of the second conductive pattern 1220B and an electrical length or natural resonance frequency of the second conductive patter 1220B according thereto may be at least determined by the first slit 1230 and the second slit 1240. In various embodiments, the second slit 1240 may be provided in a shape different from the described embodiment or may be omitted. In various embodiments, the second conductive pattern 1220B may further include another slit extending from a different position of the first slit 1230.

According to an embodiment, the first conductive pattern 122A or the second conductive pattern 1220B may include various metal materials such as magnesium, a magnesium alloy, aluminum, an aluminum alloy, a zinc alloys, a copper alloy, titanium, an amorphous alloy, a metal-ceramic composite (e.g., a cermet), or stainless steel.

According to an embodiment, the first conductive pattern 122A and the second conductive pattern 1220B may include the same metal material.

According to various embodiments, the first conductive pattern 122A and the second conductive pattern 1220B may include different metal materials.

According to an embodiment, the non-conductive part 1210 of the second housing 1200 may include a portion disposed in the first slit 1230 and the second slit 1240. A portion of the non-conductive part 1210, which is disposed in the first slit 1230 may physically separate the first conductive pattern 122A and the second conductive pattern 1220B and may be defined or interpreted as an "insulation area", an "insulation part", or a "segmentation".

Figure 13:
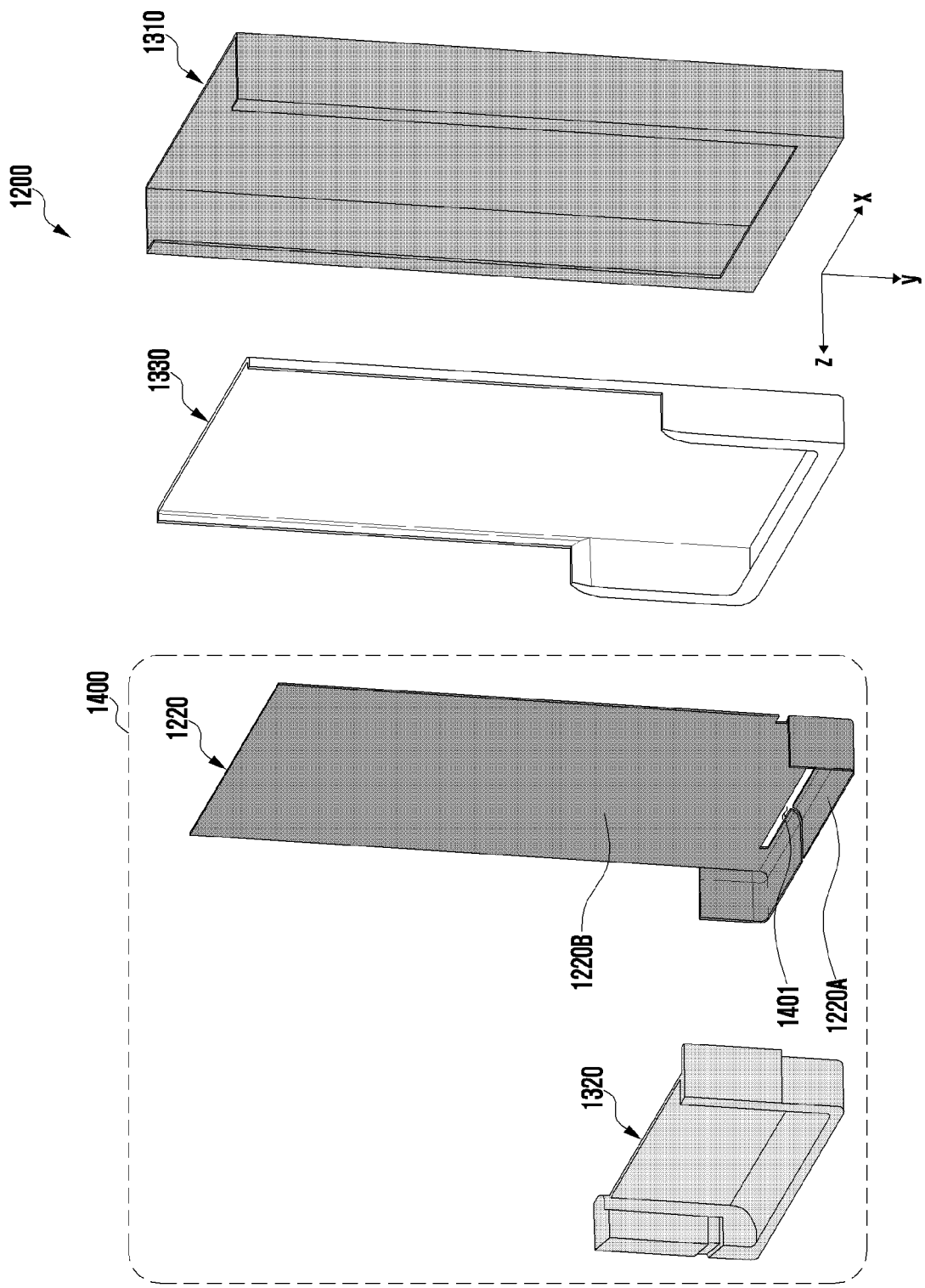
FIG. 13 is an exploded perspective view of a second housing according to various embodiments.

According to various embodiments, the second housing 22 included in the slidable electronic device 2 in FIG. 4 and FIG. 5 may be realized to substantially provide the non-conductive part 1210 and the conductive part 1220 according to the embodiment of FIG. 12 and FIG. 13. For example, the second frame 221 of the second housing 22 may include a non-conductive first part corresponding to the non-conductive part 1210 and a conductive second part corresponding to the conductive part 1220. Here, the second frame 221 may be provided in a form further including a portion corresponding to the second cover 222 and the third cover 223 in place of the second cover 222 and the third cover 223, or the second cover 222 and the third cover 223 may be formed of a non-conductive material. In various embodiments, a portion corresponding to the conductive part 1220 may be positioned between the second frame 221 and the second cover 222.

Figure 14:
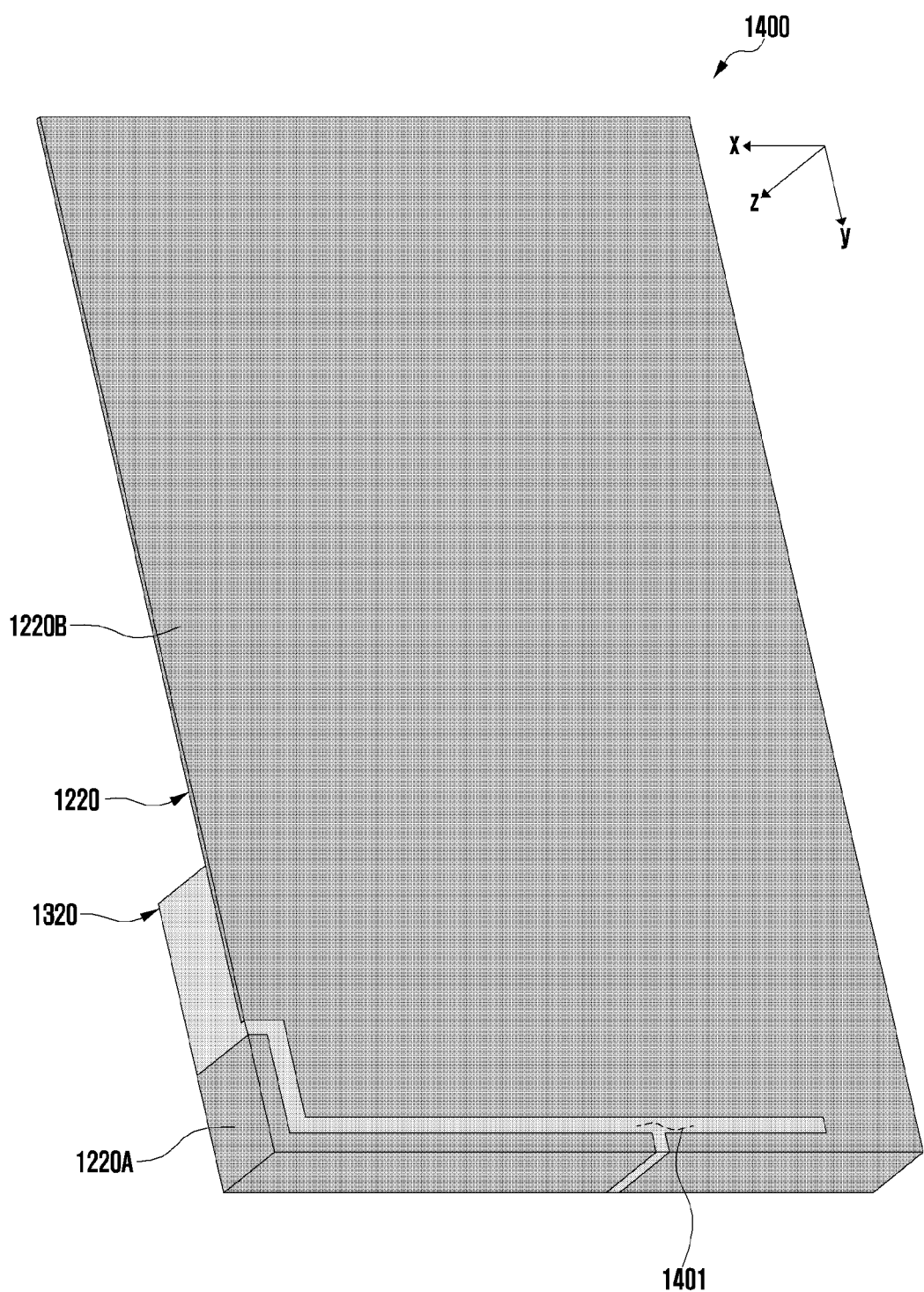
FIG. 14 is a perspective view of a structure including a second non-conductive part and a conductive part according to various embodiments.

FIG. 13 is an exploded perspective view of a second housing 1200 according to various embodiments. FIG. 14 is a perspective view of a structure 1400 including a second non-conductive part 1320 and a conductive part 1220 according to various embodiments.

Referring to FIG. 13 and FIG. 14, in an embodiment, the second housing 1200 may include a first non-conductive part (or first non-conductive part, first non-conductive structure, first non-conductive member, first non-metallic part, first non-metallic structure, or first non-metallic member) 1310, a second non-conductive part (or second non-conductive part, second non-conductive structure, second non-conductive member, second non-metallic part, second non-metallic structure, or second non-metallic member) 1320, a third non-conductive part (or third non-conductive part, third non-conductive structure, third non-conductive member, third non-metallic part, third non-metal structure, or third non-metallic member) 1330, and/or a conductive part (or conductive part, conductive structure, conductive member, metal part, metal structure, or metal member) 1220. The non-conductive part 1210 of FIG. 12 and FIG. 13 may be provided in a combination of the first non-conductive part 1310, the second non-conductive part 1320, and/or the third non-conductive part 1330.

According to an embodiment, the first non-conductive part 1310 may substantially provide the exterior of the slidable electronic device 1100 of the second housing 1200. In an embodiment, the first non-conductive part 1310 may include ceramic. The first non-conductive part 1310 may include, for example, zirconia ceramic. For another example, the first non-conductive part 1310 may include ceramic having aluminum oxide ($Al_2O_3$), silicon carbide (SiC), or silicon nitride ($Si_3N_4$). The first non-conductive part 1310 may be realized by a combination of various types of ceramic or two or more types of ceramic. A texture (e.g., glossiness) of ceramic provided by the first non-conductive part 1310 may contribute to aesthetics of the slidable electronic device 1100. In various embodiments, the first non-conductive part 1310 is not limited to ceramic and may include various non-metallic materials (or non-conductive dielectric). For example, the first non-conductive part 1310 may include glass or a polymer. For another example, the first non-conductive part 1310 may include color-included (or colored) glass or a polymer. For another example, the first non-conductive part 1310 may include a plate including various material such as transparent glass, ceramic, or a polymer and at least one coating layer disposed on the plate using coating. For another example, the first non-conductive part 1310 may include a plate including various material such as transparent glass, ceramic, or a polymer and a film (e.g., a decoration film) attached to the plate and having various visual effects. In place of the first non-conductive part 1310, there may be an embodiment in which multiple members (e.g., two members) are provided. In the comparison embodiment, the multiple members may be smoothly connected to each other, but a border (or border line or parting line) between two members may be visible. In the comparison embodiment, the outer surface (or exterior) of the slidable electronic device 1100 provided by the second housing 1200 may have unified aesthetics due to the first non-conductive part 1310.

In an embodiment, the first non-conductive part 1310 may be formed by injection molding. The first non-conductive part 1310 may be formed by various other methods.

According to an embodiment, the conductive part 1220 may include, for example, a bended metal plate. The conductive part 1220 may include various metal materials such as magnesium, a magnesium alloy, aluminum, an aluminum alloy, a zinc alloys, a copper alloy, titanium, an amorphous alloy, a metal-ceramic composite (e.g., a cermet), or stainless steel. The conductive part 1220 may be formed by various metal processing methods such as computer numerical control (CNC), die casting, or pressing.

According to an embodiment, the conductive part 1220 may be disposed on the second non-conductive part 1320, and the first conductive pattern 1220A and the second conductive pattern 1220B of the conductive part 1220 may maintain a state of being physically separated from each other while being supported by the second non-conductive part 1320. The second non-conductive part 1320 may include various non-metallic material such as a polymer. The second non-conductive part 1320 may include a different material from the first non-conductive part 1310. For another example, the second non-conductive part 1320 may include the same material as the first non-conductive part 1310.

According to an embodiment, the second non-conductive part 1320 may be formed in a form coupled to the conductive part 1220 using inserting molding. The inserting molding may include, for example, an operation of injecting a molten resin into an internal space of a mold after placing the conductive part 1220 in the internal space of the mold, an operation of forming the second non-conductive part 1320 by solidifying (e.g., cooling) the injected molten resin, an operation of opening the mold to discharge a structure 1400 (e.g., a combination of the conductive part 1220 and the second non-conductive part 1320) in which the conductive part 1220 and the second non-conductive part 1320 are combined. In various embodiments, a metal member which is a base of the conductive part 1220 may be used for insert molding, and the metal member may include a portion (e.g., hereinafter, a "bridge") connecting the first conductive pattern 1220A and the second conductive pattern 1220B. Exterior processing (e.g., cutting) for removing the bridge before or after the insert molding may be proceeded.

According to various embodiments, an adhesive material may be disposed between the second non-conductive part 1320 and the conductive part 1220. The adhesive material may include, for example, organic adhesive materials of various polymers such as triazine thiol, dithiopyrimitine, or silane-based compounds. For example, by executing insert molding after applying an adhesive material on the conductive part 1220, the second non-conductive part 1320 coupled to the conductive part 1220 may be formed.

According to various embodiments, the second non-conductive part 1320 may be separately provided, and the conductive part 1220 may be coupled to the second non-conductive part 1320 using an adhesive material (e.g., a heat-reactive adhesive material, a light-reactive adhesive material, a normal adhesive, a double-sided tape, or an organic adhesive material). In various embodiments, the structure 1400 may be formed through an operation of disposing, on the second non-conductive part 1320, the first conductive patter 1220A, the second conductive pattern 1220B, and a metal member including a bridge for connecting the first conductive patter 1220A and the second conductive pattern 1220B and an operation of removing the bridge.

According to an embodiment, the structure 1400 in which the conductive part 1220 and the second non-conductive part 1320 is combined may be coupled to the first non-conductive part 1310 through the third non-conductive part 1330. The third non-conductive part 1330 may be at least partially disposed between the first non-conductive part 1310 and the structure 1400. The third non-conductive part 1330 may contribute to securing of durability or rigidity of the second housing 1200. The third non-conductive part 1330 may be implemented as, for example, a structure at least partially disposed inside the second housing 1200 to secure torsional rigidity of the second housing 1200. The third non-conductive part 1330 may include a material (e.g., a buffer material) for absorbing or relieving external impact applied to the second housing 1200 to reduce stress to the first non-conductive part 1310 when internal impact occurs so as to reduce damage to the first non-conductive part 1310. For example, the third non-conductive part 1330 may reduce or prevent the first non-conductive part 1310 from being damaged and scattered by an external impact that may occur in a situation such as a drop of the slidable electronic device 1100.

According to an embodiment, the third non-conductive part 1330 may be formed using a method for filling at least a portion between the first non-conductive part 1310 and the structure 1400 with a polymer. For example, the third non-conductive part 1330 may be formed by injection molding. The injection molding may include, for example, an operation of injecting a molten resin into an internal space of a mold after placing the first non-conductive part 1310 and the structure 1400 in the internal space of the mold, an operation of forming the third non-conductive part 1330 by solidifying (e.g., cooling) the injected molten resin, an operation of opening the mold to discharge a substantial second housing 1200 including the first non-conductive part 1310, the third non-conductive part 1330, and the structure 1400. By the method for forming the third non-conductive part 1330 for coupling the first non-conductive part 1310 and the structure 1400 using injection molding, the third non-conductive part 1330 may fill substantially and securely between the first non-conductive part 1310 and the structure 1400. The method in which the third non-conductive part 1330 is formed by injection molding while combining the first non-conductive part 1310 and the structure 1400 may be defined or interpreted as an "injection bonding". There may be another example method in which the third non-conductive part 1330 is separately produced and then the first non-conductive part 1310 is coupled to the structure 1400. The another example method may have a structural constraint in that the first non-conductive part 1310, the structure 1400, and the third non-conductive part 1330 need to be realized to facilitate assembling between the first non-conductive part 1310, the structure 1400, and the third non-conductive part 1330. The method for forming the third non-conductive part 1330 for coupling the first non-conductive part 1310 and the structure 1400 using injection molding may reduce the structural constraint of the another example method.

According to an embodiment, the second non-conductive part 1320 may include a portion disposed in a slit 1401 (e.g., the first slit 1230 and the second slit 1240 in FIG. 12). In various embodiments, the third non-conductive part 1330 may include a portion disposed in the slit 1401.

According to an embodiment, at least one of the first non-conductive part 1310 and the third non-conductive part 1330 may be substantially opaque. In various embodiments, one of the first non-conductive part 1310 and the third non-conductive part 1330 may be opaque and the other may transmit light. The slit 1401 or a border at which the second non-conductive part 1320 and the conductive part 1220 are separate corresponding to the slit 1401 may be substantially invisible from the outside due to the opaque first non-conductive part 1310 or the opaque third non-conductive part 1330 when viewed from the outer surface of the second housing 1200. A portion of the second non-conductive part 1320 disposed in the slit 1401 may not appear substantially distinct from the conductive part 1220 due to the opaque first non-conductive part 1310 or the opaque third non-conductive part 1330 when viewed from the outer surface of the second housing 1200.

According to an embodiment, the third non-conductive part 1330 may include a material capable of increasing interfacial bonding strength with the first non-conductive part 1310 and the structure 1400. The interfacial bonding strength may include mechanical strength indicating resistance to destruction by external forces, or environmental strength indicating resistance to destruction by the environment (water, heat, and the like). For example, the third non-conductive part 1330 may include a material having affinity (or bonding affinity) for allowing coupling to both the first non-conductive part 1310 and the structure 1400.

According to various embodiments, an adhesive material (or adhesive layer) may be disposed between the first non-conductive part 1310 and the third non-conductive part 1330 and/or between the structure 1400 and the third non-conductive part 1330. For example, the third non-conductive part 1330 coupled to the first non-conductive part 1310 and the structure 1400 may be formed by injection molding after an adhesive material is applied on at least one of the first non-conductive part 1310 and the structure 1400. The adhesive material may correspond to, for example, a material which may be reacted by heat or pressure produced while the third non-conductive part 1330 is formed by injection molding and may allow the third non-conductive part 1330 to be tightly coupled to the first non-conductive part 1310 and the structure 1400. In various embodiments, the adhesive material may be fused with the first non-conductive part 1310 and/or the second non-conductive part 1320. The adhesive material may reduce a gap in a bonding part between the first non-conductive part 1310 and the third non-conductive part 1330 and/or in a bonding part between the structure 1400 and the third non-conductive part 1330. The adhesive material may reduce damage to a bonding part between the first non-conductive part 1310 and the third non-conductive part 1330 and/or a bonding part between the structure 1400 and the third non-conductive part 1330 due to an external impact that may occur in a situation such as a drop of the slidable electronic device 1100. The adhesive material may reduce or prevent the first non-conductive part 1310 being damaged and scattered due to an external impact. According to an embodiment, the adhesive material may include a thermo-curable adhesive material. The third non-conductive part 1330 coupled to the first non-conductive part 1310 and the structure 1400 may be formed through injection molding after a thermo-curable adhesive material is applied on at least one of the first non-conductive part 1310 and the structure 1400 to be semi-cured. The adhesive material may include various organic adhesive materials. The adhesive material may include, for example, various polymers such as triazine thiol, dithiopyrimitine, or silane-based compounds.

According to various embodiments, an interface of the first non-conductive part 1310, which is coupled to the third non-conductive part 1330 may include a corrugated surface including a corrugation form such as multiple dimples or multiple slits. An interface of the structure 1400, which is coupled to the third non-conductive part 1330 may include a corrugated surface. A corrugation included in the interface of the first non-conductive part 1310, which is coupled to the third non-conductive part 1330 may enhance mechanical affinity between the first non-conductive part 1310 and the third non-conductive part 1330 due to increase in bonding area and an anchor effect when the third non-conductive part 1330 is formed by injection molding. A corrugation included in the interface of the structure 1400, which is coupled to the third non-conductive part 1330 may enhance mechanical affinity between the structure 1400 and the third non-conductive part 1330 due to increase in bonding area and an anchor effect when the third non-conductive part 1330 is formed by injection molding. The anchor effect may represent a phenomenon in which a molten resin for the third non-conductive part 1330 permeates grooves of a corrugated surface to be cured and bonded thereto during injection molding. The corrugated surface may be formed using various methods such as laser, a scratcher, blasting, CNC machining, or etching (e.g., chemical etching). In various embodiments, an interface of the first non-conductive part 1310, which is coupled to the third non-conductive part 1330, or an interface of the structure 1400, which is coupled to the third non-conductive part 1330 may include a coupling structure such as a dovetail joint.

According to various embodiments, an integrated non-conductive member replacing the second non-conductive part 1320 and the third non-conductive part 1330 may be provided.

According to various embodiments, an integrated non-conductive member replacing the first non-conductive part 1310, the second non-conductive part 1320, and the third non-conductive part 1330 may be provided. The conductive part 1220 may be disposed on the integrated non-conductive member. The integrated non-conductive member may include a portion disposed in the slit 1401 of the conductive part 1220. In various embodiments, the integrated non-conductive member may further include a coating layer for substantially forming the outer surface of the second housing 1200. The coating layer may be substantially transparent. For another example, the coating layer may be substantially opaque, and a border at which the slit 1401 or an integrated non-conductive member corresponding to the slit 1401 and the conductive part 1220 are separated may be substantially invisible due to the opaque coating layer when viewed from the outer surface of the second housing 1200. A portion of the integrated non-conductive member, which is disposed in the slit 1401 may not appear substantially distinct from the conductive part 1220 due to the opaque coating layer when viewed from the outer surface of the second housing 1200.

According to an embodiment, a non-conductive dielectric such as the first non-conductive part 1310, the second non-conductive part 1320, and the third non-conductive part 1330 included in the non-conductive part 1210 of the second housing 1200 may have a permittivity capable of reducing antenna radiation performance degradation with respect to the conductive part 1220 including the first conductive pattern 1220A and the second conductive pattern 1220B.

Figure 15:
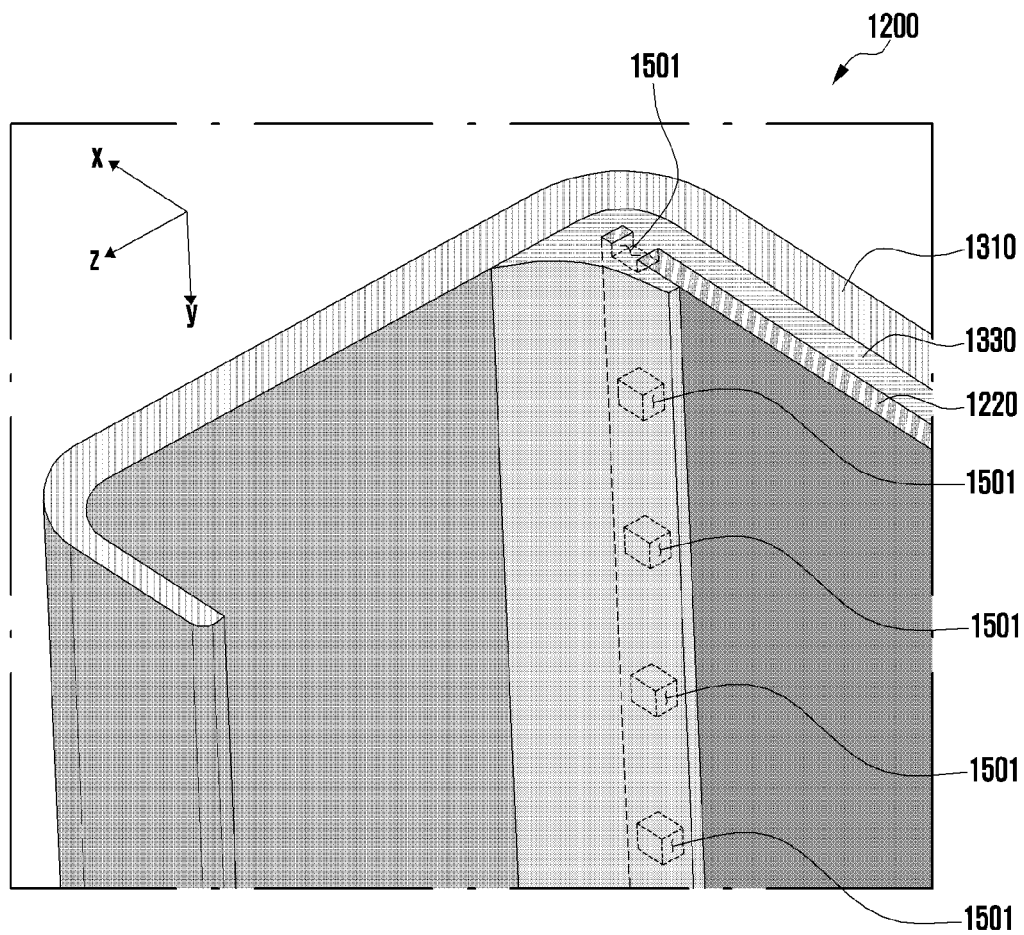
FIG. 15 is a partial sectional view of a second housing according to various embodiments.

FIG. 15 is a partial sectional view of a second housing 1200 according to various embodiments.

Referring to FIG. 15, the conductive part 1220 may include multiple openings 1501. When the third non-conductive part 1330 is formed by injection molding, a molten resin may be injected between the first non-conductive part 1310 and the conductive part 1220 through the multiple openings 1501. The third non-conductive part 1330 may include multiple support parts arranged in the multiple openings 1501, and the multiple support parts may enhance affinity between the first non-conductive part 1310, the conductive part 1220, and the third non-conductive part 1330 to contribute to durability and rigidity of the second housing 1200.

Figure 16:
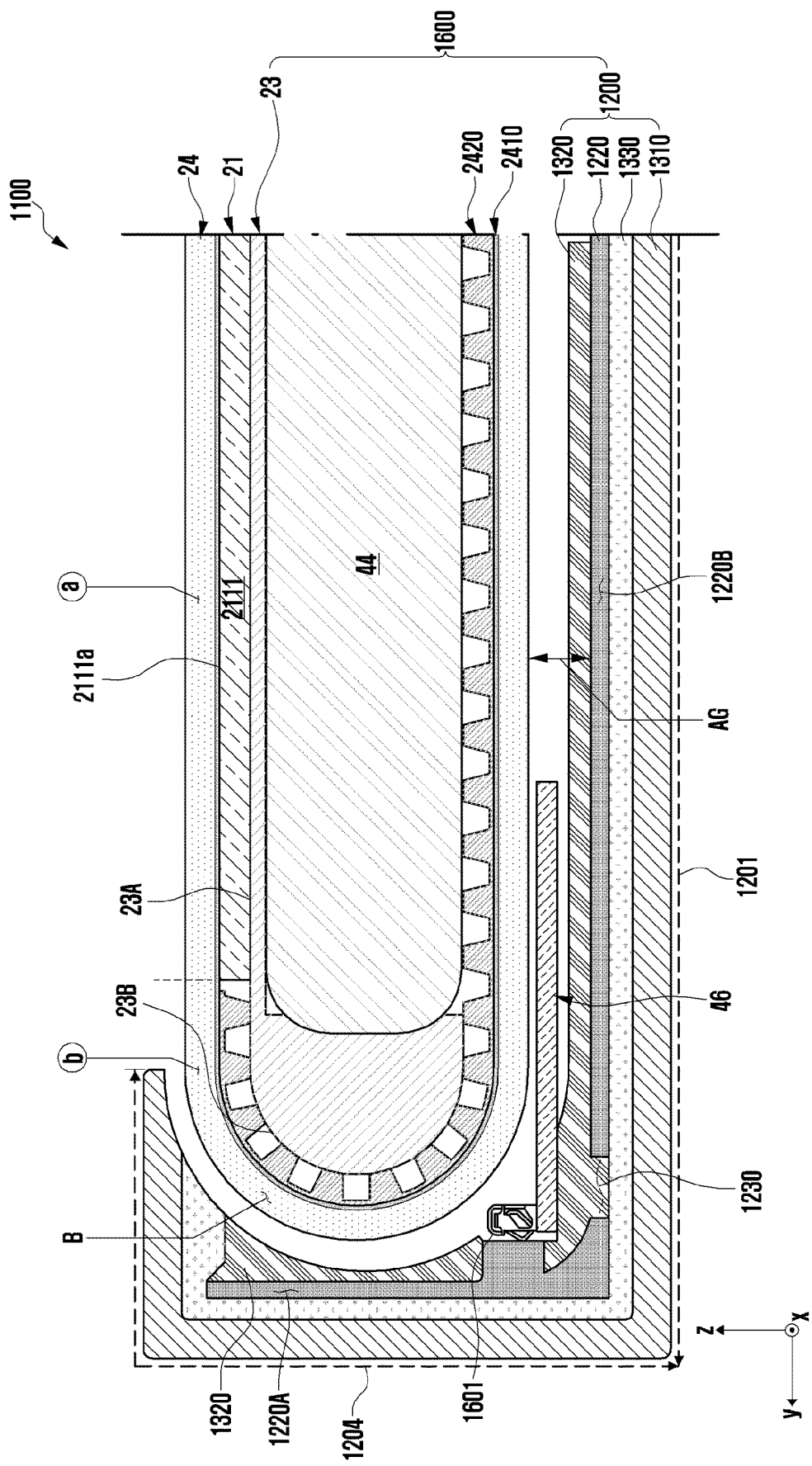
FIG. 16 is a partial sectional view of a slidable electronic device in a closed state according to various embodiments.

FIG. 16 is a partial sectional view of a slidable electronic device 1100 in a closed state according to various embodiments.

Referring to FIG. 16, the slidable electronic device 1100 may include a first housing 21, a second housing 1200, a third frame 23, a flexible display module 24, a support sheet 2410, a display support structure 2420, a second printed circuit board 46, and/or a flexible conductive member 1601.

According to an embodiment, a portion of the second area ⓑ of the flexible display module 24, which provides the second screen area S2 (see FIG. 3) may be supported by the first support surface 23A provided by the third frame 23 received in the second housing 22. The second support surface 23B of the third frame 23 may support the bending part B of the second area ⓑ. The bending part B of the second area ⓑ may be provided between the second support surface 23B of the third frame 23 and the fourth lateral wall 1204 of the second housing 1200. A surface of the fourth lateral wall 1204 facing the bending part B of the second area ⓑ may include a curved surface corresponding to the bending part B of the second area ⓑ. In case that a housing assembly 1600 (e.g., a movable body or movable housing) including the second housing 1200 and the third frame 23 performs slide-out with respect to the first housing 21, at least a portion of the second area ⓑ may be drawn out from a space between the third frame 23 and the second housing 1200 to the outside (e.g., a position regarded as the outside of the slidable electronic device 1100) through a curved space between the fourth lateral wall 1204 and the second support surface 23B. When the housing assembly 1600 performs slide-in with respect to the first housing 21, at least a portion of the second area ⓑ may be inserted into a space between the third frame 23 and the second housing 1200 from the outside through a curved space between the fourth lateral wall 1204 and the second support surface 23B.

According to an embodiment, at least a portion of the first conductive pattern 1220A included in the second housing 1200 may be positioned corresponding to the bending part B of the flexible display module 24.

According to an embodiment, the first conductive pattern 1220A included in the second housing 1200 may be electrically connected to the second printed circuit board 46. In an embodiment, a wireless communication circuit (e.g., the wireless communication module 192 in FIG. 1) may be disposed on the first printed circuit board 45 (see FIG. 5) on which a processor (e.g., the processor 120 in FIG. 1) is disposed. The wireless communication circuit may be electrically connected to the first conductive pattern 1220A through an electrical connection member (e.g., a flexible printed circuit board or cable) for electrically connecting the first printed circuit board 45 and the second printed circuit board 46. In various embodiments, the wireless communication circuit may be disposed on the second printed circuit board 46. The first conductive pattern 1220A may operate as a radiator (or antenna radiator) for radiating (or transmitting) a radiation current (or electromagnetic signal or wireless signal) provided (or fed) from the wireless communication circuit to the outside of the slidable electronic device 1100 or receiving an electromagnetic signal from the outside of the slidable electronic device 1100.

According to an embodiment, the first conductive pattern 1220A of the second housing 1200 may be electrically connected to the second printed circuit board 46 through the flexible conductive member 1601. The flexible conductive member 1601 may include a conductive clip (e.g., a conductive structure including an elastic structure) like the embodiment shown in FIG. 16, but is not limited thereto, and may include a pogo-pin, a spring, a conductive PORON, conductive rubber, a conductive tape, or a conductive connector. In an embodiment, a portion of the first conductive pattern 1220A may be positioned in a hole or opening provided through the second non-conductive part 1320 of the second housing 1200 and may be in physical contact with the flexible conductive member 1601 disposed on the second printed circuit board 46 to allow a current to pass therethrough. A portion of the first conductive pattern 1220A for receiving an electromagnetic signal from the wireless communication circuit through the flexible conductive member 1601 may be referred to as a "feeding part", a "feeding area", or a "feeding point". The wireless communication circuit may provide an electromagnetic signal to the first conductive pattern 1220A through the feeding part and the first conductive pattern 1220A may radiate (or transmit) an electromagnetic signal provided (or fed) by the wireless communication circuit to the outside of the slidable electronic device 1100. The first conductive pattern 1220A may receive an electromagnetic signal from the outside of the slidable electronic device 1100 and the received electromagnetic signal may be transferred to the wireless communication circuit through the feeding part and a transmission line for connecting the feeding part and the wireless communication circuit. The transmission line may correspond to an electrical path through which a signal (e.g., a voltage and/or current) of a radio frequency (RF) is transferred between the first conductive pattern 1220A and the wireless communication circuit. A signal (hereinafter, a "frequency signal") having a frequency included in at least one selected or designated frequency may be transferred through the transmission line. In various embodiments, the transmission line may be referred to as an "RF chain".

According to an embodiment, the second conductive pattern 1220B physically separated from the first conductive pattern 1220A by the first slit 1230 may operate as an antenna ground (e.g., a ground plane). The second conductive pattern 1220B may be electrically connected to a ground plane or ground layer included in the first printed circuit board 45 (see FIG. 5) and a ground plane or ground layer included in the second printed circuit board 46. The second conductive pattern 1220B may be provided in a form capable of reinforcing an antenna ground with respect to the first conductive pattern 1220A for transmitting and/or receiving a signal in a selected or designated frequency band. The second conductive pattern 1220B may be provided in a form capable of operating as well as possible as an antenna ground or capable of further reinforcing the antenna ground with respect to the first conductive pattern 1220A used as an antenna radiator.

FIG. 17 is a diagram illustrating a conductive part 1220 included in a second housing 1200 and graphs illustrating antenna radiation performance with respect to a first conductive pattern 1220A depending on a size of a second conductive pattern 1220B included in the conductive part 1220 according various embodiments.

Referring to FIG. 17, the first conductive pattern 1220A of the conductive part 1220 included in the second housing 1200 may receive a radiation current to operate as an antenna radiator. The second conductive pattern 1220B of the conductive part 1220 included in the second housing 1200 may operate as an antenna ground. In case that the wireless communication circuit (e.g., the wireless communication module 192 in FIG. 1) provides a radiation current (or electromagnetic signal) to the first conductive pattern 1220A, an electromagnetic field (e.g., a radiation field) may be produced on the first conductive pattern 1220A due to an electromagnetic force and an effect of the electromagnetic field may cause the second conductive pattern 1220B to be charged. The charged second conductive pattern 1220B may provide a current path (or surface current distribution) causing an electromagnetic effect (e.g., electromagnetic force, or reflection of radio waves) on the electromagnetic field produced on the first conductive pattern 1220A. In case that a shape of the second conductive pattern 1220B, for example, a horizontal size (e.g., the length of the first boundary B1) of the second conductive pattern 1220B in the described embodiment is the same, depending on a vertical size (e.g., a distance by which the first boundary B1 is spaced apart from the second boundary B2 or a length of the third boundary B3) of the second conductive pattern 1220B, an electromagnetic effect (e.g., a current path) of the second conductive pattern 1220B on an electromagnetic field produced on the first conductive pattern 1220A may be changed. Reference numeral "1701" indicates antenna radiation performance with respect to an antenna using the conductive part 1220 in case that the first conductive area 1221 included in the second conductive pattern 1220B has a vertical size of about 150 mm. Reference numeral "1702" indicates antenna radiation performance with respect to an antenna using the conductive part 1220 in case that the first conductive area 1221 included in the second conductive pattern 1220B has a vertical size of about 140 mm. Reference numeral "1703" indicates antenna radiation performance with respect to an antenna using the conductive part 1220 in case that the first conductive area 1221 included in the second conductive pattern 1220B has a vertical size of about 130 mm. Reference numeral "1704" indicates antenna radiation performance with respect to an antenna using the conductive part 1220 in case that the first conductive area 1221 included in the second conductive pattern 1220B has a vertical size of about 120 mm. Reference numeral "1705" indicates antenna radiation performance with respect to an antenna using the conductive part 1220 in case that the first conductive area 1221 included in the second conductive pattern 1220B has a vertical size of about 110 mm. Reference numeral "1706" indicates antenna radiation performance with respect to an antenna using the conductive part 1220 in case that the first conductive area 1221 included in the second conductive pattern 1220B has a vertical size of about 100 mm. The smaller the vertical size of the first conductive area 1221, the higher the natural resonance frequency of the second conductive pattern 1220B used as the antenna ground (e.g., high shift). In case that reduction of the vertical size of the first conductive area 1221 causes the natural resonance frequency of the second conductive pattern 1220B to be high, the second conductive pattern 1220B may have a difficulty providing an electrical length or current path corresponding to a selected or designated frequency band (e.g., a using frequency band or operating frequency band), thus causing degradation of antenna radiation performance. In an embodiment, the second conductive pattern 1220b may be realized in a form (e.g., the vertical size in the described embodiment) to provide an electrical length or current path capable of reducing degradation of antenna radiation performance in response to a selected or designated frequency band that the first conductive pattern 1220A transmits or receives.

Figure 18:
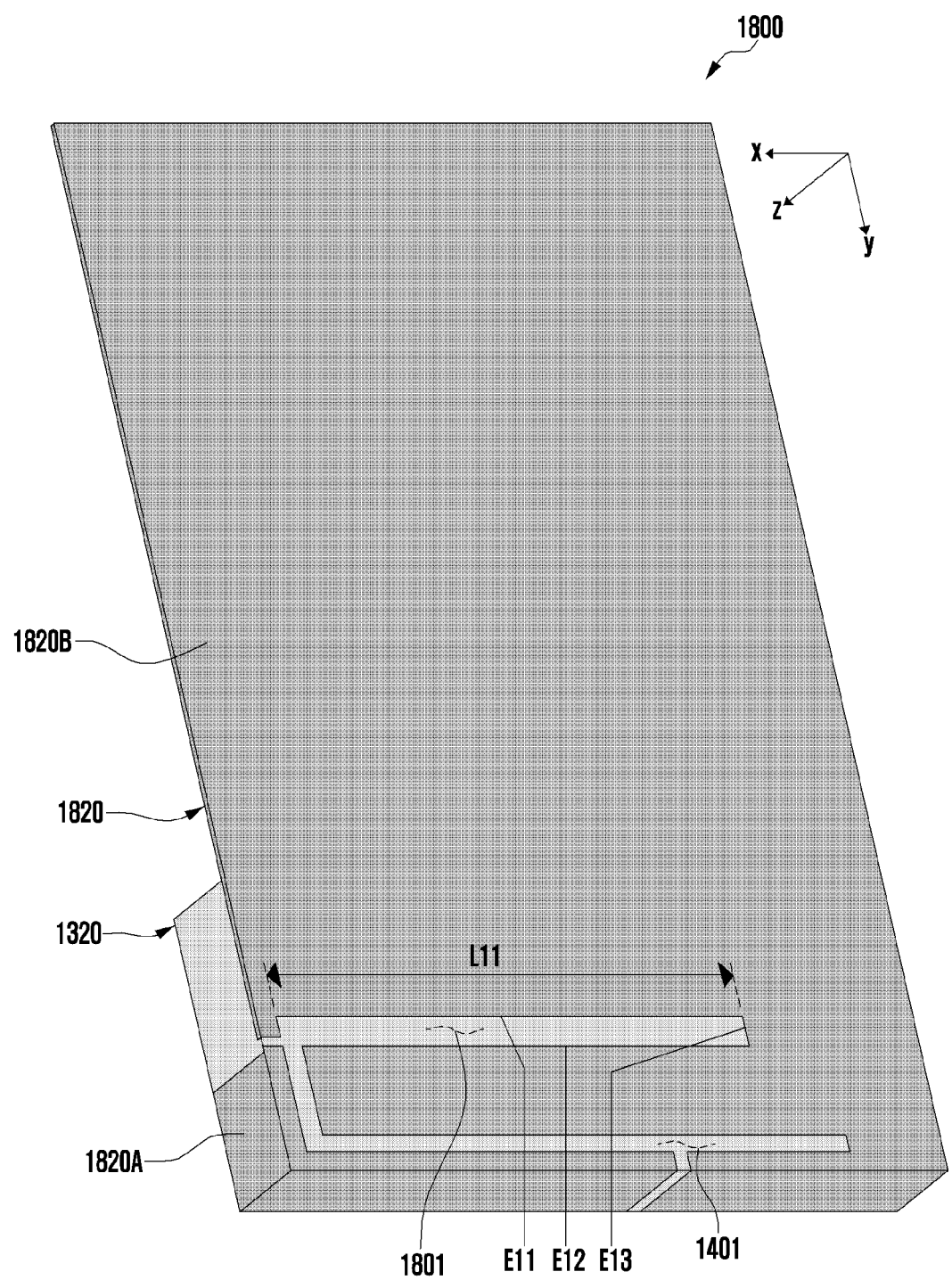
FIG. 18 is a perspective view of a structure including a second non-conductive part and a conductive part according to various embodiments.

FIG. 18 is a perspective view of a structure 1800 including a second non-conductive part 1320 and a conductive part 1820 according to various embodiments.

Referring to FIG. 18, the conductive part 1820 may include a first conductive pattern 1820A and a second conductive pattern 1820B. The first conductive pattern 1820A may be substantially the same as the first conductive pattern 1220A according to the embodiment of FIG. 14. The second conductive pattern 1820B may further include a third slit 1801 provided on the first conductive area 1221 compared to the second conductive pattern 1220B according to the embodiment of FIG. 14. The third slit 1801 may extend from the third connection position 1230C (see FIG. 12) in the −x-axis direction (e.g., a direction from the sixth lateral wall 1206 to the fifth lateral wall 1205 in FIG. 11). The third slit 1801 may be substantially parallel with the first part slit 1231 (see FIG. 12). In case that an antenna ground does not provide an electrical length corresponding to a first frequency band (e.g., a LB (about 600 MHz-about 1 GHz)) that an antenna radiator transmits or receives, the antenna ground may have a difficulty substantially providing an electromagnetic force (or electromagnetic effect) capable of securing antenna radiation performance with respect to the first frequency band. For example, in case that an antenna ground does not provide an electrical length corresponding to a first frequency band that an antenna radiator transmits or receives, the antenna ground has a property (or antenna ground property) having a substantial effect (e.g., an electromagnetic force) on securing or enhancing antenna radiation performance with respect to a second frequency band different from the first frequency band and thus it may be difficult to secure or enhance antenna radiation performance with respect to the first frequency band. The third slit 1801 according to an embodiment may contribute to the second conductive pattern 1820B operating as an antenna ground to have an electrical length corresponding to a frequency band that the first conductive pattern 1820A operating as an antenna radiator transmits and receives and thus antenna radiation performance may be secured and enhanced. The electrical length of the second conductive pattern 1820B may be provided to fall within a threshold range to correspond to the first frequency band that the first conductive pattern 1820A transmits and receives or equal to or greater than a threshold value. Referring to FIG. 14 and FIG. 17, the vertical size (e.g., a distance by which the first boundary B1 is spaced apart from the second boundary B2) of the first conductive area 1221 may be extended for the second conductive pattern 1220B to provide an electrical length or current path (or surface current distribution) capable of enhancing or securing antenna radiation performance, but the extension may be limited within the second housing 1200. To address the limitation, the third slit 1801 according to an embodiment may contribute to providing of an electrical length or current path to reinforce an antenna ground or the second conductive pattern 1820B to operate better as an antenna ground with respect to the first frequency band (or selected or designated frequency band) that the first conductive pattern 1820A transmits or receives.

For example, the second conductive pattern 1820B operating as an antenna ground may be provided to have an electrical length (e.g., a length for a wavelength of about 400 mm) corresponding to a using frequency (or operating frequency) of about 750 MHz that the first conductive pattern 1820A operating as an antenna radiator transmits and receives. In an embodiment, the third slit 1801 of the second conductive pattern 1820B may include a first edge E11, a second edge E12, and a third edge E13. The first edge E11 and the second edge E12 may be positioned opposite to each other and may extend from the third connection position (see FIG. 12) in parallel with each other in the −x-axis direction. The third edge E13 may connect the first edge E11 and the second edge E12. In case of feeding the first conductive pattern 1820A, the first edge E11 and the second edge E12 may substantially affect a current path (or surface current distribution) produced on (or charged to) the second conductive pattern 1820B. Compared to the first edge E11 and the second edge E12, the third edge E13 may be provided to have a length not substantially affecting a current path produced on the second conductive pattern 1820B. In an embodiment, the third edge E13 may have a length having a value included in a range of about 1 mm to about 5 mm A length of the third slit 1801 extending from the third connection position 1230c (see FIG. 12) in the −x-axis direction may be provided to allow the second conductive pattern 1820B to have an electrical length (e.g., a length for a wavelength (about 400 mm)) corresponding to a using frequency of about 750 MHz and may vary depending on a permittivity (or material) or thickness of a cover part for covering at least a portion of the structure 1800. The cover part for covering at least a portion of the structure 1800 may include the first non-conductive part 1310, the second non-conductive part 1320, and/or the third non-conductive part 1330 in FIG. 13. For example, in case that the cover part includes a polymer having a relative permittivity of about 4.3, the length L11 of the third slit 1801 may be about 48 mm corresponding to the using frequency (e.g., about 750 MHz). For another example, in case that the cover part includes ceramic having a relative permittivity of about 29, the length L11 of the third slit 1801 may be about 40 mm corresponding to the using frequency (e.g., about 750 MHz). The embodiment of FIG. 18 is only presented to aid understanding in designing the length L11 of the third slit 1801 and a shape of the third slit 1801 may vary without limitation to the described embodiment.

According to various embodiments, depending on the shape of the third slit 1801, a bandwidth in which a signal is smoothly transmitted or received by the first conductive pattern 1820A may be changed.

Figure 19:
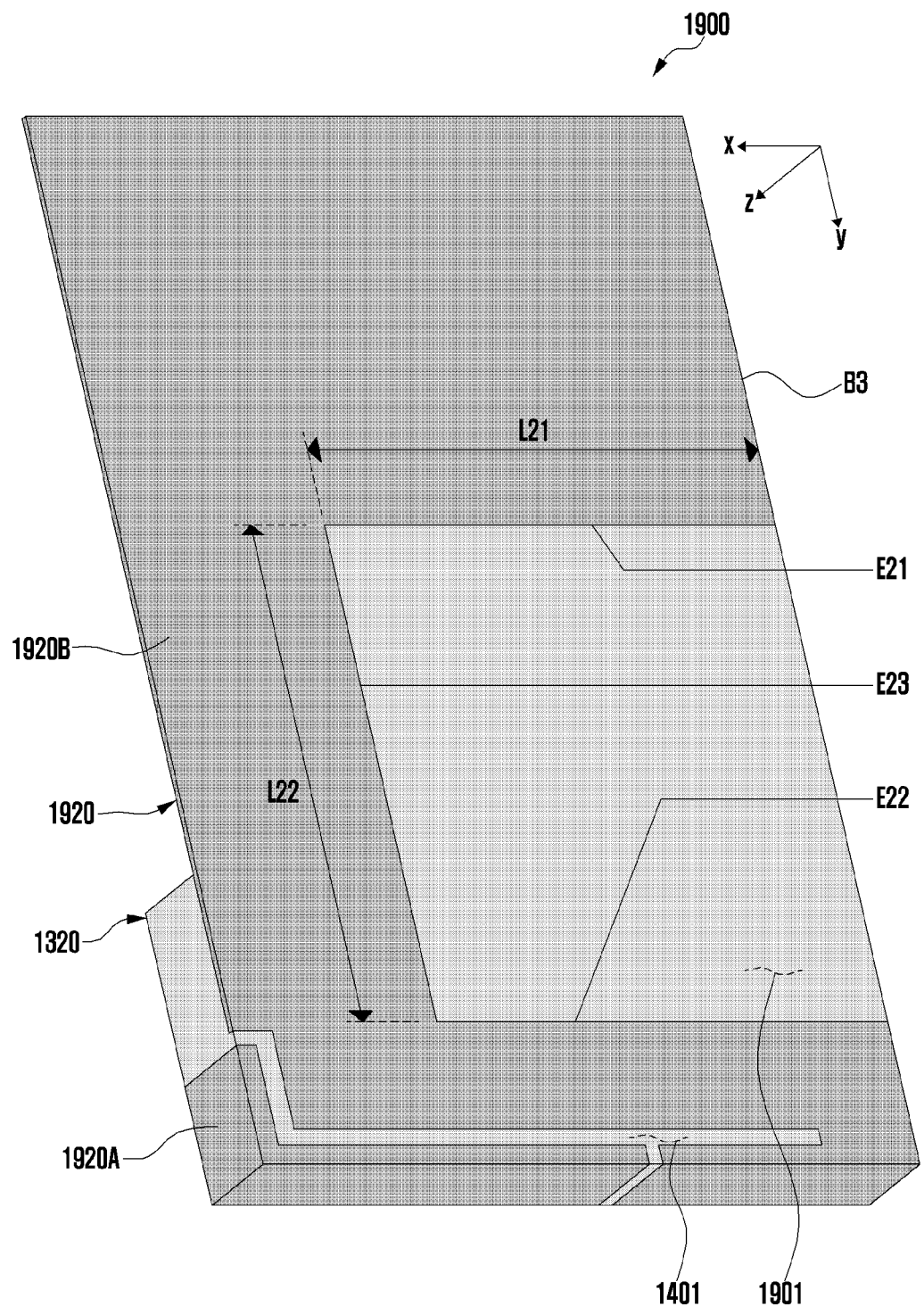
FIG. 19 is a perspective view of a structure including a second non-conductive part and a conductive part according to various embodiments.

FIG. 19 is a perspective view of a structure 1900 including a second non-conductive part 1320 and a conductive part 1920 according to various embodiments.

Referring to FIG. 19, the conductive part 1920 may include a first conductive pattern 1920A and a second conductive pattern 1920B. The first conductive pattern 1920A may be substantially the same as the first conductive pattern 1220A according to the embodiment of FIG. 14. The second conductive pattern 1920B may further include a notch 1901 provided on the first conductive area 1221 compared to the second conductive pattern 1220B according to the embodiment of FIG. 14. The second non-conductive part 1320 may include a portion disposed in the notch 1901. For another example, the third non-conductive part 1330 (see FIG. 13) may include a portion disposed in the notch 1901. The notch 1901 may be provided on the third boundary B3 of the third conductive area 1221, for example. In case that an antenna ground does not provide an electrical length corresponding to a first frequency band (e.g., a LB (about 600 MHz-about 1 GHz)) that an antenna radiator transmits or receives, the antenna ground may have a difficulty substantially providing an electromagnetic force (or electromagnetic effect) capable of securing antenna radiation performance with respect to the first frequency band. For example, in case that an antenna ground does not provide an electrical length corresponding to a first frequency band that an antenna radiator transmits or receives, the antenna ground has a property (or antenna ground property) having a substantial effect (e.g., an electromagnetic force) on securing or enhancing antenna radiation performance with respect to a second frequency band different from the first frequency band and thus it may be difficult to secure or enhance antenna radiation performance with respect to the first frequency band. The notch 1901 according to an embodiment may contribute to the second conductive pattern 1920B operating as an antenna ground to have an electrical length corresponding to a first frequency band that the first conductive pattern 1920A operating as an antenna radiator transmits and receives and thus antenna radiation performance may be secured and enhanced. The electrical length of the second conductive pattern 1920B may be provided, for example, to fall within a threshold range to correspond to the first frequency band that the first conductive pattern 1920A transmits and receives or equal to or greater than a threshold value. Referring to FIG. 14 and FIG. 17, the vertical size (e.g., a distance by which the first boundary B1 is spaced apart from the second boundary B2) of the first conductive area 1221 may be extended for the second conductive pattern 1220B to provide an electrical length or current path (or surface current distribution) capable of enhancing or securing antenna radiation performance, but the extension may be limited within the second housing 1200. To address the limitation, the notch 1901 according to an embodiment may contribute to providing of an electrical length or current path to reinforce an antenna ground or the second conductive pattern 1920B to operate better as an antenna ground with respect to the first frequency band (or selected or designated frequency band) that the first conductive pattern 1920A transmits or receives.

For example, the second conductive pattern 1920B operating as an antenna ground may be provided to have an electrical length (e.g., a length for a wavelength of about 400 mm) corresponding to a using frequency (or operating frequency) of about 750 MHz that the first conductive pattern 1920A operating as an antenna radiator transmits and receives. According to an embodiment, the notch 1901 of the second conductive pattern 1920B may include a first edge E21, a second edge E22, and a third edge E23. The first edge E21 and the second edge E22 may be positioned opposite to each other and may extend to have the same first length L21 from the third boundary B3 in parallel with each other in the +x-axis direction. The third edge E23 may connect the first edge E21 and the second edge E22 and have a second length L22 extending in +y-axis direction (or the −y-axis direction). In case of feeding the first conductive pattern 1920A, the first edge E21, the second edge E22, and the third edge E23 may substantially affect a current path (or surface current distribution) produced on (or charged to) the second conductive pattern 1920B. The first length L21 to which the first edge E21 and the second edge E22 extend and the second length L22 to which the third edge E23 extends may be provided to allow the second conductive pattern 1920B to have an electrical length (e.g., a length for a wavelength (about 400 mm)) corresponding to a using frequency of about 750 MHz and may vary depending on a permittivity (or material) or thickness of a cover part (e.g., the first non-conductive part 1310, the second non-conductive part 1320, and/or the third non-conductive part 1330 in FIG. 13) for covering at least a portion of the structure 1900. For example, in case that the cover part includes a polymer having a relative permittivity of about 4.3, the first length L21 to which the first edge E21 and the second edge E22 extend may be about 40 mm and the second length L22 to which the third edge E23 extends may be 40 mm, corresponding to the using frequency (e.g., about 750 MHz). For example, in case that the cover part includes ceramic having a relative permittivity of about 29, the first length L21 to which the first edge E21 and the second edge E22 extend may be about 36 mm and the second length L22 to which the third edge E23 extends may be 40 mm, corresponding to the using frequency (e.g., about 750 MHz). The first length L21 and the second length L22 may vary depending on permittivity or a thickness of the first non-conductive part 1310. The embodiment of FIG. 19 is only presented to aid understanding in designing the shape of the notch 1901 and a shape of the notch 1901 may vary without limitation to the described embodiment.

According to various embodiments, depending on the shape of the notch 1901, a bandwidth in which a signal is smoothly transmitted or received by the first conductive pattern 1920A may be changed.

Figure 20:
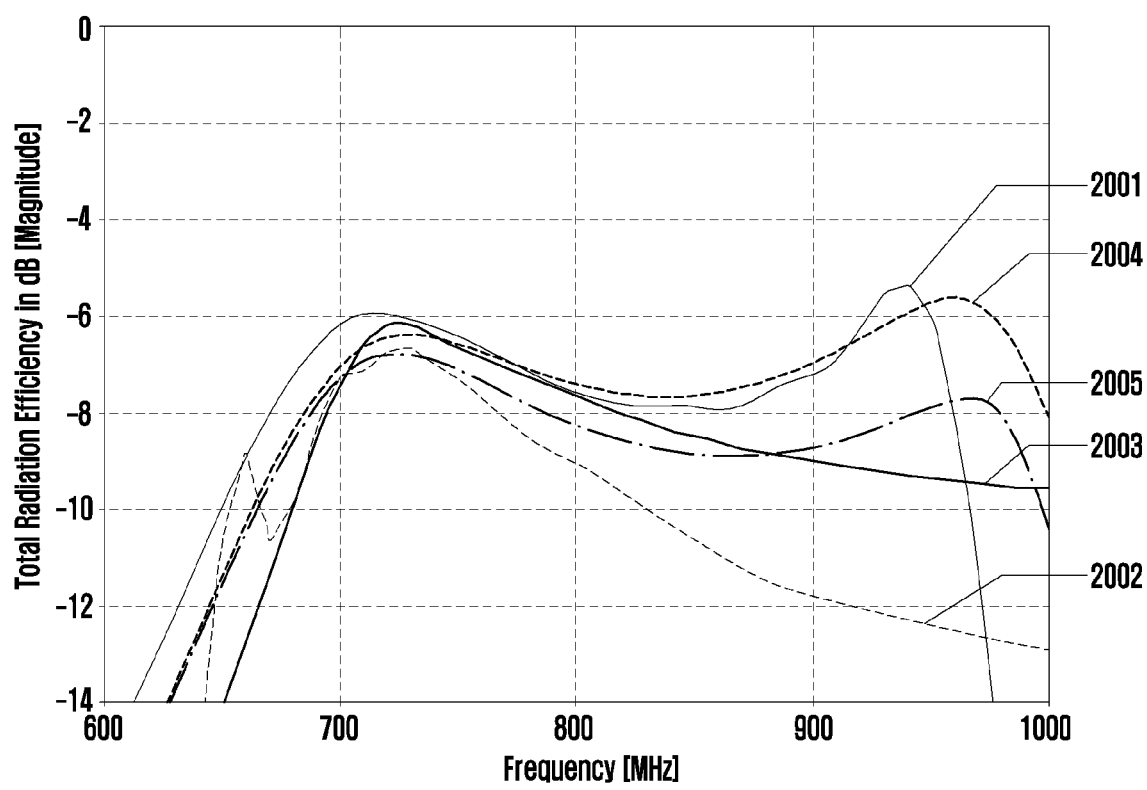
FIG. 20 illustrates graphs indicating antenna radiation performance depending on a first length and a second length of a notch in the embodiment of FIG. 19 according to various embodiments.

FIG. 20 illustrates graphs indicating antenna radiation performance depending on a first length L21 and a second length L22 of a notch 1901 in the embodiment of FIG. 19 according to various embodiments. FIG. 20 represents antenna radiation performance according to the first length L11 and the second length L22 of the notch 1901 in case that, for example, the first non-conductive part 1310 (see FIG. 13) for covering at least a portion of the structure 1900 includes ceramic and a using frequency (or operating frequency) that the first conductive pattern 1920A transmits or receives is about 750 MHz. Reference numeral "2001" is a graph indicating antenna radiation performance with respect to a using frequency (e.g., a selected or designated frequency) in case that the first length 21 of the first edge E21 and the second edge E22 included in the notch 1901 is provided to be of about 32 mm and the second length L22 of the third edge E23 included in the notch 1901 is provided to be of about 40 mm. Reference numeral "2002" is a graph indicating antenna radiation performance with respect to a using frequency in case of providing the first length L21 of about 40 mm and the second length L22 of about 40 mm. Reference numeral "2003" is a graph indicating antenna radiation performance with respect to a using frequency in case of providing the first length L21 of about 36 mm and the second length L22 of about 40 mm. Reference numeral "2004" is a graph indicating antenna radiation performance with respect to a using frequency in case of providing the first length L21 of about 28 mm and the second length L22 of about 40 mm Reference numeral "2005" is a graph indicating antenna radiation performance with respect to a using frequency in case of providing the first length L21 of about 26 mm and the second length L22 of about 40 mm. Referring to graphs 2001, 2002, 2003, 2004, and 2005, an electrical path of the second conductive pattern 1920B and a current path (or surface current distribution) charged to the second conductive pattern 1920B when feeding the first conductive pattern 1920A may be changed depending on the first length L21 and accordingly, antenna radiation performance with respect to a using frequency may be changed as well. In addition, an electrical path of the second conductive pattern 1920B and a current path charged to the second conductive pattern 1920B when feeding the first conductive pattern 1920A may be changed depending on the second length L22 and accordingly, antenna radiation performance with respect to a using frequency may be changed as well. In an embodiment, the first length L21 and/or the second length L22 of the second conductive pattern 1920B may be designed so that a radiation field of the first conductive pattern 1920A is provided in a form capable of securing or enhancing antenna radiation performance.

Figure 21:
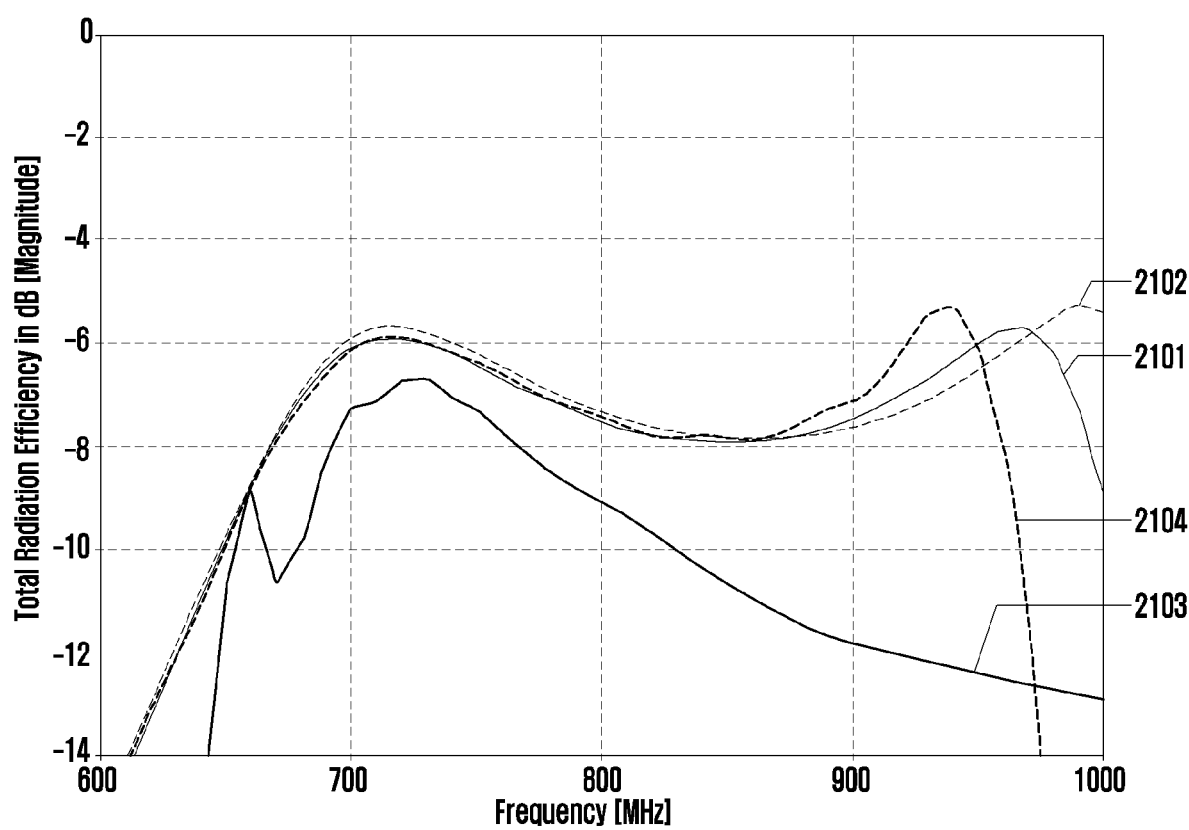
FIG. 21 illustrates graphs indicating antenna radiation performance depending on a first length and a second length of a notch in the embodiment of FIG. 19 according to various embodiments.

FIG. 21 illustrates graphs indicating antenna radiation performance depending on a first length L21 and a second length L22 of a notch 1901 in the embodiment of FIG. 19 according to various embodiments.

Referring to FIG. 19 and FIG. 21, reference numeral "2101" is a graph indicating antenna radiation performance with respect to a using frequency (e.g., about 750 MHz) in case that the first non-conductive part 1310 for covering at least a portion of the structure 1900 includes a polymer having a relative permittivity of about 4.3, the first length 21 of the first edge E21 and the second edge E22 is provided to be of about 40 mm and the second length L22 of the third edge E23 is provided to be of about 40 mm. Reference numeral "2102" is a graph indicating antenna radiation performance with respect to a using frequency in case that the first non-conductive part 1310 includes a polymer having a relative permittivity of about 4.3, the first length 21 of the first edge E21 and the second edge E22 is provided to be of about 38 mm, and the second length L22 of the third edge E23 is provided to be of about 40 mm. Reference numeral "2103" is a graph indicating antenna radiation performance with respect to a using frequency in case that the first non-conductive part 1310 includes ceramic having a relative permittivity of about 29, the first length 21 of the first edge E21 and the second edge E22 is provided to be of about 40 mm, and the second length L22 of the third edge E23 is provided to be of about 40 mm. Reference numeral "2104" is a graph indicating antenna radiation performance with respect to a using frequency in case that the first non-conductive part 1310 includes ceramic having a relative permittivity of about 29, the first length 21 of the first edge E21 and the second edge E22 is provided to be of about 32 mm, and the second length L22 of the third edge E23 is provided to be of about 40 mm. Referring to graphs 2101, 2102, 2103, and 2104, antenna radiation performance with respect to a using frequency may be changed depending on permittivity of the first non-conductive part 1310 and a shape of the notch 1901. In an embodiment, the first length L21 and/or the second length L22 of the second conductive pattern 1920B may be designed further considering permittivity of the first non-conductive part 1310 so that a radiation field of the first conductive pattern 1920A is provided in a form capable of securing or enhancing antenna radiation performance.

Figure 22:
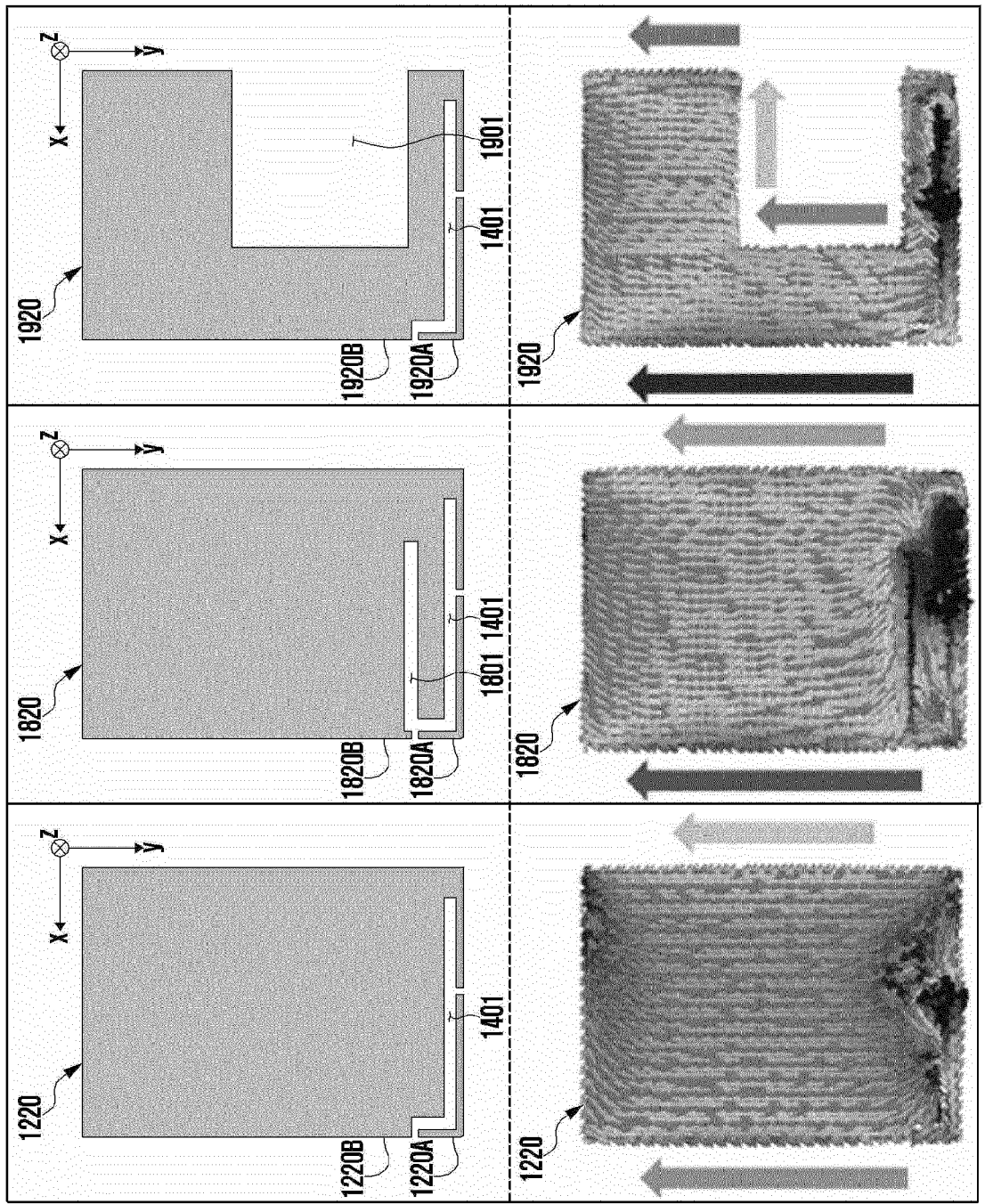
FIG. 22 includes diagrams illustrating a current path (or surface current distribution) occurring on the conductive part according to the embodiment of FIG. 14, the conductive part according to the embodiment of FIG. 18, and the conductive part according to the embodiment of FIG. 19 on feeding according to various embodiments.
Figure 23:
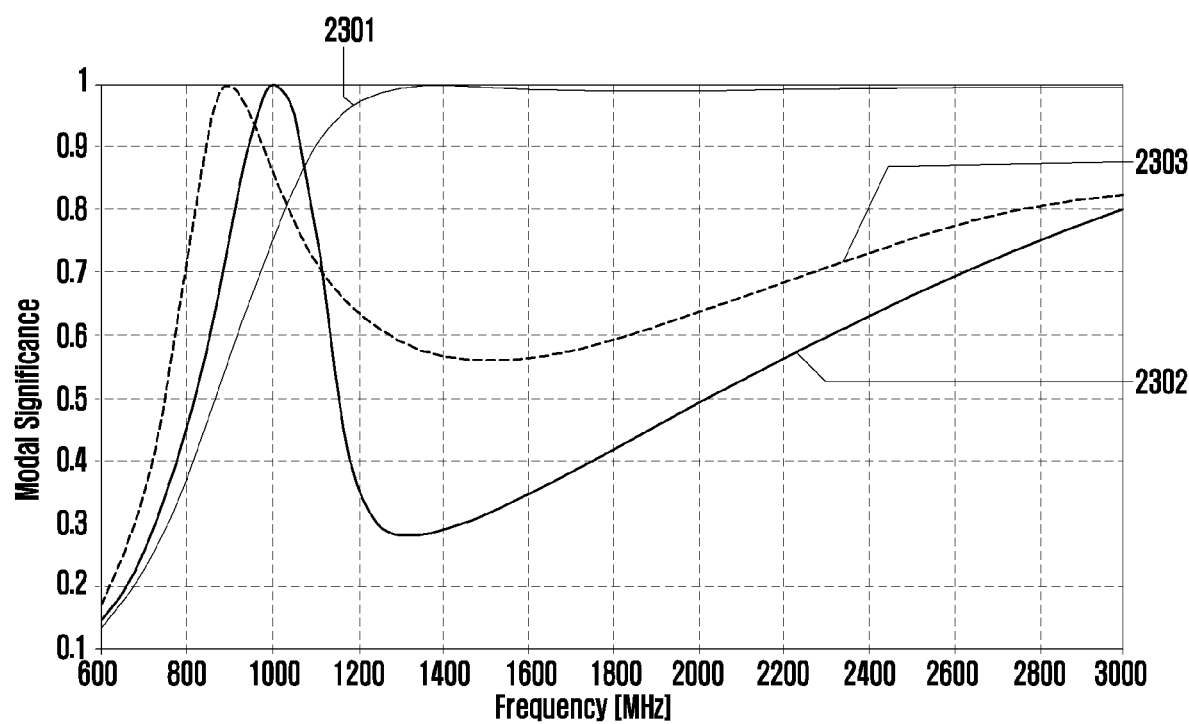
FIG. 23 illustrates graphs indicating an antenna ground property according to a shape of a second conductive pattern operating as an antenna ground according to various embodiments.
Figure 24:
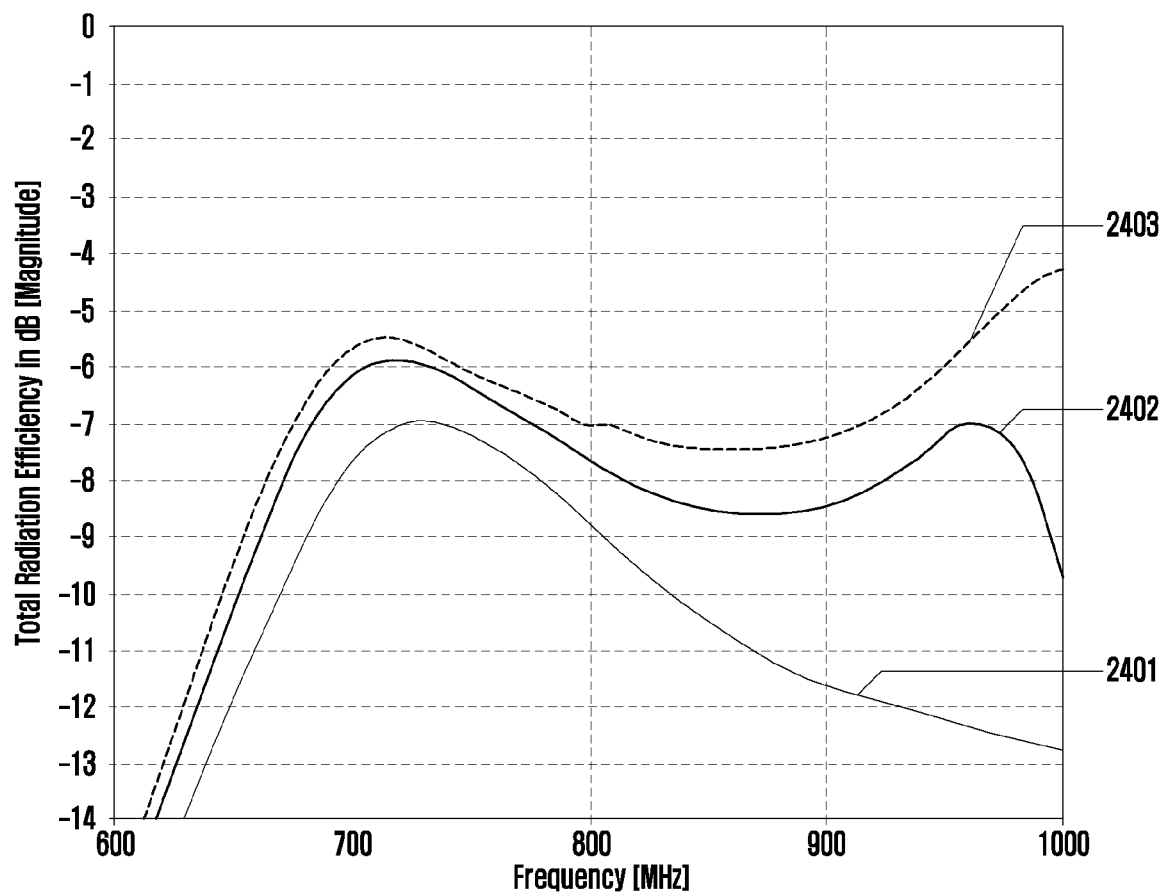
FIG. 24 illustrates graphs indicating antenna radiation performance according to a shape of a second conductive pattern operating as an antenna ground according to various embodiments.

FIG. 22 is a diagram illustrating a current path (or surface current distribution) occurring on the conductive part 1220 according to the embodiment of FIG. 14, the conductive part 1820 according to the embodiment of FIG. 18, and the conductive part 1920 according to the embodiment of FIG. 19 on feeding according to various embodiments. FIG. 23 illustrates graphs indicating an antenna ground property (modal significance) according to a shape of a second conductive pattern operating as an antenna ground according to various embodiments. FIG. 24 illustrates graphs indicating antenna radiation performance according to a shape of a second conductive pattern operating as an antenna ground according to various embodiments.

Referring to FIG. 22, in case that a radiation current is provided to the first conductive pattern 1220A of the conductive part 1220 according to the embodiment of FIG. 14, an electromagnetic field (e.g., a radiation field) may be produced on the first conductive pattern 1220A due to an electromagnetic force and an effect of the electromagnetic field may cause the second conductive pattern 1220B to be charged. The charged second conductive pattern 1220B may provide a current path causing an electromagnetic effect (e.g., electromagnetic force) to secure or enhance antenna radiation performance of the electromagnetic field produced on the first conductive pattern 1220A. The conductive part 1820 according to the embodiment of FIG. 18 and the conductive part 1920 according to the embodiment of FIG. 19 may operate in substantially the same or similar manner as the conductive part 1220 according to the embodiment of FIG. 14. In an embodiment, a current path occurring on the second conductive pattern 1220B, 1820B, or 1920B is provided as a ground mode in which a current substantially flows in the −y-axis direction (e.g., the vertical direction of the slidable electronic device) so as to contribute to securing or enhancing antenna radiation performance.

Referring to FIG. 23, reference numeral "2301" is a graph indicating an antenna ground property with respect to the second conductive pattern 1220B included in the conductive part 1220 according to the embodiment of FIG. 14. Reference numeral "2302" is a graph indicating an antenna ground property with respect to the second conductive pattern 1820B included in the conductive part 1820 according to the embodiment of FIG. 18. Reference numeral "2303" is a graph indicating an antenna ground property with respect to the second conductive pattern 1920B included in the conductive part 1920 according to the embodiment of FIG. 19. Referring to FIG. 24, reference numeral "2401" is a graph indicating antenna radiation performance in case that the second conductive pattern 1220B according to the embodiment of FIG. 14 is provided. Reference numeral "2402" is a graph indicating antenna radiation performance in case that the second conductive pattern 1820B according to the embodiment of FIG. 18 is provided. Reference numeral "2403" is a graph indicating antenna radiation performance in case that the second conductive pattern 1920B according to the embodiment of FIG. 19 is provided.

For example, the second conductive pattern 1220B according to the embodiment of FIG. 14 may have a constraint in extending the vertical size (e.g., referring to FIG. 17, a distance by which the first boundary B1 is spaced apart from the second boundary B2) due to the limited size of the second housing 1200. There may be a comparison embodiment in which the second conductive pattern 1220B has a difficulty providing an electrical length to secure or enhance antenna radiation performance with respect to the first frequency band (e.g., LB (about 600 MHz to about 1 GHz) that the first conductive pattern 1220A transmits or receives due to the constraint. The graph indicated by reference numeral "2301" and the graphs indicated by reference numeral "2401" correspond to comparison embodiments. In the comparison embodiments, it may be difficult for the second conductive pattern 1220B to substantially provide an electromagnetic force (or an electromagnetic effect) capable of securing antenna radiation performance with respect to the first frequency band. In the comparison embodiments, the second conductive pattern 1220B may have a property (or antenna ground property) capable of causing an substantial effect (e.g., an electromagnetic force) on securing or enhancing of antenna radiation performance with respect to a second frequency band (e.g., about 1200 MHz or more) higher than the first frequency band that the first conductive pattern 1220A transmits and receives. In the comparison embodiments, the second conductive pattern 1820B of FIG. 18 or the second conductive pattern 1920B of FIG. 19 may be provided in place of the second conductive pattern 1220B to provide an antenna ground property (e.g., an electrical length or current path (or surface current distribution)) capable of securing or enhance antenna radiation performance with respect to the first frequency band. The second conductive pattern 1820B of FIG. 18 may provide a desired length or current path by further including the third slit 1801 without extension of the vertical size thereof. The third slit 1801 according to the embodiment of FIG. 18 may contribute to providing of an electrical length or current path to reinforce an antenna ground or the second conductive pattern 1820B to operate better as an antenna ground with respect to the first frequency band that the first conductive pattern 1820A transmits or receives. The second conductive pattern 1920B of FIG. 19 may provide a desired length or current path by further including the notch 1901 without extension of the vertical size thereof. The notch 1901 according to the embodiment of FIG. 19 may contribute to providing of an electrical length or current path to reinforce an antenna ground or the second conductive pattern 1920B to operate better as an antenna ground with respect to the first frequency band that the first conductive pattern 1920A transmits or receives.

Figure 25:
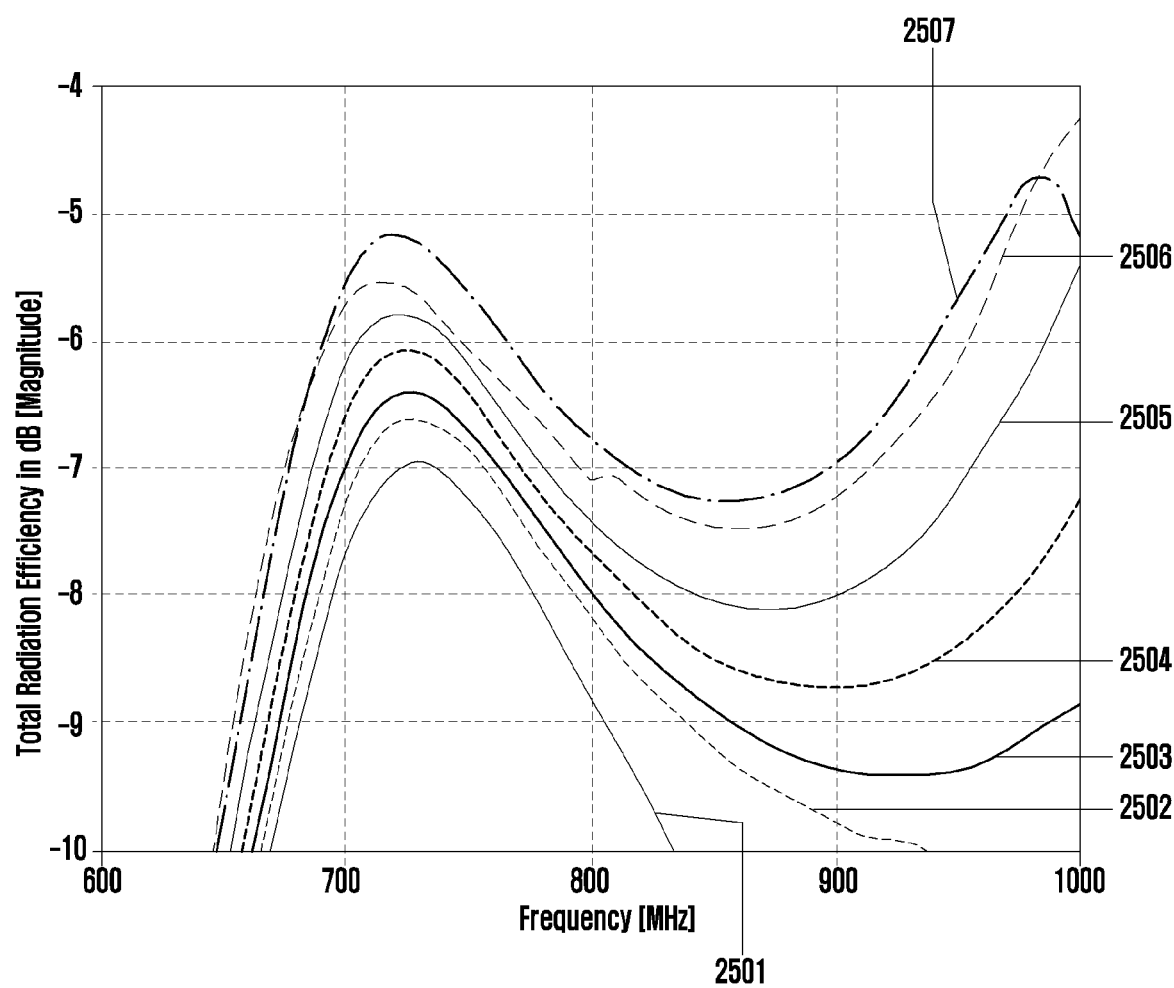
FIG. 25 illustrates graphs indicating antenna radiation performance with respect to a first conductive pattern according to an air gap between the flexible display module and the second conductive pattern in FIG. 16 according to various embodiments.

FIG. 25 illustrates graphs indicating antenna radiation performance with respect to a first conductive pattern 1220A according to an air gap AG between the flexible display module 24 and the second conductive pattern 1220B in FIG. 16 according to various embodiments.

Referring to FIG. 16, when viewed from the top of the rear surface of the slidable electronic device 1100 in the closed state of the slidable electronic device 1100, a portion of the second area ⓑ included in the flexible display module 24 may overlap the second conductive pattern 1220B. When viewed from the top of the rear surface of the slidable electronic device 1100, a degree of overlap between the second area ⓑ and the second conductive pattern 1220B may be reduced during the slide-in of the second housing 1200 and may increase during the slide-out of the second housing 1200.

Referring to FIG. 16 and FIG. 25, reference numeral "2501" is a graph indicating antenna radiation performance in case that the air gap AG is provided to have a thickness of about 1 mm in an embodiment in which the second housing 1200 of FIG. 16 includes the structure 1400 in FIG. 14. Reference numeral "2502" is a graph indicating antenna radiation performance in case that the air gap AG is provided to have a thickness of about 0.2 mm in an embodiment in which the second housing 1200 of FIG. 16 includes the structure 1900 in FIG. 19. Reference numeral "2503" is a graph indicating antenna radiation performance in case that the air gap AG is provided to have a thickness of about 0.4 mm in the embodiment in which the second housing 1200 of FIG. 16 includes the structure 1900 in FIG. 19. Reference numeral "2504" is a graph indicating antenna radiation performance in case that the air gap AG is provided to have a thickness of about 0.6 mm in the embodiment in which the second housing 1200 of FIG. 16 includes the structure 1900 in FIG. 19. Reference numeral "2505" is a graph indicating antenna radiation performance in case that the air gap AG is provided to have a thickness of about 0.8 mm in the embodiment in which the second housing 1200 of FIG. 16 includes the structure 1900 in FIG. 19. Reference numeral "2506" is a graph indicating antenna radiation performance in case that the air gap AG is provided to have a thickness of about 1.0 mm in the embodiment in which the second housing 1200 of FIG. 16 includes the structure 1900 in FIG. 19. Reference numeral "2507" is a graph indicating antenna radiation performance in case that the air gap AG is provided to have a thickness of about 1.2 mm in the embodiment in which the second housing 1200 of FIG. 16 includes the structure 1900 in FIG. 19. In the embodiment in which the second housing 1200 of FIG. 16 includes the structure 1900 in FIG. 19, comparing graphs 2502, 2503, 2504, 2505, 2506, and 2507, as the thickness of the air gap AG increases, an electromagnetic effect of a conductive material included in the flexible display module 24 on the second conductive pattern 1220B operating as an antenna ground decreases, and thus antenna radiation performance in a selected or designated frequency band (e.g., LB (about 600 MHz to about 1 GHz)) may be enhanced. The conductive material included in the flexible display 24 may correspond to at least one conductive material layer included in a stacking structure 501 shown in FIG. 4 and may include, for example, a copper sheet 243e. The air gap AG may be provided to have a thickness that may contribute to slimming of the slidable electronic device 1100 while securing antenna radiation performance. Comparing the graph 2051 with respect to the embodiment in which the second housing 1200 of FIG. 16 includes the structure 1400 of FIG. 14 and the graph 2506 with respect to the embodiment in which the second housing 1200 of FIG. 16 includes the structure 1900 of FIG. 19, the structure 1900 of FIG. 19 may have, compared to the structure 1400 of FIG. 14, a property (or antenna ground property) capable of causing a substantial effect (e.g., an electromagnetic force) on securing or enhancing antenna radiation performance with respect to a selected or designated frequency band.

Figure 26:
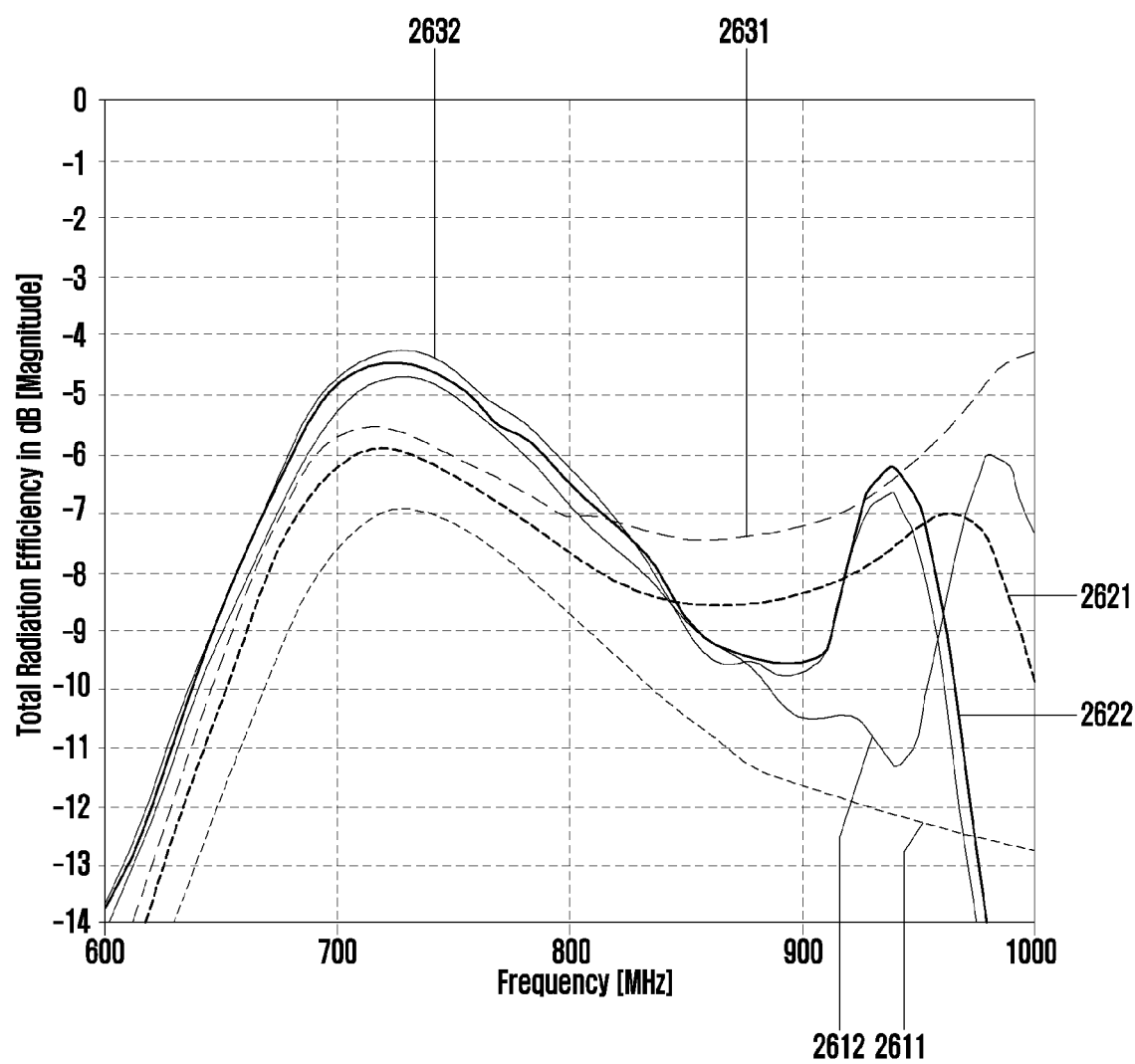
FIG. 26 illustrates graphs indicating antenna radiation performance of a slidable electronic device in a closed state or an open state according to various embodiments.

FIG. 26 illustrates graphs indicating antenna radiation performance of a slidable electronic device 1100 in a closed state or an open state according to various embodiments.

Referring to FIG. 26, reference numeral "2611" is a graph indicating antenna radiation performance in the closed state of the slidable electronic device 1100 including the conductive part 1220 according to the embodiment of FIG. 14. Reference numeral "2612" is a graph indicating antenna radiation performance in the open state of the slidable electronic device 1100 including the conductive part 1220 according to the embodiment of FIG. 14. Reference numeral "2621" is a graph indicating antenna radiation performance in the closed state of the slidable electronic device including the conductive part 1820 according to the embodiment of FIG. 18. Reference numeral "2622" is a graph indicating antenna radiation performance in the open state of the slidable electronic device including the conductive part 1820 according to the embodiment of FIG. 18. Reference numeral "2631" is a graph indicating antenna radiation performance in the closed state of the slidable electronic device including the conductive part 1920 according to the embodiment of FIG. 19. Reference numeral "2632" is a graph indicating antenna radiation performance in the open state of the slidable electronic device including the conductive part 1920 according to the embodiment of FIG. 19.

The first conductive pattern 1220A included in the conductive part 1220 of FIG. 14, the first conductive pattern 1820A included in the conductive part 1820 of FIG. 18, and the first conductive pattern 1920A included in the conductive part 1920 of FIG. 19 may be substantially the same. The second conductive pattern 1220B included in the conductive part 1220 of FIG. 14, the second conductive pattern 1820B included in the conductive part 1820 of FIG. 18, and the second conductive pattern 1920B included in the conductive part 1920 of FIG. 19 may have the same vertical size between the first boundary B1 and the second boundary B2 spaced apart from each other and the same horizontal size between the third boundary B3 and the fourth boundary B4 spaced apart from each other.

For example, in the closed state of the slidable electronic device including the conductive part 1820 of FIG. 18, antenna radiation performance of about −5.9 dB may be provided with respect to a using frequency of about 750 MHz. In the open state of the slidable electronic device including the conductive part 1820 of FIG. 18, antenna radiation performance of about −4.4 dB may be provided with respect to a using frequency of about 750 MHz. For example, in the closed state of the slidable electronic device including the conductive part 1920 of FIG. 19, antenna radiation performance of about −5.4 dB may be provided with respect to a using frequency of about 750 MHz. In the open state of the slidable electronic device including the conductive part 1920 of FIG. 19, antenna radiation performance of about −4.2 dB may be provided with respect to a using frequency of about 750 MHz. The second conductive pattern 1220B included in the conductive part 1220 according to the embodiment of FIG. 14 may have a constraint to extend the vertical size due to a limited size of the second housing 1200. Due to the constraint, there may be a comparison embodiment in which the second conductive pattern 1220B of FIG. 14 has a difficulty providing an electrical length or current path to enhance antenna radiation performance with respect to the using frequency of about 750 MHz compared to the second conductive patter 1820*b* of FIG. 18 or the second conductive pattern 1920B of FIG. 19. The graph indicated by reference numeral "2611" and the graphs indicated by reference numeral "2612" correspond to comparison embodiments. In the comparison embodiments, in the closed state of the slidable electronic device 1100 including the conductive part 1220 of FIG. 14, antenna radiation performance of about −7 dB may be provided with respect to a using frequency of about 750 MHz. In the comparison embodiments, in the open state of the slidable electronic device 1100 including the conductive part 1220 of FIG. 14, antenna radiation performance of about −4.6 dB may be provided with respect to a using frequency of about 750 MHz. The second conductive pattern 1820B of FIG. 18 further includes the third slit 1801 compared to the comparison embodiments and may provide an electrical length or current path capable of further enhancing antenna radiation performance with respect to a using frequency of about 750 MHz. The second conductive pattern 1920B of FIG. 19 further includes the notch 1901 compared to the comparison embodiments and may provide an electrical length or current path capable of further enhancing antenna radiation performance with respect to a using frequency of about 750 MHz. The slidable electronic device including the conductive part 1820 of FIG. 18 or the conductive part 1920 of FIG. 19 may provide more enhanced antenna radiation performance in the closed state or open state compared to the comparison embodiments. The slidable electronic device including the conductive part 1820 of FIG. 18 or the conductive part 1920 of FIG. 19 may reduce a difference between the antenna radiation performance in the closed state and the antenna radiation performance in the open state, compared to the comparison embodiments. The comparison embodiments are presented to help understanding of the embodiment of FIG. 18 and the embodiment of FIG. 19 and are not intended to limit the scope of the embodiments.

Figure 27:
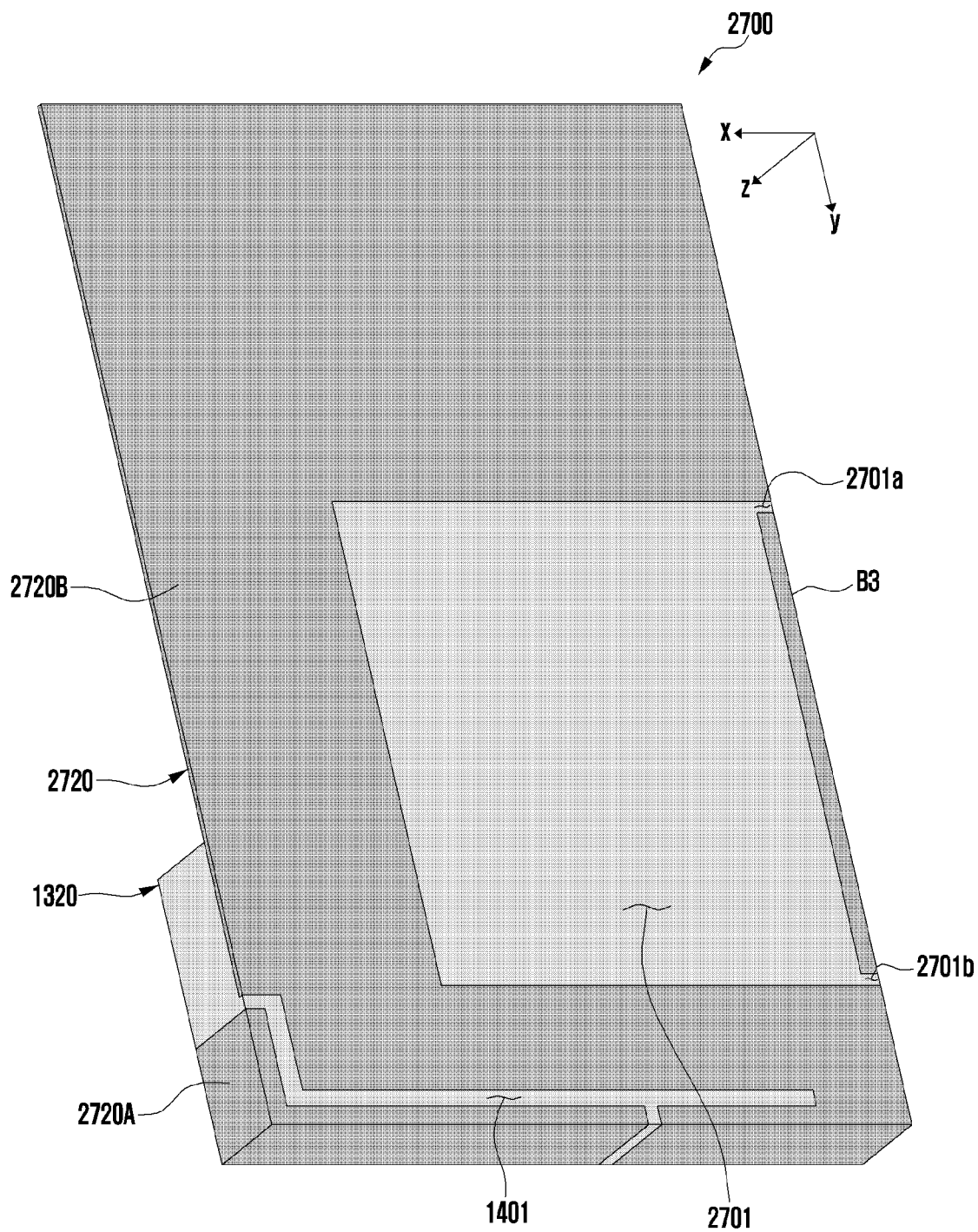
FIG. 27 is a perspective view of a structure including a second non-conductive part and a conductive part according to various embodiments.
Figure 28:
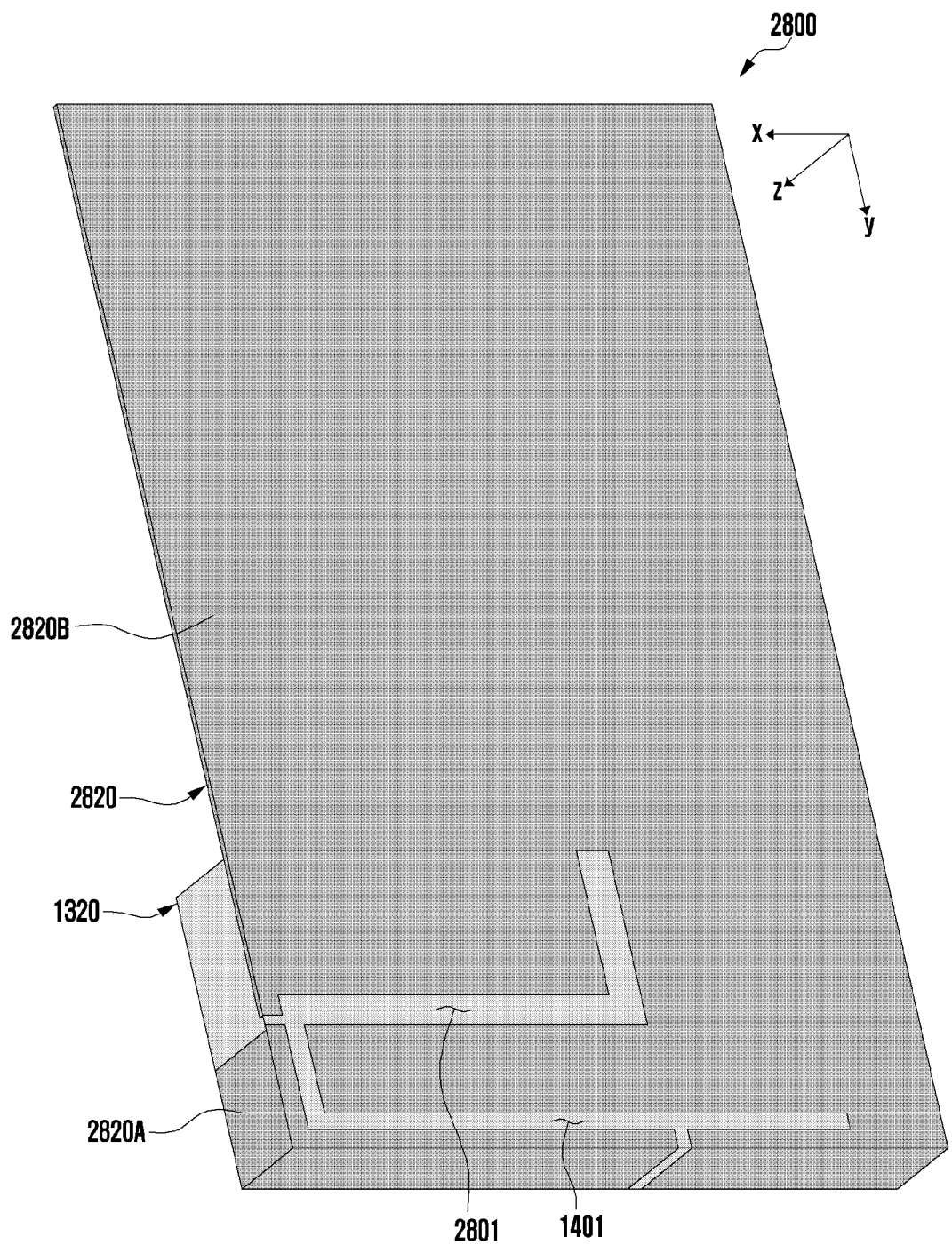
FIG. 28 is a perspective view of a structure including a second non-conductive part and a conductive part according to various embodiments.
Figure 29:
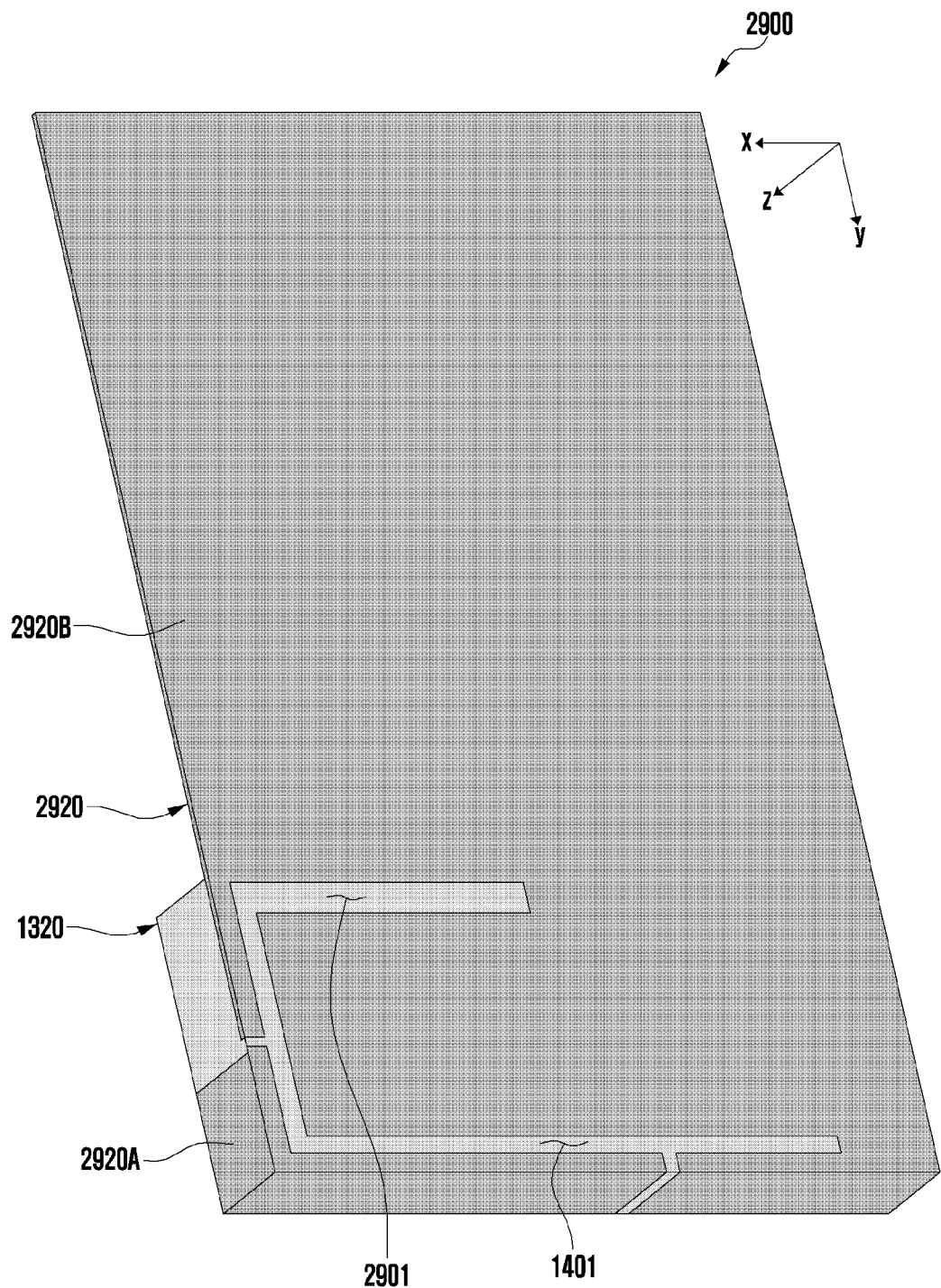
FIG. 29 is a perspective view of a structure including a second non-conductive part and a conductive part according to various embodiments.
Figure 30:
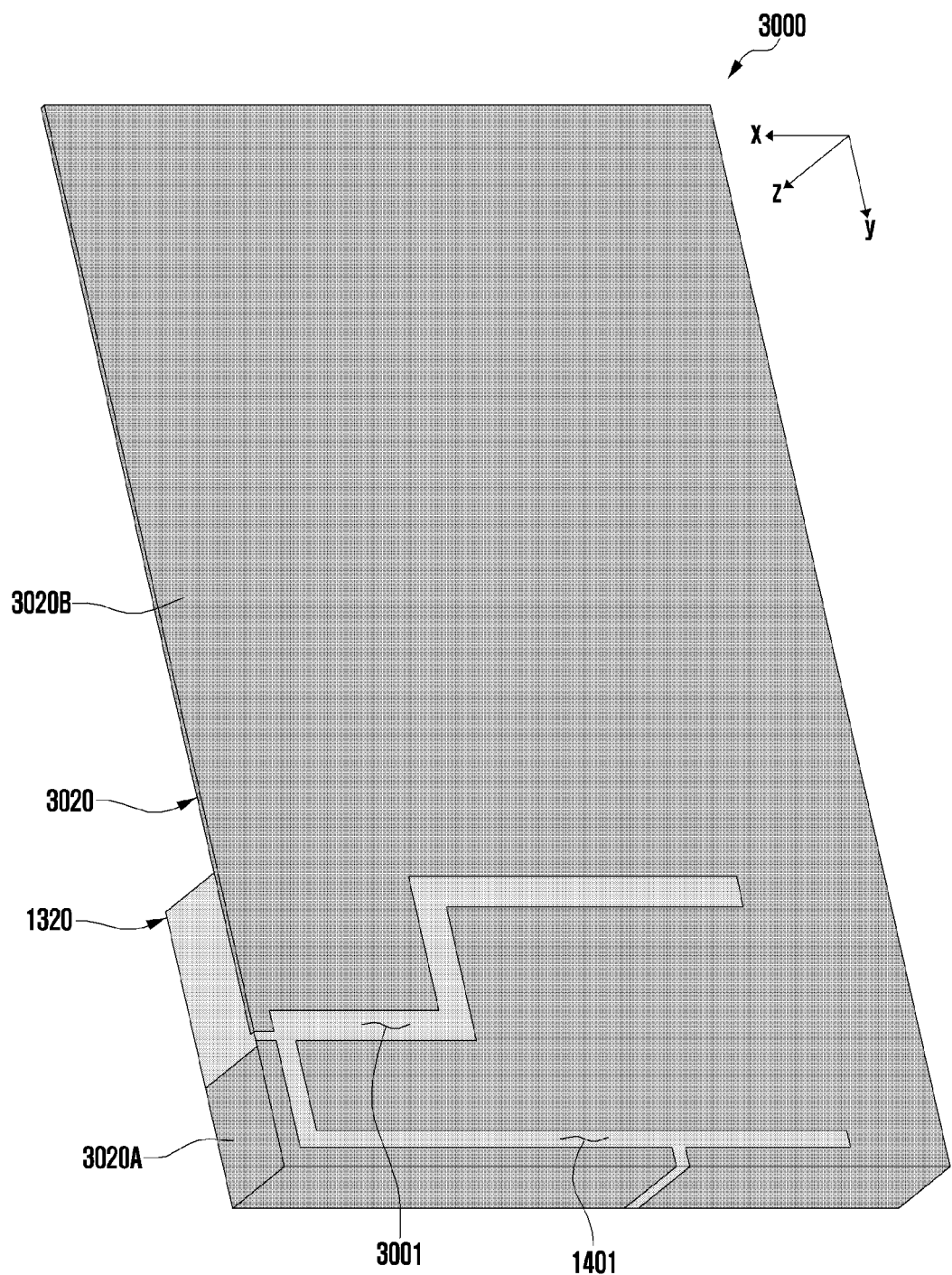
FIG. 30 is a perspective view of a structure including a second non-conductive part and a conductive part according to various embodiments.

FIG. 27 is a perspective view of a structure 2700 including a second non-conductive part 1320 and a conductive part 2720 according to various embodiments. FIG. 28 is a perspective view of a structure 2800 including a second non-conductive part 1320 and a conductive part 2820 according to various embodiments. FIG. 29 is a perspective view of a structure 2900 including a second non-conductive part 1320 and a conductive part 2920 according to various embodiments. FIG. 30 is a perspective view of a structure 3000 including a second non-conductive part 1320 and a conductive part 3020 according to various embodiments.

Referring to FIG. 27, the conductive part 2720 may include a first conductive pattern 2720A operating as an antenna radiator and a second conductive pattern 2720B operating as an antenna ground. The second conductive pattern 2720B may further include, compared to the second conductive pattern 1220B of FIG. 14, an opening 2701 including slits 2701*a* and 2701*b* provided on the third boundary B3 and having an open shape. The second conductive pattern 2720B may provide an electrical length or current path to operate better as an antenna ground or reinforce an antenna ground with respect to a selected or designated frequency band that the first conductive pattern 2720A transmits or receives.

Referring to FIG. 28, the conductive part 2820 may include a first conductive pattern 2820A operating as an antenna radiator and a second conductive pattern 2820B operating as an antenna ground. Referring to FIG. 29, the conductive part 2920 may include a first conductive pattern 2920A operating as an antenna radiator and a second conductive pattern 2920B operating as an antenna ground. Referring to FIG. 30, the conductive part 3020 may include a first conductive pattern 3020A operating as an antenna radiator and a second conductive pattern 3020B operating as an antenna ground. The second conductive pattern 2820B, 2920B, or 3020B may include a fourth slit 2801, 2901, or 3001 in which multiple slits extending in different directions are combined, in place of the third slit 1801 of FIG. 18. The second conductive pattern 2820B, 2920B, or 3020B may provide an electrical length or current path to operate better as an antenna ground or reinforce an antenna ground with respect to a selected or designated frequency band that the first conductive pattern 2820A, 2920A, or 3020A transmits or receives.

Figure 31:
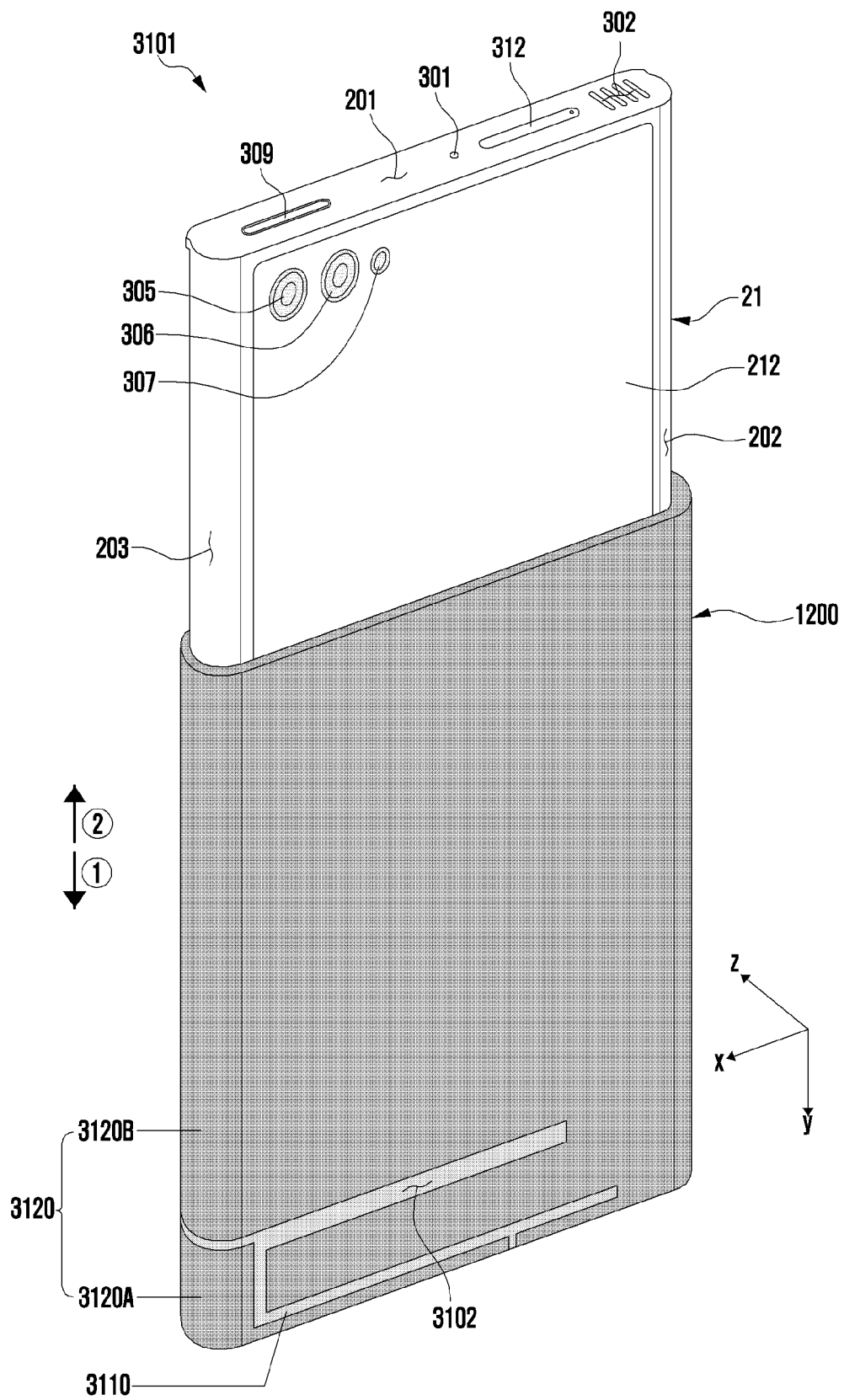
FIG. 31 is a perspective view of a slidable electronic device in an open state according to various embodiments.

FIG. 31 is a perspective view of a slidable electronic device 3101 in an open state according to various embodiments.

Referring to FIG. 31, the second housing 3100 may include a non-conductive part 3110 (e.g., the non-conductive part 1210 in FIG. 11) and a conductive part 3120 (e.g., the conductive part 1220 in FIG. 11) connected to the non-conductive part 3110. The conductive part 3120 may include a slit 3102 (e.g., the slits 1401 and 1801 in FIG. 18) and may provide a portion (or area seen from the outside) of the outer surface of the slidable electronic device 3101, which is provided by the second housing 3100. The non-conductive member 3110 may include a portion positioned in the slit 3102 of the conductive part 3120. A portion of the non-conductive part 3110, which is positioned in the slit 3102 may provide a portion (or area seen from the outside) of the outer surface of the slidable electronic device 3101, which is provided by the second housing 3100. A portion of an outer surface of the slidable electronic device 3101, which is provided by a portion, of the non-conductive part 3110, positioned in the slit 3102 may be smoothly connected to a portion of an outer surface of the slidable electronic device 3101, which is provided by the conductive part 3120.

According to an embodiment, the conductive part 3120 may include a first conductive pattern 3120A (e.g., the first conductive pattern 1820A in FIG. 18) and a second conductive pattern 3120B (e.g., the second conductive pattern 1820B in FIG. 18) physically spaced apart from each other while having the slit 3102 therebetween. The first conductive pattern 3120*a* may operate as an antenna radiator and the second conductive pattern 3120B may operate as an antenna ground. The second conductive pattern 3120B may provide an electrical length or current path to operate better as an antenna ground or reinforce an antenna ground with respect to a selected or designated frequency band that the first conductive pattern 3120A transmits or receives.

According to an example embodiment of the disclosure, a slidable electronic device (e.g., the slidable electronic device 1100 in FIG. 11) may include: a first housing (e.g., the first housing 21 in FIG. 16) and a second housing (e.g., the second housing 1200 in FIG. 16) configured to be slidable with respect to the first housing. The slidable electronic device may include a flexible display module including a flexible display (e.g., the flexible display module 24 in FIG. 16). The flexible display may include a first area (e.g., the first area ⓐ in FIG. 16) configured to be seen in a state in which the second housing is slid-in with respect to the first housing and a second area (e.g., the second area ⓑ in FIG. 16) configured to be at least partially drawn out to the outside to be seen in a state in which the second housing is slid-out with respect to the first housing. The slidable electronic device may include a wireless communication circuit (e.g., the wireless communication module 192 in FIG. 1). The second housing may include a first conductive pattern (e.g., the first conductive pattern 1220A in FIG. 12) and a second conductive pattern (e.g., the second conductive pattern 1220B in FIG. 12). The first conductive pattern may be electrically connected to the wireless communication circuit. The second conductive pattern may be physically separated from the first conductive pattern and may be configured to function as an antenna ground.

According to an example embodiment of the disclosure, the second conductive pattern (e.g., the second conductive pattern 1220B in FIG. 12) may have a length with respect to a wavelength corresponding to a selected or designated frequency band in which a signal configured to be transmitted and/or received by the wireless communication circuit through the first conductive pattern (e.g., the first conductive pattern 1220A in FIG. 12) is included.

According to an example embodiment of the disclosure, the second housing (e.g., the second housing 1200 in FIG. 11) may include a conductive part (e.g., the conductive part 1220 in FIG. 11 and FIG. 12) configured to provide the first conductive pattern and the second conductive pattern. The conductive part may include a slit (e.g., the first slit 1230 in FIG. 11 and FIG. 12) between the first conductive pattern and the second conductive pattern.

According to an example embodiment of the disclosure, the second conductive pattern may further include another slit (e.g., the second slit 1240 in FIG. 11 or the third slit 1801 in FIG. 18) extending from the slit (e.g., the first slit 1230 in FIG. 11 and FIG. 12).

According to an example embodiment of the disclosure, the second conductive pattern may further include a notch (e.g., the notch 1901 in FIG. 19).

According to an example embodiment of the disclosure, the second housing may further include a non-conductive part (e.g., the non-conductive part 1210 in FIG. 12) configured to provide the outer surface of the slidable electronic device. The first conductive pattern and the second conductive pattern may be coupled to the non-conductive part and may not be exposed to the outside of the slidable electronic device.

According to an example embodiment of the disclosure, the non-conductive part (e.g., the first non-conductive part 1310 in FIG. 13) may include a ceramic.

According to an example embodiment of the disclosure, the non-conductive part (e.g., the non-conductive part 1210 in FIG. 12) may include a polymer.

According to an example embodiment of the disclosure, the second housing may further include a non-conductive part (e.g., the non-conductive part 3110 in FIG. 31) coupled to the first conductive pattern and the second conductive pattern. The first conductive pattern (e.g., the first conductive pattern 3120A in FIG. 31), the second conductive pattern (e.g., the second conductive pattern 3120B in FIG. 31), and the non-conductive part may be exposed to the outside and may provide the outer surface of the slidable electronic device.

According to an example embodiment of the disclosure, the non-conductive part (e.g., the non-conductive part 1210 in FIG. 11) may include: a first non-conductive part (e.g., the first non-conductive part 1310 in FIG. 13), a second non-conductive part (e.g., the second non-conductive part 1320 in FIG. 13), and a third non-conductive part (e.g., the third non-conductive part 1330 in FIG. 13). The first non-conductive part may provide the outer surface of the slidable electronic device. The first conductive pattern and the second conductive pattern may be arranged on the second non-conductive part. The third non-conductive part may be at least partially disposed between a combination (e.g., the structure 1400 in FIG. 13) of the first conductive pattern, the second conductive pattern, and the second non-conductive part and the first non-conductive part.

According to an example embodiment of the disclosure, the first non-conductive part (e.g., the first non-conductive part 1310 in FIG. 13) may include a ceramic.

According to an example embodiment of the disclosure, the slidable electronic device may further include a first printed circuit board (e.g., the first printed circuit board 45 in FIG. 5) and a second printed circuit board (e.g., the second printed circuit board 46 in FIG. 16). The first printed circuit board may be positioned on the first housing. The wireless communication circuit may be disposed on the first printed circuit. The second printed circuit board may be disposed on the second housing and electrically connected to the first conductive pattern. The first printed circuit board and the second printed circuit board may be electrically connected to each other.

According to an example embodiment of the disclosure, the slidable electronic device may include a bending part (e.g., the bending part in FIG. 16) of the second area. The bending part may be disposed and maintained in a bent shape in the second area to allow the second area to change a direction and move based on the second housing sliding with respect to the first housing. At least a portion of the first conductive pattern (e.g., the first conductive pattern 1220A in FIG. 16) may be positioned corresponding to the bending part.

According to an example embodiment of the disclosure, a degree of overlap between the second area (e.g., the second area ⓑ in FIG. 16) and the second conductive pattern (e.g., the second conductive pattern 1220B in FIG. 16) may vary depending on a sliding position of the second housing with respect to the first housing.

According to an example embodiment of the disclosure, the slidable electronic device may further include a frame (e.g., the third frame 23 in FIG. 16) received in the second housing (e.g., the second housing 22 in FIG. 16). The frame may support the second area (e.g., the second area ⓑ in FIG. 16). The first area (e.g., the first area ⓐ in FIG. 16) may be disposed on the first housing (e.g., the first housing 21 in FIG. 16). At least a portion of the second area may be configured to be drawn out to the outside from a space between the frame and the second housing during slide-out of the second housing with respect to the first housing.

According to an example embodiment of the disclosure, a slidable electronic device (e.g., the slidable electronic device 1100 in FIG. 16) may include a flexible display module including a flexible display (e.g., the flexible display module 24 in FIG. 16). The slidable electronic device may include a first housing (e.g., the first housing 21 in FIG. 16) on which a first area (e.g., the first area ⓐ in FIG. 16) of the flexible display module is disposed. The slidable electronic device may include a frame (e.g., the third frame 23 in FIG. 16) capable of sliding with respect to the first housing. The frame may support a second area (e.g., the second area ⓑ in FIG. 16) of the flexible display module. The slidable electronic device may include a second housing (e.g., the second housing 1200 in FIG. 16). The second housing may be configured to receive the frame and may be coupled to the frame. The slidable electronic device may include a wireless communication circuit (e.g., the wireless communication module 192 in FIG. 1). The second housing may include a first conductive pattern (e.g., the first conductive pattern 1220A in FIG. 12) and a second conductive pattern (e.g., the second conductive pattern 1220B in FIG. 12). The first conductive pattern may be electrically connected to the wireless communication circuit. The second conductive pattern may be physically separated from the first conductive pattern and may be configured to function as an antenna ground.

According to an example embodiment of the disclosure, the second conductive pattern (e.g., the second conductive pattern 1220B in FIG. 12) may have a length with respect to a wavelength corresponding to a selected or designated frequency band in which a signal configured to be transmitted and/or received by the wireless communication circuit through the first conductive pattern (e.g., the first conductive pattern 1220A in FIG. 12) is included.

According to an example embodiment of the disclosure, the second housing (e.g., the second housing 1200 in FIG. 11) may include a conductive part (e.g., the conductive part 1220 in FIG. 11 and FIG. 12) configured to provide the first conductive pattern and the second conductive pattern. The conductive part may include a slit (e.g., the first slit 1230 in FIG. 11 and FIG. 12) between the first conductive pattern and the second conductive pattern.

According to an example embodiment of the disclosure, the second conductive pattern may further include another slit (e.g., the second slit 1240 in FIG. 11 or the third slit 1801 in FIG. 18) extending from the slit (e.g., the second slit 1230 in FIG. 11 and FIG. 12).

According to an example embodiment of the disclosure, the second conductive pattern may further include a notch (e.g., the notch 1901 in FIG. 19).

The embodiments illustrated and described in the disclosure and the drawings are merely presented as specific examples to easily explain the technical features and aid in understanding of the disclosure and are not intended to limit the scope of the disclosure. Therefore, the scope of the various embodiments of the disclosure should be understood as encompassing all changes or modifications of the various example embodiments disclosed herein. Furthermore, it will be appreciated that any embodiment(s) disclosed herein may be used together with any other embodiment(s) disclosed herein.

What is claimed is:

1. A slidable electronic device comprising:
    a first housing and a second housing configured to be slidable with respect to the first housing;
    a flexible display module including a flexible display comprising a first area configured to be seen in a state in which the second housing is slid-in with respect to the first housing, and a second area configured to be at least partially drawn out to the outside to be seen in a state in which the second housing is slid-out with respect to the first housing; and
    a wireless communication circuit,
    wherein the second housing comprises a first conductive pattern electrically connected to the wireless communication circuit and a second conductive pattern physically separated from the first conductive pattern and configured to operate as an antenna ground.

2. The electronic device of claim 1, wherein the second conductive pattern has a length with respect to a wavelength corresponding to a selected or designated frequency band in which a signal configured to be transmitted and/or received by the wireless communication circuit through the first conductive pattern is included.

3. The electronic device of claim 1, wherein the second housing comprises a conductive part configured to provide the first conductive pattern and the second conductive pattern, and
    wherein the conductive part comprises a slit between the first conductive pattern and the second conductive pattern.

4. The electronic device of claim 3, wherein the second conductive pattern further comprises another slit extending from the slit.

5. The electronic device of claim 3, wherein the second conductive pattern further comprises a notch.

6. The electronic device of claim 1, wherein the second housing further comprises a non-conductive part providing an outer surface of the electronic device, and
    wherein the first conductive pattern and the second conductive pattern are coupled to the non-conductive part and are not exposed to the outside of the electronic device.

7. The electronic device of claim 6, wherein the non-conductive part comprises a ceramic.

8. The electronic device of claim 6, wherein the non-conductive part comprises a polymer.

9. The electronic device of claim 1, wherein the second housing further comprises a non-conductive part coupled to the first conductive pattern and the second conductive pattern, and wherein the first conductive pattern, the second conductive pattern, and the non-conductive part are exposed to the outside and provide an outer surface of the electronic device.

10. The electronic device of claim 9, wherein the non-conductive part comprises:
a first non-conductive part providing the outer surface of the electronic device;
a second non-conductive part on which the first conductive pattern and the second conductive pattern are arranged; and
a third non-conductive part at least partially disposed between the first non-conductive part and a combination the first conductive pattern, the second conductive pattern, and the second non-conductive part.

11. The electronic device of claim 10, wherein the first non-conductive part comprises a ceramic.

12. The electronic device of claim 1, further comprising:
a first printed circuit board on which the wireless communication circuit is disposed and which is positioned on the first housing; and
a second printed circuit board positioned on the second housing and electrically connected to the first conductive pattern,
wherein the first printed circuit board and the second printed circuit board are electrically connected to each other.

13. The electronic device of claim 1, wherein the electronic device includes a bending part disposed and maintained in a bent shape in the second area to allow the second area to change a direction and move based on the second housing sliding with respect to the first housing, and
wherein at least a portion of the first conductive pattern is disposed corresponding to the bending part.

14. The electronic device of claim 1, wherein a degree of overlap between the second area and the second conductive pattern varies depending on a sliding position of the second housing with respect to the first housing.

15. The electronic device of claim 1, further comprising a frame received in the second housing and configured to support the second area,
wherein the first area is disposed on the first housing, and
wherein at least a portion of the second area is configured to be drawn out to the outside from a space between the frame and the second housing during slide-out of the second housing with respect to the first housing.

16. A slidable electronic device comprising:
a flexible display module including a flexible display;
a first housing on which a first area of the flexible display disposed;
a frame configured to be slidable with respect to the first housing and support a second area of the flexible display module;
a second housing configured to receive the frame and coupled to the frame; and
a wireless communication circuit,
wherein the second housing comprises a first conductive pattern electrically connected to the wireless communication circuit and a second conductive pattern physically separated from the first conductive pattern and configured to operate as an antenna ground.

17. The electronic device of claim 16, wherein the second conductive pattern has a length with respect to a wavelength corresponding to a selected or designated frequency band in which a signal configured to be transmitted and/or received by the wireless communication circuit through the first conductive pattern is included.

18. The electronic device of claim 16, wherein the second housing comprises a conductive part configured to provide the first conductive pattern and the second conductive pattern, and
wherein the conductive part comprises a slit between the first conductive pattern and the second conductive pattern.

19. The electronic device of claim 18, wherein the second conductive pattern further comprises another slit extending from the slit.

20. The electronic device of claim 18, wherein the second conductive pattern further comprises a notch.

* * * * *